(12) United States Patent
Chen et al.

(10) Patent No.: US 11,050,627 B2
(45) Date of Patent: Jun. 29, 2021

(54) METHOD AND NETWORK DEVICE FOR ENABLING IN-PLACE POLICY UPDATES

(71) Applicant: Arista Networks, Inc., Santa Clara, CA (US)

(72) Inventors: Michael Chen, Santa Clara, CA (US); Eswaran Baskaran, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/446,101

(22) Filed: Jun. 19, 2019

(65) Prior Publication Data

US 2020/0403869 A1    Dec. 24, 2020

(51) Int. Cl.
*H04L 12/70*    (2013.01)
*H04L 12/24*    (2006.01)
*H04L 29/08*    (2006.01)

(52) U.S. Cl.
CPC ...... *H04L 41/0893* (2013.01); *H04L 41/0806* (2013.01); *H04L 41/5022* (2013.01); *H04L 67/2852* (2013.01)

(58) Field of Classification Search
CPC ............. H04L 41/0893; H04L 41/0806; H04L 67/2852; H04L 41/5022
USPC .......................................................... 709/223
See application file for complete search history.

(56) References Cited

U.S. PATENT DOCUMENTS

| | | | | |
|---|---|---|---|---|
| 6,684,244 | B1* | 1/2004 | Goldman | H04L 41/0893 370/395.21 |
| 9,444,847 | B2* | 9/2016 | Zhang | G06F 3/0484 |
| 10,469,320 | B2* | 11/2019 | Dwaraki | H04L 41/0893 |
| 2013/0070753 | A1* | 3/2013 | Sahni | H04L 45/021 370/351 |
| 2014/0279850 | A1* | 9/2014 | Goyal | G06F 16/21 707/609 |
| 2017/0094036 | A1* | 3/2017 | Almog | H04L 45/7457 |
| 2017/0201460 | A1* | 7/2017 | Hall | H04L 41/0893 |
| 2017/0346754 | A1* | 11/2017 | Sinha | H04L 47/527 |
| 2018/0331951 | A1* | 11/2018 | Boutros | H04L 41/12 |
| 2019/0297055 | A1* | 9/2019 | May | H04L 63/0236 |
| 2019/0372889 | A1* | 12/2019 | Michael | H04L 45/22 |

* cited by examiner

*Primary Examiner* — Moustafa M Meky
*Assistant Examiner* — Elizabeth Kassa
(74) *Attorney, Agent, or Firm* — Chamberlain, Hrdlicka, White, Williams & Aughtry

(57) ABSTRACT

A method and network device for enabling in-place policy updates. Specifically, the method and network device disclosed herein entail effecting the removal and/or insertion of policies on the network device while minimizing a window in which active policies may be disrupted by the policy updates. Further, in-place policy updates call upon the ordered-shifting of content stored across data structure elements. Through ordered-shifting, policy updates can utilize limited memory resources, on the network device, more efficiently over existing methodologies. Additionally, policy updates can also be committed faster, thereby allowing more policy updates to be processed with a fixed time window.

20 Claims, 31 Drawing Sheets

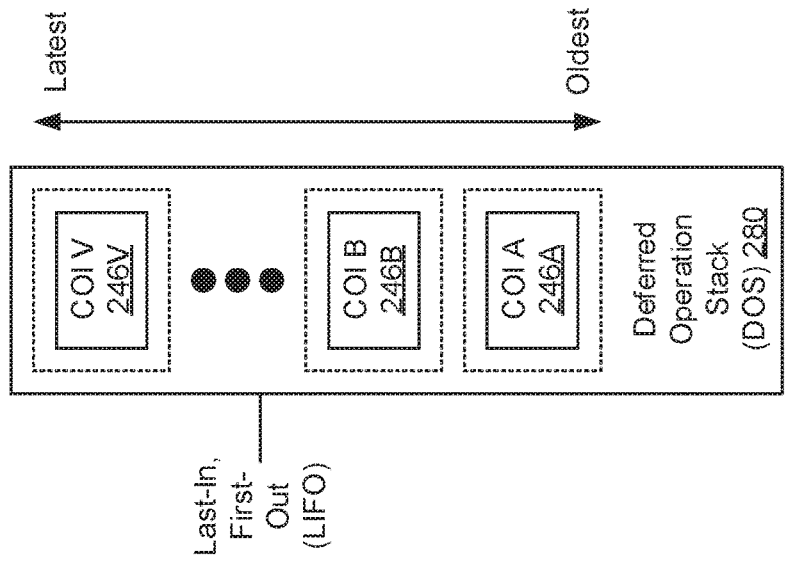
FIG. 2K
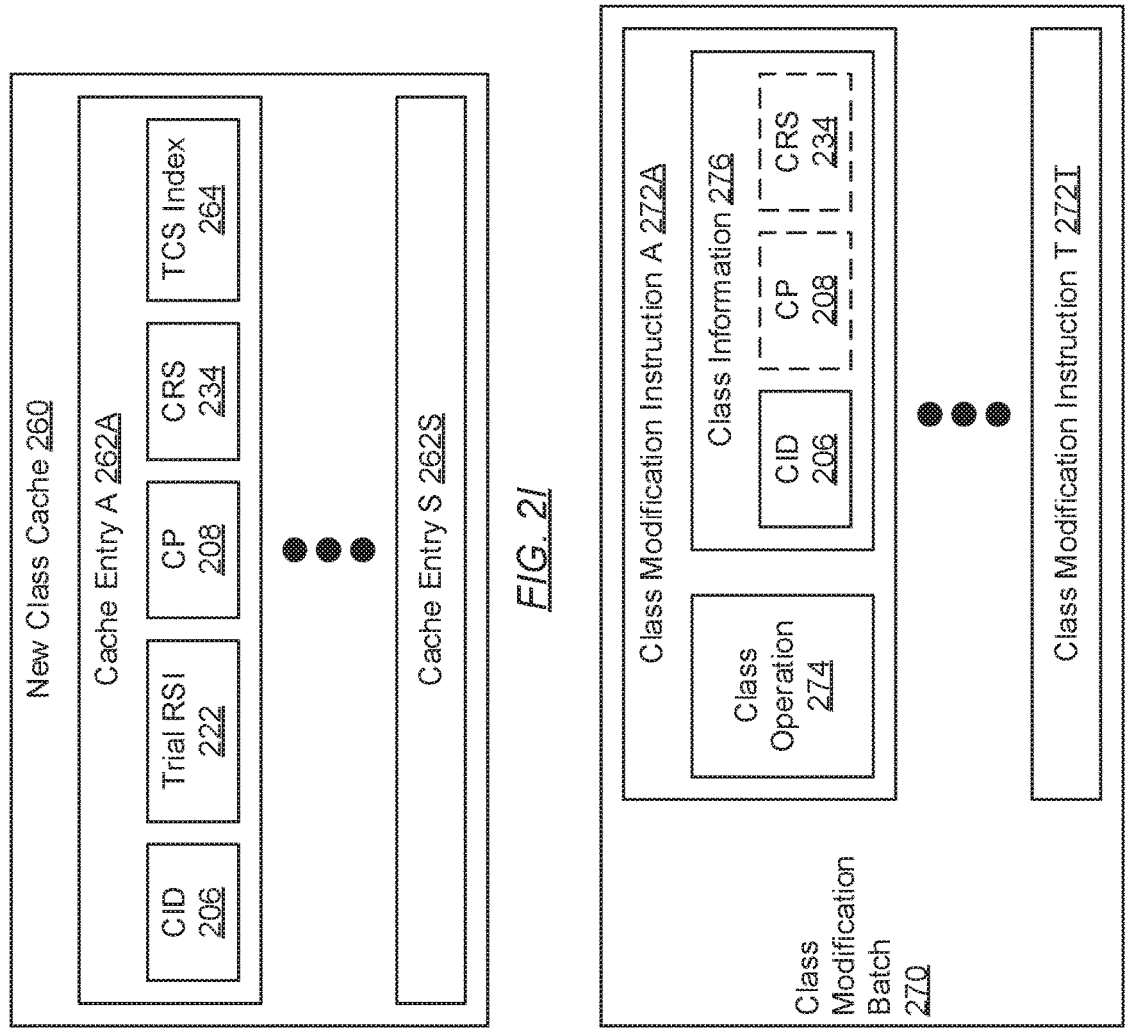
FIG. 2I
FIG. 2J

METHOD AND NETWORK DEVICE FOR ENABLING IN-PLACE POLICY UPDATES

BACKGROUND

In updating policies programmed on a network device while minimizing disruption across the network device, existing solutions follow a make-before-break methodology. Using this methodology, however, requires the reservation and, subsequently, the inefficient utilization, of a substantive portion of the limited memory resources available on the network device.

SUMMARY

In general, in one aspect, the invention relates to a method for programming a network device. The method includes receiving a class modification batch directed to performing policy in-place updates on the network device, obtaining a final target class sequence from updating an initial target class sequence based on the class modification batch, generating an operation commit sequence based on the final target class sequence, and performing, based on the operation commit sequence, the policy in-place updates on the network device by committing the class modification batch thereon.

In general, in one aspect, the invention relates to a network device. The network device includes a computer processor, and a policy update programmer executing on the computer processor. The policy update programmer is configured to receive a class modification batch directed to performing policy in-place updates on the network device, obtain a final target class sequence from updating an initial target class sequence based on the class modification batch, generate an operation commit sequence based on the final target class sequence, and perform, based on the operation commit sequence, the policy in-place updates on the network device by committing the class modification batch thereon.

In general, in one aspect, the invention relates to a non-transitory computer readable medium (CRM). The CRM includes computer readable program code, which when executed by a computer processor residing on a network device, enables the computer processor to receive a class modification batch directed to performing policy in-place updates on the network device, obtain a final target class sequence from updating an initial target class sequence based on the class modification batch, generate an operation commit sequence based on the final target class sequence, and perform, based on the operation commit sequence, the policy in-place updates on the network device by committing the class modification batch thereon.

Other aspects of the invention will be apparent from the following description and the appended claims.

BRIEF DESCRIPTION OF DRAWINGS

FIG. 2I shows a new class cache in accordance with one or more embodiments of the invention.

FIG. 2J shows a class modification batch in accordance with one or more embodiments of the invention.

FIG. 2K shows a deferred operation stack in accordance with one or more embodiments of the invention.

DETAILED DESCRIPTION

Figure 1:
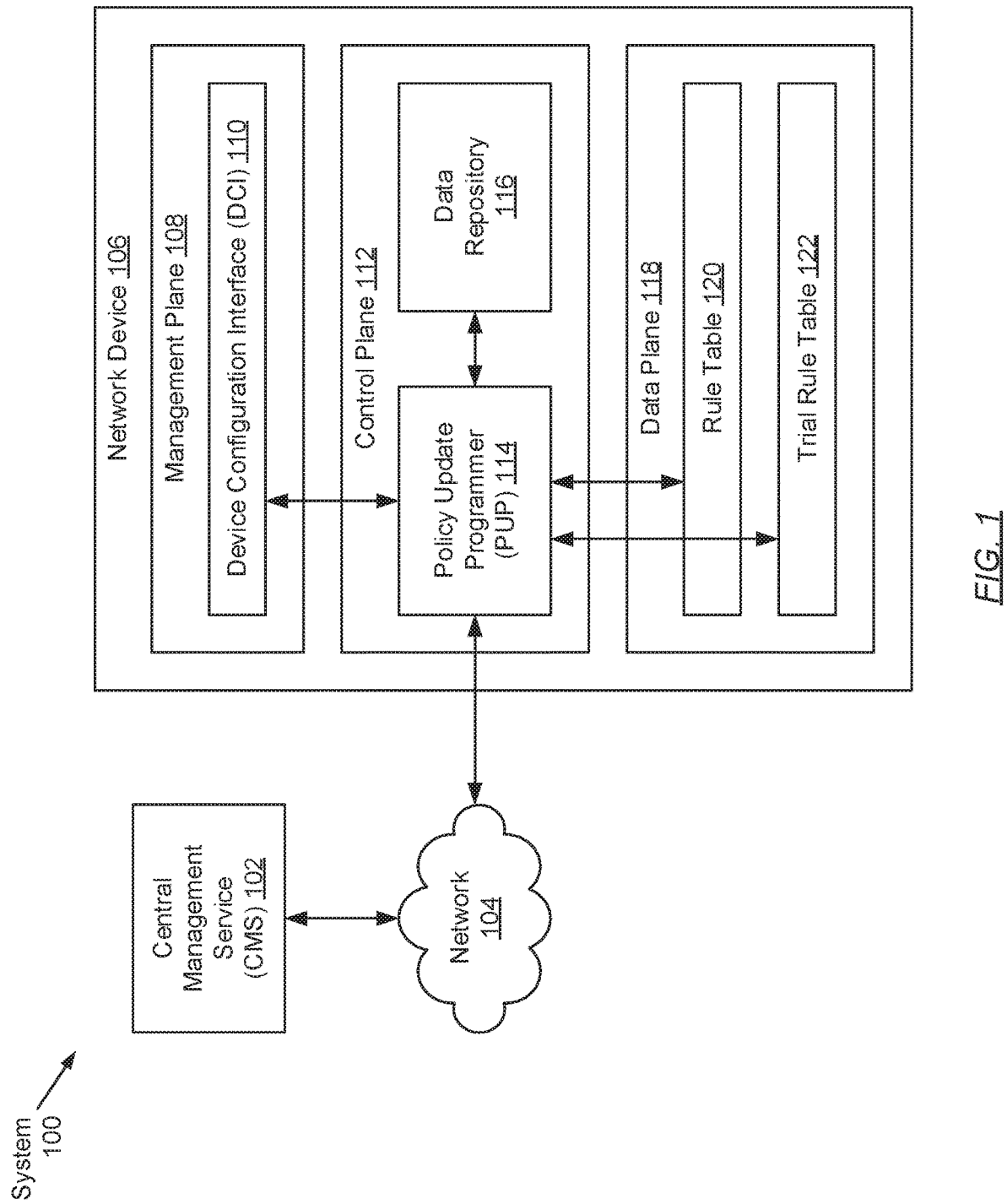
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-13K, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and network device for enabling in-place policy updates. Specifically, one or more embodiments of the invention entails effecting the removal and/or insertion of policies on the network device while minimizing a window in which active policies may be disrupted by the policy updates. Further, in-place policy updates call upon the ordered-shifting of content stored across data structure elements. Through ordered-shifting, policy updates can utilize limited memory resources, on the network device, more efficiently over existing methodologies. Additionally, policy updates can also be committed faster, thereby allowing more policy updates to be processed with a fixed time window.

FIG. 1 shows a system in accordance with one or more embodiments of the invention. The system (100) may include a central management service (CMS) (102) operatively connected to a network device (106) through a network (104). Each of these system (100) components is described below.

In one embodiment of the invention, the CMS (102) may represent a platform for the centralized management of, and/or consolidation of state information for, one or more network devices, including the network device (106). The CMS (102) may be implemented on one or more physical or virtual devices, which may reside in a datacenter and/or a cloud computing environment. Each device, implementing the CMS (102) at least in part, may include, but is not limited to, one or more computer processors (e.g., integrated circuits for processing computer readable instructions or program code), memory, two or more physical network interfaces (also referred to as ports), and a data repository for at least storing the aforementioned network device state information. Furthermore, the CMS (102) may include functionality to: configure one or more network devices, including the network device (106), through the submission of instructions and/or commands; and query and, subsequently, receive state information, in response to the query, from the network device(s), including the network device (106).

In one embodiment of the invention, the network (104) may represent a set of interconnected devices or systems, which may operatively connect at least the CMS (102) and the network device (106) to one another. The network (104) may include functionality to facilitate communications at least between the CMS (102) and the network device (106). Furthermore, the network (104) may include any combination of local area network (LAN) and/or wide area network (WAN) (e.g., Internet) segments, and may employ any combination of wired and/or wireless connections and communication protocols.

In one embodiment of the invention, the network device (106) may represent a physical computing system that may include, but is not limited to, persistent storage, memory (e.g., random access memory (RAM), shared memory, etc.), one or more computer processors (e.g., integrated circuits), which may include a switch chip or network processor, and two or more physical network interfaces (also referred to as ports). The computer processor(s) may be programmed to determine out of which network interface, on the network device (106), to forward network traffic (e.g., media access control (MAC) frames, Internet Protocol (IP) packets, etc.). The network device (106) may include functionality to receive network traffic through a physical network interface, and determine whether to: (i) drop the network traffic; (ii) process the network traffic in accordance with installed device configurations; and/or (iii) send the network traffic, based on the processing, out another physical network interface, and towards a destination.

In one embodiment of the invention, how the network device (106) makes a determination of whether to drop network traffic or forward network traffic to another device (not shown), depends, in part, on whether the network device (106) operates as a layer-2 (L2) switch or a layer-3 (L3) switch (also referred to as a multilayer switch). If the network device (106) is operating as a L2 switch, the network device (106) may use a destination MAC address along with a forwarding table or policy to determine out of which physical network interface to send the network traffic. Alternatively, if the network device (106) is operating as a L3 switch, the network device (106) may use a destination IP address along with a routing table or policy to determine out of which physical network interface to send the network traffic. Further, in operating as a L3 switch, the network device (106) may include functionality to write the MAC address of a next hop (or device) to receive the network traffic in place of its own MAC address (which the last hop (or device) to send the network traffic wrote) in the L2 header information encapsulating the network traffic. Moreover, if the network device (106) operates as a multilayer switch, the network device (106) may include functionality to process network traffic using MAC addresses and forwarding tables/policies, as well as IP addresses and routing tables/policies.

In one embodiment of the invention, the persistent storage on the network device (106) may include any type of non-transitory computer readable medium that includes instructions (or computer readable program code), which when executed by the computer processor(s), enable the network device (106) to perform any of the functionalities described herein (see e.g., FIGS. 3A-12B). Furthermore, examples of the network device (106) may include, but are not limited to, a switch, a router, and a multilayer switch. Moreover, the network device (106) is not limited to the aforementioned specific examples.

In one embodiment of the invention, the network device (106) may include a management plane (108), a control plane (112), and a data plane (118). Each of these network device (106) subcomponents is described below.

In one embodiment of the invention, the management plane (108) may refer to a portion of the network device (106) architecture that may be responsible for configuring, controlling, and monitoring the network device (106), or more specifically, subcomponents of the control plane (112). Further, the management plane (108) may include, but is not limited to, a device configuration interface (DCI) (110). The DCI (110) may refer to computer hardware and/or software through which users (e.g., network administrators) may interact with (e.g., configure, query, etc.) the network device (106). By way of examples, the DCI (110) may be implemented in the form of a command line interface (CLI), a graphical user interface (GUI), any other interface design through which users may interact with the network device (106), or any combination thereof.

In one embodiment of the invention, the control plane (112) may represent another portion of the network device (106) architecture that may be responsible for making decisions with respect to where, and through which port, to send network traffic. These decisions may rely, at least in part, on a dynamically changing network topology maintained by the control plane (112) through the sharing of routing (and/or other networking) protocol information amongst various network devices (not shown) on the network (104). Furthermore, the control plane (112) may support various agents and other processes, which may include, but is not limited to, a policy update programmer (PUP) (114). An agent (e.g., PUP (114)) may represent a computer program that may execute on the underlying hardware of the network device (106), which may implement and manage one or more roles or features for which the network device (106) may be configured. The control plane (112) may further include a data repository (116). The PUP (114) and the data repository (116) are described in further detail below.

In one embodiment of the invention, the PUP (114) may refer to a computer program that may be designed and configured to perform in-place updates effecting the removal and/or insertion of policies on the network device (106). In-place updates may refer to the modification of active policies (or rules) programmed on the network device (106) while minimizing a window in which the active policies/rules may be disrupted by the modification(s). To that end, the PUP (114) may include functionality to: process class modification batches (see e.g., FIGS. 3A and 3B); perform sufficient memory validations (see e.g., FIGS. 4A and 4B); modify target class sequences (TCSs) (described) to reflect class removals (see e.g., FIG. 5); modify TCSs to reflect class insertions (see e.g., FIG. 6); ordered-shift TCSs (see e.g., FIGS. 7A and 7B); execute trial phases entailing the in-place updates (see e.g., FIGS. 8A-8C); identify ordered-shift directions (OSDs) (described below) (see e.g., FIG. 9); transfer deferred operation stack (DOS) contents to operation commit sequences (OCS) (see e.g., FIG. 10); execute commit phases entailing the in-place updates (see e.g., FIGS. 11A and 11B); and ordered-shift class and rule tables (see e.g., FIGS. 12A and 12B). One of ordinary skill will appreciate that the PUP (114) may perform other functionalities without departing from the scope of the invention.

In one embodiment of the invention, the data repository (116) may refer to data storage wherein various information generated and/or used, by at least the PUP (114), may be stored in whole or in part, and temporarily or permanently. The data repository (116) may be implemented using memory (e.g., RAM), cache, persistent (i.e., non-volatile) storage, or a combination thereof. Furthermore, information stored in the data repository (116) may include, but is not limited to, any of the various variables, attributes, and data structures (e.g., class tables), disclosed herein, which may be created, deleted, or updated by at least the PUP (114) in accordance with one or more embodiments of the invention.

In one embodiment of the invention, the data plane (118) may represent yet another portion of the network device (106) architecture that may be responsible for handling network traffic. Handling may entail, but is not limited to, receiving, parsing, processing, modifying, and transmitting. The data plane (118) may forward network traffic based on various data structures, policies, rules, and/or other information and instructions, which may be configured, managed, and updated by the control plane (112). These data structures, policies, rules, and/or other information and instructions may include, but are not limited to, a rule table (120) and a trial rule table (122) (described below) (see e.g., FIG. 2C).

While FIG. 1 shows a configuration of components, other system (100) and/or network device (106) configurations may be used without departing from the scope of the invention.

Figure 2A:
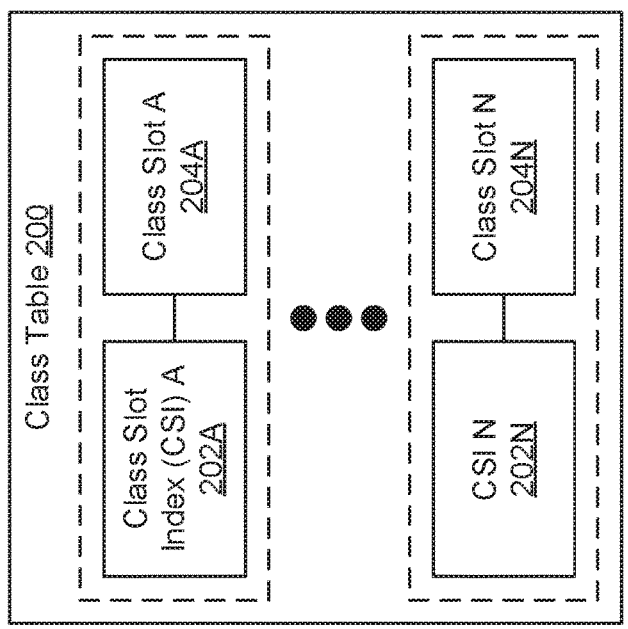
FIG. 2A shows a class table in accordance with one or more embodiments of the invention.

FIG. 2A shows a class table in accordance with one or more embodiments of the invention. The class table (200) may refer to a data structure that maintains a list of active classes (i.e., sets of policies or rules) programmed on the network device. Classes may group policies or rules based on a common flow action (described below) (see e.g., FIG. 2D) shared by the policies or rules. That is, for example, a set of policies or rules may be grouped into a class based on each policy or rule, in the set, associating with a PERMIT flow action. By way of another example, another set of policies or rules may be grouped into another class based on each policy or rule, in the other set, associating with a REDIRECT flow action. The class table (200) may, for example, be implemented using ternary content addressable memory (TCAM). Further, the class table (200) may arrange or order the aforementioned active classes based on class priority (CP) (described below). For example, the class table (200) may arrange the active classes from highest CP to lowest CP.

In one embodiment of the invention, the class table (200) may track the above-mentioned list of active classes through a set of class slots (204A-204N). Each class slot (204A-204N) may represent a table entry, or table row, that may store class metadata pertaining to an active class. The aforementioned class metadata is described in further detail below with respect to FIG. 2B. Furthermore, each class slot (204A-204N) may be indexed or identified by a corresponding class slot index (CSI) (202A-202N), which may indicate a position (e.g., a table entry or table row), in the class table (200), with which the class slot (204A-204N) is associated. The CSI (202A-202N) may be expressed as a numerical value (e.g., a natural number, which may or may not include zero).

Figure 2B:
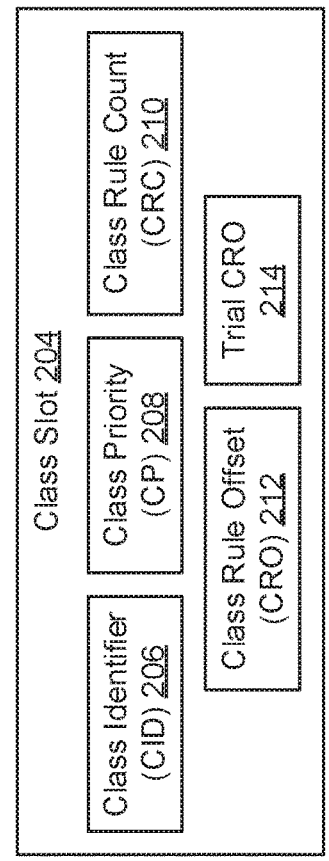
FIG. 2B shows a class slot in accordance with one or more embodiments of the invention.

FIG. 2B shows a class slot in accordance with one or more embodiments of the invention. The class slot (204) may represent a class table (see e.g., FIG. 2A) entry, or table row, that may store class metadata pertaining to an active class programmed on a network device. Accordingly, for a given active class, the class slot (204) may include a class identifier (CID) (206), a class priority (CP) (208), a class rule count (CRC) (210), a class rule offset (CRO) (212), and a trial CRO (214). Each of these class slot (204) components is described below.

In one embodiment of the invention, the CID (206) may refer to an arbitrary-length character string that may uniquely identify (or name) the given active class. The CP (208), on the other hand, may refer to a numerical (e.g., {1, 2, 3, . . . }) or categorical (e.g., {"low", "medium", "high"}) value that may reflect a priority level (or level of importance), relative to other active classes, assigned to the given active class.

In one embodiment of the invention, the CRC (210) may refer to a numerical value (e.g., a positive integer) that may indicate a cardinality (or quantity) of a set of policies or rules grouped by the given active class. Further, the CRO (212) may refer to a numerical value (e.g., a natural number including zero) that may reflect the position of a first policy or rule, of the given active class, in a rule table (described below) (see e.g., FIG. 2C) in relation to a first (or topmost) rule slot positioned in the rule table. For example, if the first policy or rule, of the given active class, occupies the first rule slot in the rule table, then the CRO (210) associated with the given active class may be the natural number zero, indicating that the first policy or rule of the given active class is zero positions away from the first rule slot in the rule table. By way of another example, if the first policy or rule, of the given active class, alternatively occupies the third rule slot in the rule table, then the CRO (210) associated with the given active class may be the natural number two, indicating that the first policy or rule of the given active class is two positions away from the first rule slot in the rule table. Moreover, the trial CRO (214) may refer to a variable that is substantially similar to the CRO (212), however, the trial CRO (214) may track positions of first policies/rules for given active classes relative to a first rule slot in a trial rule table (described below) versus the rule table.

Figure 2C:
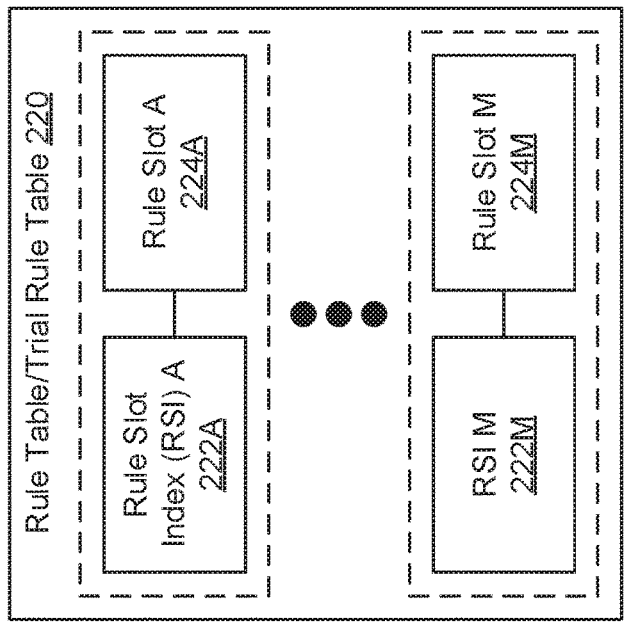
FIG. 2C shows a rule table in accordance with one or more embodiments of the invention.

FIG. 2C shows a rule table in accordance with one or more embodiments of the invention. The rule table (220) may refer to a data structure that maintains a list of active policies or rules programmed on the network device. A policy or rule may refer to a course of action (i.e., one or more flow actions (described below)), pertinent to traffic management or access control, that may be applied to certain network traffic exhibiting properties or attributes that match criteria (i.e., a filter pattern (described below)) for selecting or identifying the policy or rule when a lookup or query is performed on the rule table. The rule table (220) may, for example, be implemented using TCAM. Further, the rule table (220) may arrange or order the aforementioned active policies/rules, within each class (or set of policies/rules), based on a rule priority (RP) (described below). For example, for each class, the rule table (220) may arrange the active policies/rules from highest RP to lowest RP. Moreover, a trial rule table (220) may refer to a data structure that is substantially similar to the rule table (220), however, the trial rule table (220) may be employed to propose policy/rule placements during class modification instruction trial phases (see e.g., FIGS. 8A-8C) in accordance with one or more embodiments of the invention.

In one embodiment of the invention, the rule table (220) may track the above-mentioned list of active policies or rules through a set of rule slots (224A-224N). Each rule slot (224A-224N) may represent a table entry, or table row, that may store policy/rule metadata pertaining to an active policy/rule. The aforementioned policy/rule metadata is described in further detail below with respect to FIG. 2D. Further, each rule slot (224A-224N) may be indexed or identified by a corresponding rule slot index (RSI) (222A-222N), which may indicate a position (e.g., a table entry or table row), in the rule table (220), with which the rule slot (224A-224N) is associated. The RSI (222A-222N) may be expressed as a numerical value (e.g., a natural number, which may or may not include zero).

Figure 2D:
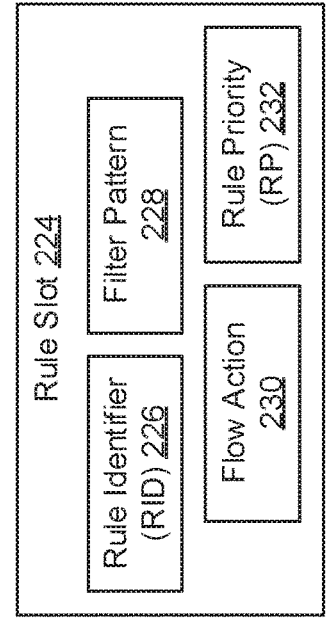
FIG. 2D shows a rule slot in accordance with one or more embodiments of the invention.

FIG. 2D shows a rule slot in accordance with one or more embodiments of the invention. The rule slot (224) may represent a rule table (see e.g., FIG. 2C) entry, or table row, that may store policy or rule metadata pertaining to an active policy/rule programmed on a network device. Accordingly, for a given active policy/rule, the rule slot (224) may include a rule identifier (RID) (226), a filter pattern (228), one or more flow actions (230), and a rule priority (232). Each of these rule slot (224) components is described below.

In one embodiment of the invention, the RID (226) may refer to an arbitrary-length character string that may uniquely identify (or name) the given active policy/rule. The filter pattern (228), on the other hand, may refer to a set of qualifiers (e.g., attributes, properties, etc.) that may, at least in part, define certain network traffic (also referred to as network traffic flow). Examples of qualifiers may include any subset or all of the following network traffic flow identifying information: link layer (i.e., layer-2 (L2)) information—e.g., a source media access control (MAC) address, a destination MAC address, etc.; network layer (i.e., layer-3 (L3)) information—e.g., a source Internet Protocol (IP) address, a destination IP address, a source virtual routing and forwarding (VRF) domain, a destination VRF domain, etc.; transport layer (i.e., layer-4 (L4)) information—e.g., a source network interface, a destination network interface, etc.; and miscellaneous information—e.g., a source virtual local area network (VLAN) tag, a destination VLAN tag, a type of service, an encapsulation protocol. Qualifiers are not limited to the aforementioned examples.

In one embodiment of the invention, a flow action (230) may refer to a given course of action, which may be applied to any network traffic flow that exhibits qualifiers that match the filter pattern (228) associated with the active policy or rule. Examples of a flow action (230) may include, but are not limited to, a PERMIT action, which may allow any network traffic flow(s), matching the filter pattern (228), to proceed towards a respective destination; a DROP or DENY action, which may discard any network traffic flow(s) matching the filter pattern (228); and a REDIRECT or NEXTHOP action, which may redirect any network traffic flow(s), matching the filter pattern (228), to an alternative destination (often for further inspection, processing, etc.). Lastly, the RP (232) may refer to a numerical (e.g., {1, 2, 3, . . . }) or categorical (e.g., {"low", "medium", high"}) value that may reflect a priority level (or level of importance), relative to other active policies/rules, assigned to the given active policy/rule. Other than serving as the metric through which the active policies or rules may be ordered and stored in the rule table, the RP (232) may be used to select a rule slot (224) from a possibility of multiple rule slots (224) to which a network traffic flow may match when a lookup or query, performed on the rule table, transpires. In event that multiple rule slots (224) are identified, based on the rule table lookup or query, the rule slot (224) reflecting the highest RP (232) may be selected.

Figure 2E:
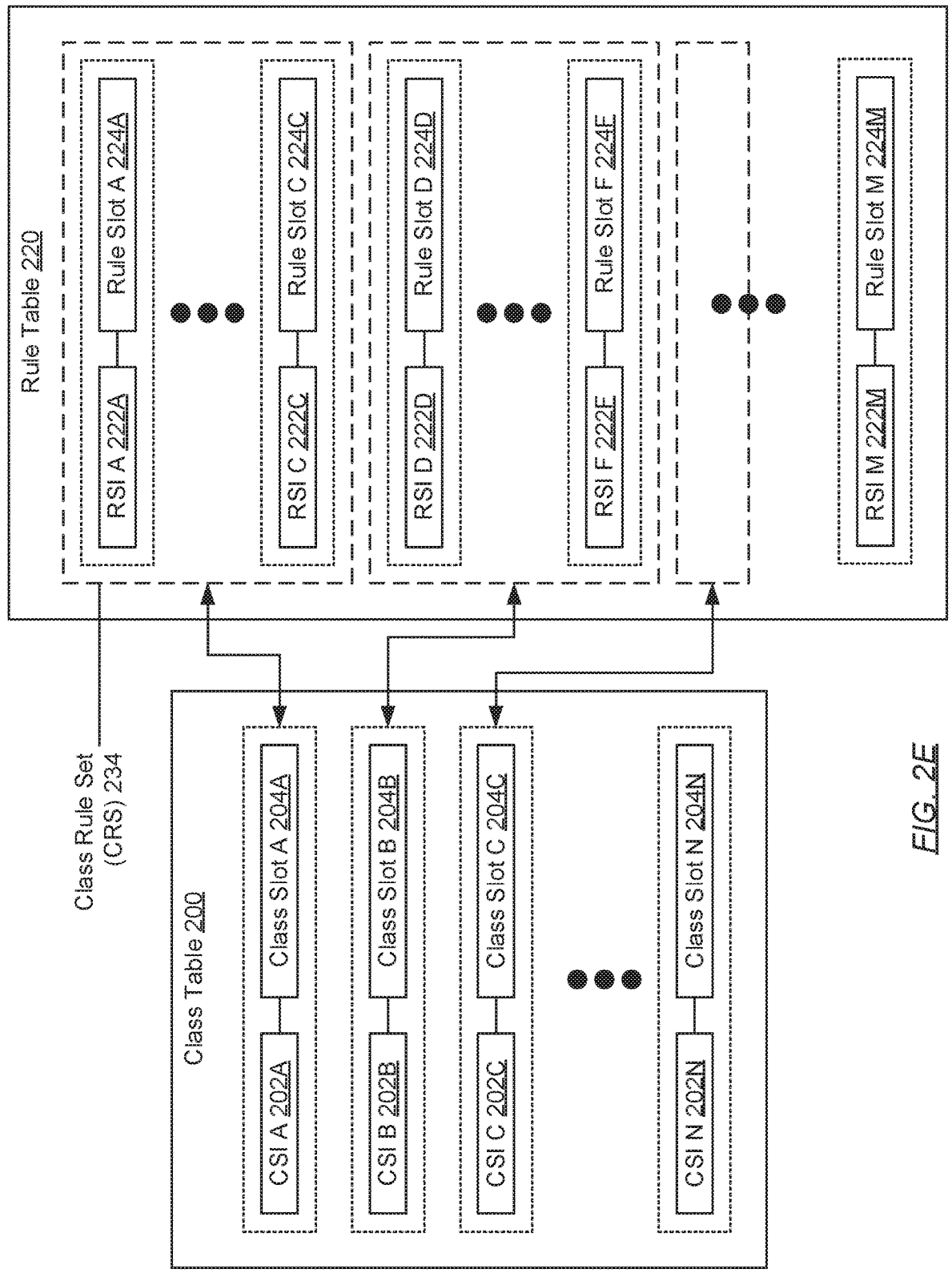
FIG. 2E shows a relationship between a class table and a rule table in accordance with one or more embodiments of the invention.

FIG. 2E shows a relationship between a class table and a rule table in accordance with one or more embodiments of the invention. Specifically, as described above, the class table (200), residing on a network device, may represent a data structure that maintains a list of active classes (i.e., sets of policies or rules) programmed on the network device. Metadata describing each active class is stored in a class slot (204A-204N) of the class table, where each class slot (204A-204N) may be identified by a respective class slot index (CSI) (202A-202N). Further, the active classes may be tracked in the class table (200) by class priority (CP) (described above) such that, for example, metadata for an active class associated with a highest CP may be stored in the topmost class slot (204A), whereas metadata for an active class associated with a lowest CP may be stored in the bottommost class slot (204N).

In one embodiment of the invention, also described above, the rule table (220), residing on the network device, may refer to a data structure that maintains a list of active policies or rules programmed on the network device. Metadata describing each active policy/rule is stored in a rule slot (224A-224M) of the rule table (220), where each rule slot (224A-224M) may be identified by a respective rule slot index (RSI) (222A-222M). Further, a set of one or more contiguous (i.e., side-by-side) rule slots (e.g., 224A-224C), storing metadata for a set of one or more related active policies or rules, respectively, may represent a class rule set (CRS) (234) for a given active class with metadata stored in a class slot (e.g., 204A) of the class table (200). Moreover, the one or more active policies or rules, constituting a given CRS (234), may be tracked within the CRS (234) by rule priority (RP) (described above) such that, for example, metadata for an active policy/rule associated with a highest RP of the CRS (234) may be stored in the topmost rule slot (224A) for the CRS (234), whereas metadata for an active policy/rule associated with a lowest RP of the CRS (234) may be stored in the bottommost rule slot (224C).

Figure 2H:
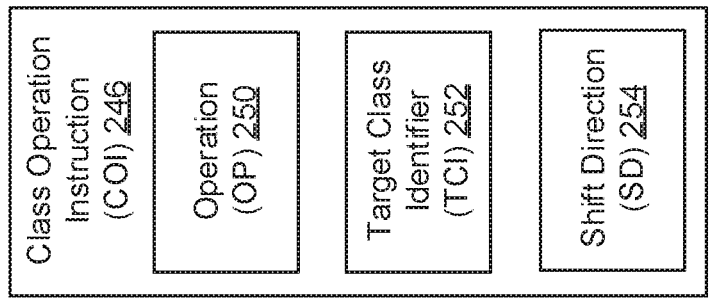
FIG. 2H shows a class operation instruction in accordance with one or more embodiments of the invention.
Figure 2F:
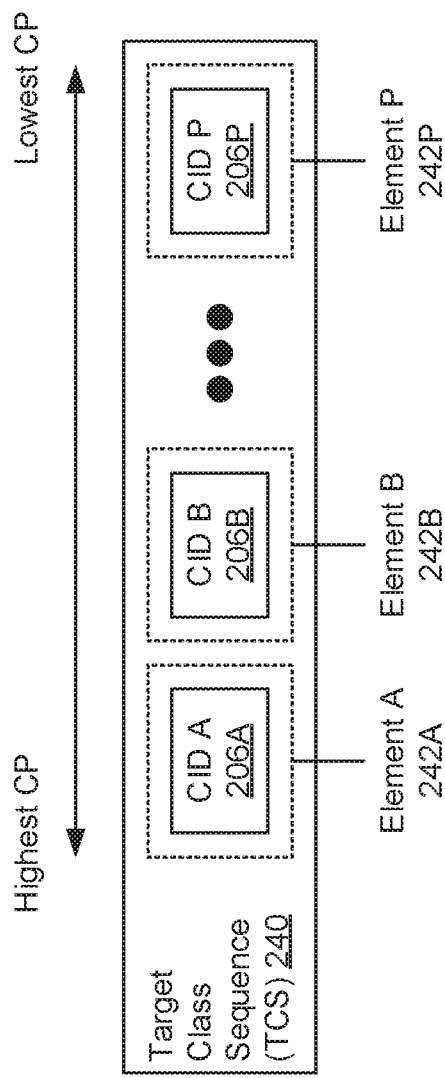
FIG. 2F shows a target class sequence in accordance with one or more embodiments of the invention.

FIG. 2F shows a target class sequence (TCS) in accordance with one or more embodiments of the invention. The TCS (240) may refer to a data structure (e.g., an array or vector) that stores a desired sequence of class identifiers (CIDs) (206A-206P) associated with classes based on their relative class priorities (CPs) (described above) (see e.g., FIG. 2B). The aforementioned desired sequence may translate to a desired sequence in which classes on a network device ought to be arranged, in a class table (see e.g., FIG. 2A or FIG. 2E), following the commitment of one or more class modification instructions (described below) (see e.g., FIG. 2J).

In one embodiment of the invention, the TCS (240) may exist in an initialized or initial state. In this state, each CID (206A-206P) stored in the TCS (240) may associate with an active class sought-to-be-retained on the network device or, alternatively, an active class sought-to-be-removed from the network device. In another embodiment of the invention, the TCS (240) may exist in an updated or final state. In this state, each CID (206A-206P) stored in the TCS (240) may associate with an active class sought-to-be-retained on the network device or, alternatively, a new class sought-to-be-programmed on the network device.

In one embodiment of the invention, the TCS (240) may include a collection of elements (242A-242P). Each element (242A-242P) may store a value or variable—i.e., a CID (206A-206P). Each CID (206A-206P) may refer to an arbitrary-length character string that uniquely identifies (or names) an active class sought-to-be-retained on the network device, an active class sought-to-be-removed from the network device, and/or a new class sought-to-be-programmed on the network device. Further, the set of CIDs (206A-206P) may be stored or arranged in the TCS (240) based on associated relative CPs. Each active or new class, identified by a CID (206A-206P) stored in the TCS (240), may be assigned a CP indicating the priority level (or level of importance), relative to other classes sought-to-be-retained on, sought-to-be-removed from, and/or sought-to-be-programmed on the network device, which is assigned to the active or new class. By way of an example, the set of CIDs (206A-206P), stored in the TCS (240), may be arranged or ordered from a highest CP to a lowest CP. Moreover, each element (242A-242P) of the TCS (240) may be identified by an index (not shown), which may indicate a location or position of the element (242A-242P) along a length of the TCS (240).

Figure 2G:
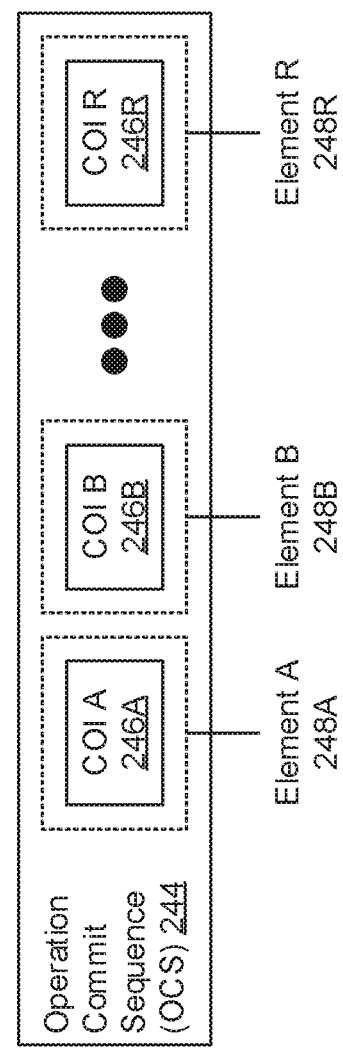
FIG. 2G shows an operation commit sequence in accordance with one or more embodiments of the invention.

FIG. 2G shows an operation commit sequence (OCS) in accordance with one or more embodiments of the invention. The OCS (244) may refer to a data structure (e.g., an array or vector) that stores a desired sequence of class operation instructions (COIs) (246A-246R) (described below). When executed in the aforementioned desired sequence, the COIs (246A-246R) collectively reprogram a rule table (see e.g., FIG. 2C or FIG. 2E), on the network device, which reflects the commitment of one or more class modification instructions (described below) (see e.g., FIG. 2J). Further, reprogramming of the rule table may entail performing ordered-shifts (i.e., the copying or migration of rule metadata from source rule slots to target rule slots) that effect the retaining, removal, and/or insertion of class rule sets in the rule table and, subsequently, on the network device. These ordered-shifts enable the in-place updating of active policies or rules programmed on the network device while minimizing a window in which the active policies or rules may be disrupted by the updating.

In one embodiment of the invention, the OCS (244) may include a collection of elements (248A-248R). Each element (248A-248R) may store a value or variable—i.e., a COI (246A-246R). Each COI (246A-246R) may refer to a data structure that includes, or may refer to a composite data object that encapsulates, a set of parameters defining a class operation (described below) (see e.g., FIG. 2H). Furthermore, each element (248A-248R) of the OCS (244) may be identified by an index (not shown), which may indicate a location or position of the element (248A-248R) along a length of the OCS (244).

FIG. 2H shows a class operation instruction (COI) in accordance with one or more embodiments of the invention. The COI (246) may refer to a data structure that includes, or may refer to a composite data object that encapsulates, a set of parameters defining a class operation. In turn, a class operation may refer to a procedure in which ordered-shifts (described above) (see e.g., FIG. 2G) may be performed to effect the retaining, removal, and/or insertion of class rule sets (CRSs) in a rule table (see e.g., FIG. 2C or FIG. 2E) on a network device.

In one embodiment of the invention, the above-mentioned set of parameters, defining a given class operation, may include an operation (OP) (250), a target class identifier (TCI) (252), and a shift direction (SD) (254). The OP (250) may pertain to either an ADD operation or a MOVE operation. An ADD operation may entail the insertion of a CRS into the rule table, starting at a select rule slot identified by a select rule slot index (RSI). Conversely, a MOVE operation may entail the ordered-shifting (i.e., copying or migration) of rule metadata from select source rule slots to select target rule slots identified by select source and target RSIs, respectively. Further, the TCI (252) may refer to a class identifier (CID) assigned to an existing class already programmed on the network device or a new class sought-to-be-programmed on the network device. The CRS, with which the class operation affects, may be grouped by or associated with the aforementioned existing or new class. Moreover, the SD (254) may refer to a direction associated with a given MOVE operation. That is, the SD (254) may specify whether the ordered-shifting of rule metadata, pertinent to a CRS, ought to migrate from a lower priority (i.e., lower positioned) source rule slot to a higher priority (i.e., higher positioned) target rule slot; or, alternatively, from a higher priority (i.e., higher positioned) source rule slot to a lower priority (i.e., lower positioned) target rule slot. The SD (254) associated with an ADD operation may be disclosed herein as NONE, indicating that ordered-shifts are not performed during ADD operations.

FIG. 2I shows a new class cache in accordance with one or more embodiments of the invention. The new class cache (260) may represent a data structure that may, either temporarily or permanently, maintain metadata describing new class(es) sought-to-be-programmed on a network device. The new class cache (260) may be implemented using cache memory (i.e., random access memory (RAM)) or persistent storage. Further, the new class cache (260) may store and track new class metadata pertinent to one or more new classes using one or more cache entries (262A-262S), respectively. Each cache entry (262A-262S) may include, but is not limited to, a class identifier (CID) (206), a trial rule slot index (RSI) (222), a class priority (CP) (208), a class rule set (CRS) (234), and a target class sequence (TCS) index (264). Each of these new class metadata is described below.

In one embodiment of the invention, the CID (206) may refer to an arbitrary-length character string that may uniquely identify (or name) the given new class. The trial RSI (222), on the other hand, may refer to a numerical value (e.g., a natural number, which may or may not include zero) that may indicate a position (e.g., a table entry or table row), in a trial rule table (see e.g., FIG. 2C or FIG. 2E), with which a select rule slot may be associated. The select rule slot may pertain to a first (or topmost) unoccupied rule slot, in the trial rule table, when a search thereon may be performed during class modification instruction trial phases (see e.g., FIGS. 8A-8C) in accordance with embodiments of the invention. More specifically, the select rule slot may refer to a starting position, in the trial rule table, wherein the CRS (234) of the given new class may be inserted.

In one embodiment of the invention, the CP (208) may refer to a numerical (e.g., {1, 2, 3, . . . }) or categorical (e.g., {"low", "medium", "high" }) value that may reflect a priority level (or level of importance) assigned to the given new class in relation to other existing and/or new classes. Meanwhile, the CRS (234) may refer to a set of one or more related policies or rules that which the given new class groups. Lastly, the TCS index (264) may refer to a numerical value (e.g., a natural number, which may or may not include zero) that may indicate a position (e.g., an element) in a TCS (see e.g., FIG. 2F). The TCS index (264) may subsequently be used to identify a class slot, in the class table, wherein class metadata (see e.g., FIG. 2B) describing the given new class may be stored during class modification instruction commit phases (see e.g., FIGS. 11A and 11B) in accordance with embodiments of the invention.

FIG. 2J shows a class modification batch in accordance with one or more embodiments of the invention. The class modification batch (270) may represent a file or script that includes a set of class modification instructions (272A-272T), which may be processed in sequence. Each class modification instruction (272A-272T) may include a class operation (274) and class information (276) relevant to the class operation (274). The class operation (274) may either be directed to the class removal of an existing class from, or the class insertion of a new class on, the network device.

In one embodiment of the invention, should the class operation (274) be directed to the class removal of an existing class from the network device, the class information (276) may include a class identifier (CID) (206). In this embodiment, the CID (206) may refer to an arbitrary-length character string that may uniquely identify (or name) the existing class sought-to-be-removed. In another embodiment of the invention, should the class operation (274) be directed to the class insertion of a new class on the network device, the class information (276) may include a CID (206), a class priority (CP) (208), and a class rule set (CRS) (234). In this embodiment, the CID (206) may refer to an arbitrary-length character string that may uniquely identify (or name) the new class sought-to-be-programmed; the CP (208) may refer to a numerical (e.g., {1, 2, 3, . . . }) or categorical (e.g., {"low", "medium", "high" }) value that may reflect a priority level (or level of importance) assigned to the new class in relation to other existing and/or new classes; and the CRS (234) may refer to a set of one or more related policies or rules that which the new class may group.

FIG. 2K shows a deferred operation stack (DOS) in accordance with one or more embodiments of the invention. The DOS (280) may represent a data structure or a data object container that operates (e.g., inserts or removes data objects) based on a last-in, first-out (LIFO) principle. That is, a last data object (i.e., a latest data object) inserted (or stored) in the DOS (280) may be the first data object removed (or extracted) from the DOS (280). Conversely, a first data object (i.e., an oldest data object) inserted (or stored) in the DOS (280) may be the last data object removed (or extracted) therefrom. More specifically, the DOS (280) may represent a linear collection of temporarily stored data objects. Each data object may encompass a class operation instruction (COI) (246A-246V) (described above) (see e.g., FIG. 2H).

Figure 3A:
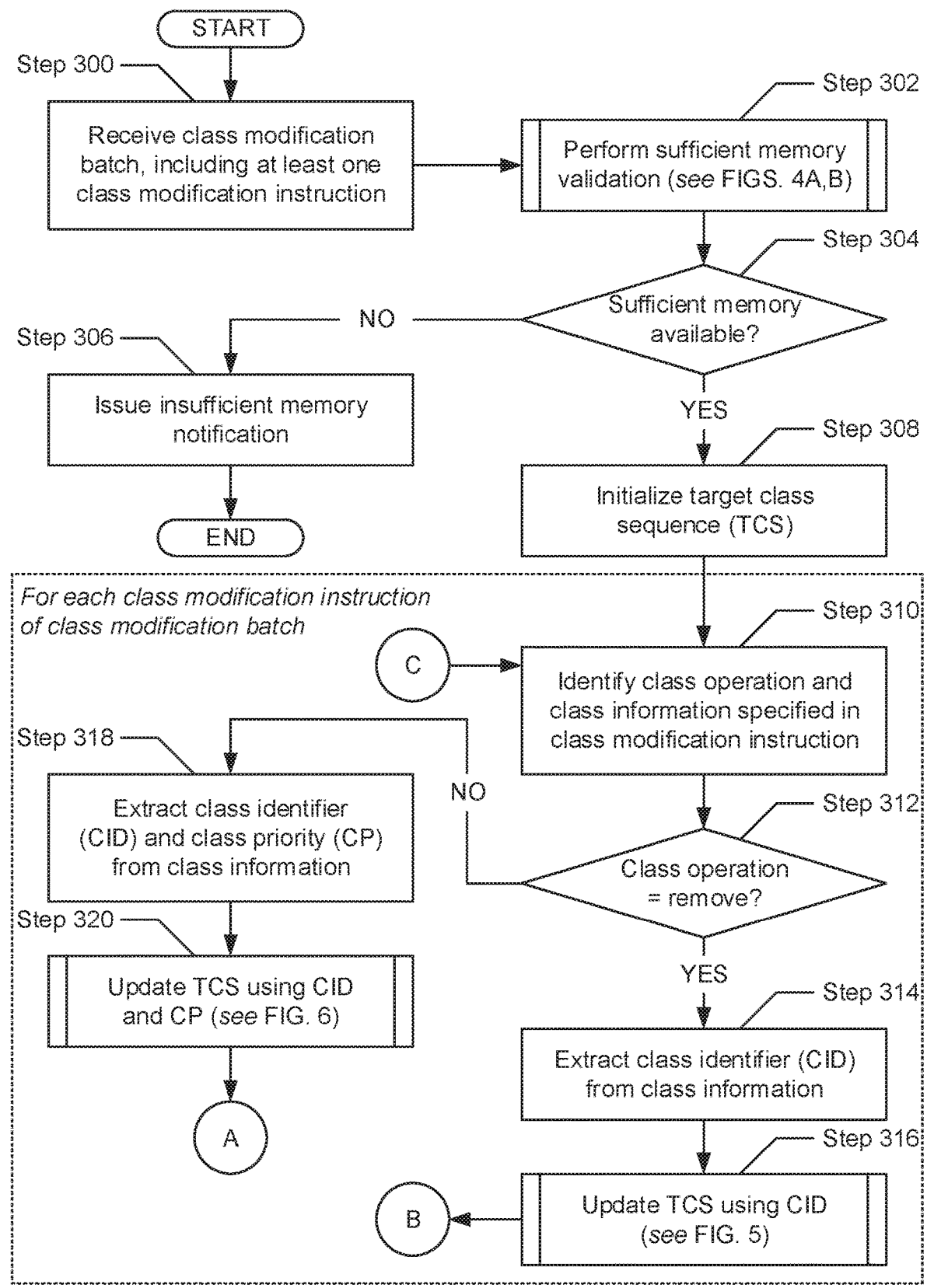
FIGS. 3A and 3B show flowcharts describing a method for processing class modification batches in accordance with one or more embodiments of the invention.
Figure 3B:
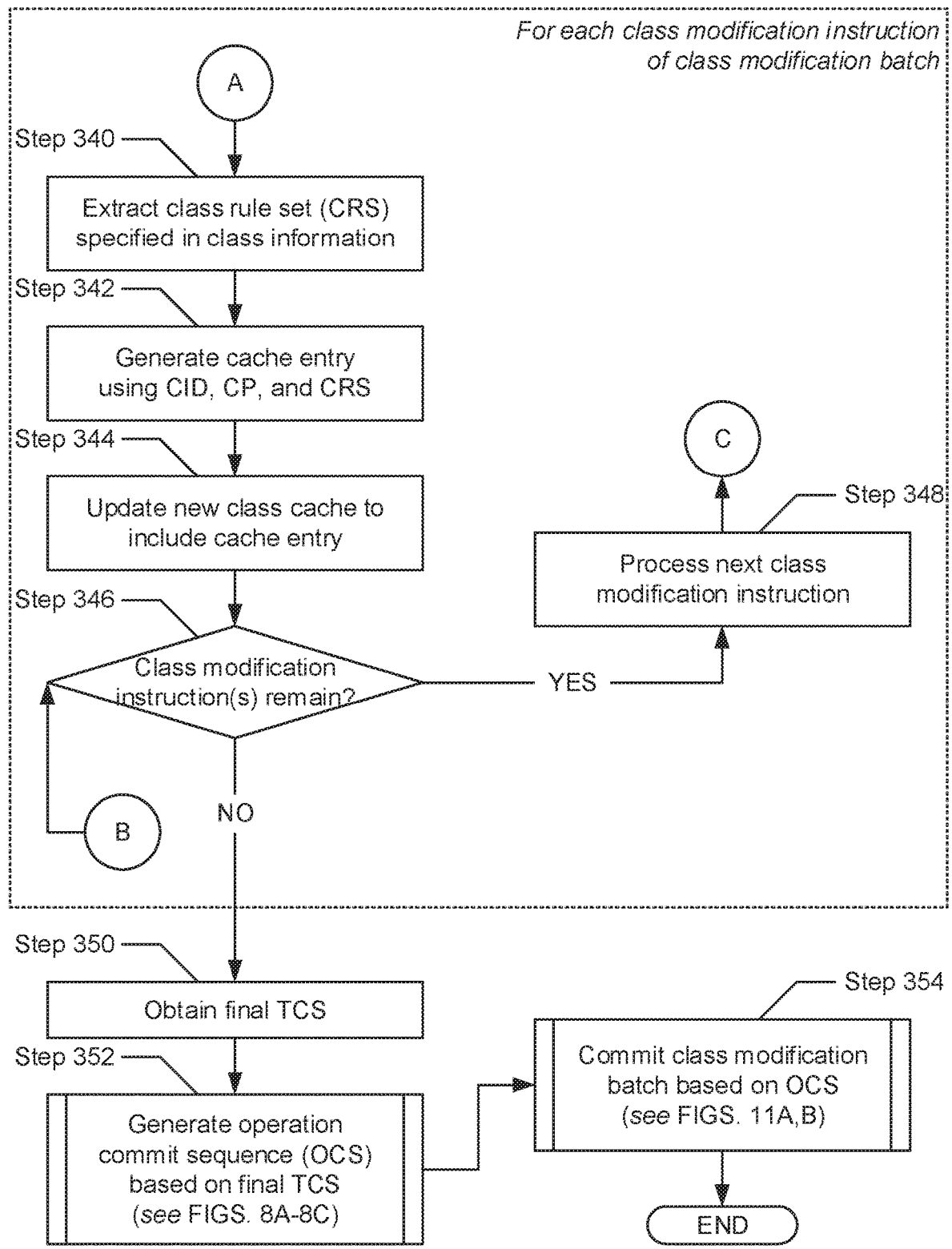

FIGS. 3A and 3B show flowcharts describing a method for processing class modification batches in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 3A, in Step 300, a class modification batch (see e.g., FIG. 2J) is received. In one embodiment of the invention, the received class modification batch may include at least one class modification instruction. Each class modification instruction may, in turn, include: a class operation—e.g., class removal or class insertion; and class information—e.g., class identifier (CID), class priority (CP), and/or class rule set (CRS)—relevant to the class operation.

In Step 302, a sufficient memory validation is performed. The aforementioned sufficient memory validation is described in further detail below with respect to FIGS. 4A and 4B. In Step 304, based on the sufficient memory validation (performed in Step 302), a determination is made as to whether a rule table (see e.g., FIG. 2C or FIG. 2E), on the network device, has enough available memory to commit the class modification batch (received in Step 300). Accordingly, in one embodiment of the invention, if it is determined that sufficient memory is available, then the process may proceed to Step 308. On the other hand, in another embodiment of the invention, if it is alternatively determined that insufficient memory is available, then the process may alternatively proceed to Step 306.

In Step 306, after determining (in Step 304) that insufficient memory is available to commit the class modification batch (received in Step 300), an insufficient memory notification is issued. That is, in one embodiment of the invention, the insufficient memory notification may be generated and presented to a user through a device configuration interface (DCI) (see e.g., FIG. 1) on the network device. Alternatively, in another embodiment of the invention, the insufficient memory notification may be generated and presented to a user through a central management service (CMS) (see e.g., FIG. 1) operatively connected to the network device.

In Step 308, after alternatively determining (in Step 304) that sufficient memory is available to commit the class modification batch (received in Step 300), a target class sequence (TCS) (see e.g., FIG. 2F) is initialized. In one embodiment of the invention, the TCS may represent a data structure (e.g., an array or vector), which may store a collection of elements. Further, initialization of the TCS may entail: (a) identifying a class table (see e.g., FIG. 2A or FIG. 2E) residing on the network device; (b) for each class slot (starting at the first or topmost class slot) (see e.g., FIG. 2B) allocated in the class table, identifying a CID (if any) specified therein; and (c) copying the identified CID from the class slot into the TCS. Accordingly, an initialized TCS may include a collection of elements, where each element stores a different CID copied from a class slot of the class table. Moreover, within the initialized TCS, the set of CIDs stored therein may be arranged or ordered from highest CP to lowest CP.

Hereinafter, Steps 310 through 348 are to be performed for each class modification instruction included in the class modification batch (received in Step 300). For example, if three class modification instructions had been included in the received class modification batch, then the aforementioned subset of steps (i.e., Steps 310 through 348) would be performed three times, followed by the process exiting the loop and arriving at Step 350 (see e.g., FIG. 3B).

With the above in mind, in Step 310, for a class modification instruction (i.e., a current class modification instruction being processed), a class operation and class information (see e.g., FIG. 2J) are identified from therein. Thereafter, in Step 312, a determination is made as to whether the class operation (identified in Step 310) is directed to the class removal of an existing (or pre-programmed) class on the network device. The determination may entail further assessing whether the class information (also identified in Step 310) includes more than a CID therein. That is, in one embodiment of the invention, if the identified class information only includes a CID, then the identified class operation may be directed to the removal of an existing class on the network device, and the process may proceed to Step 314. On the other hand, if the identified class information includes more than just a CID, then the identified class operation may be directed to the insertion of a new class on the network device, and the process may alternatively proceed to Step 318.

In Step 314, after determining (in Step 312) that the class operation (identified in Step 310) is directed to the class removal of an existing (or pre-programmed) class on the network device, a CID is extracted from the class information (also identified in Step 310). In one embodiment of the invention, the extracted CID may refer to an arbitrary-length character string that uniquely identifies (or names) an existing class pre-programmed onto the network device. Hereafter, in Step 316, the TCS (initialized in Step 308) is updated using the CID (extracted in Step 314). Updating of the TCS using the CID is described in further detail below with respect to FIG. 5. Following the aforementioned TCS update, the process may proceed to Step 346 (see e.g., FIG. 3B).

In Step 318, after alternatively determining (in Step 312) that the class operation (identified in Step 310) is directed to the class insertion of a new class on the network device, a CID and a CP are extracted from the class information (also identified in Step 310). In one embodiment of the invention, the extracted CP may refer to a numerical or categorical value that reflects a priority level (or level of importance) assigned to the new class in relation to other classes (e.g., the existing classes pre-programmed onto the network device). Hereafter, in Step 320, the TCS (initialized in Step 308) is updated using the CID and the CP (extracted in Step 318). Updating of the TCS using the CID and the CP is described in further detail below with respect to FIG. 6. Following the aforementioned TCS update, the process may proceed to Step 340 (see e.g., FIG. 3B).

Turning to FIG. 3B, in Step 340, a CRS (see e.g., FIG. 2E) is further extracted from the class information (identified in Step 310). In one embodiment of the invention, the CRS may refer to a set of one or more policies (or rules) that have been grouped into a class. In Step 342, a cache entry (see e.g., FIG. 2I) is generated. In one embodiment of the invention, the generated cache entry may be initialized using the CID and CP (extracted in Step 318), the CRS (extracted in Step 340), and null values for a trial rule slot index (RSI) and TCS index, respectively. Thereafter, in Step 344, a new class cache (see e.g., FIG. 2I) is updated to include the cache entry (generated in Step 342).

In Step 346, a determination is made as to whether additional class modification instructions (received by way of the class medication batch in Step 300) remain to be processed. Accordingly, in one embodiment of the invention, if it is determined that at least one other class modification instruction remains to be processed, then the process may proceed to Step 348. On the other hand, in another embodiment of the invention, if it is alternatively determined that no additional class modification instructions remain to be processed, then the process may alternatively proceed to Step 350.

In Step 348, after determining (in Step 346) that at least one other class modification instruction (received in Step 300) remains to be processed, a next class modification instruction (included in the above-mentioned class modification batch) is processed. Processing the next class modification instruction may entail the process proceeding to Step 310 (see e.g., FIG. 3A), where a class operation and class information, respective to the next class modification instruction, may be identified.

In Step 350, after alternatively determining (in Step 346) that no more class modification instructions (received in Step 300) remain to be processed, a final TCS is obtained. In one embodiment of the invention, the final TCS may derive from updates (performed either in Step 316 or Step 320) to the TCS (initialized in Step 308), which may have transpired during the processing of the class modification instruction(s). An example of a final TCS, obtained from an exemplary initial TCS, is illustrated below with respect to FIG. 13D.

In Step 352, an operation commit sequence (OCS) (see e.g., FIG. 2G) is generated. Specifically, in one embodiment of the invention, the OCS may be generated based on the final TCS (obtained in Step 350). The OCS may represent a data structure that stores a set of class operation instructions (COIs) (see e.g., FIG. 2H) in a collection of elements, respectively. Generation of the OCS, based on the final TCS, is described in further detail below with respect to FIGS. 8A-8C.

In Step 354, the class modification batch (received in Step 300) is committed. Specifically, in one embodiment of the invention, the class modification batch may be committed based on the OCS (generated in Step 352). The aforementioned commitment of the class modification batch is described in further detail below with respect to FIGS. 11A and 11B.

Figure 4A:
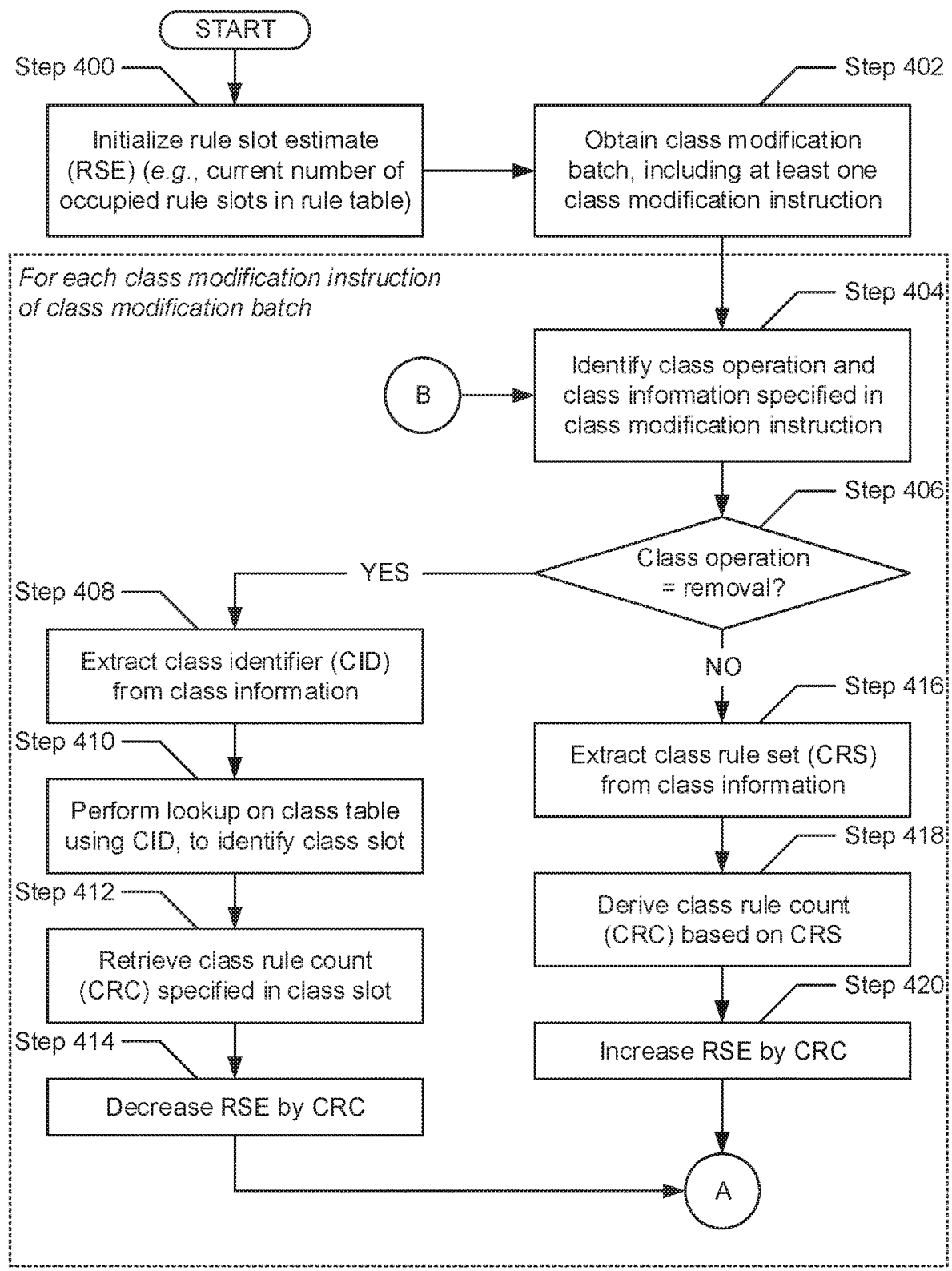
FIGS. 4A and 4B show flowcharts describing a method for sufficient memory validation in accordance with one or more embodiments of the invention.
Figure 4B:
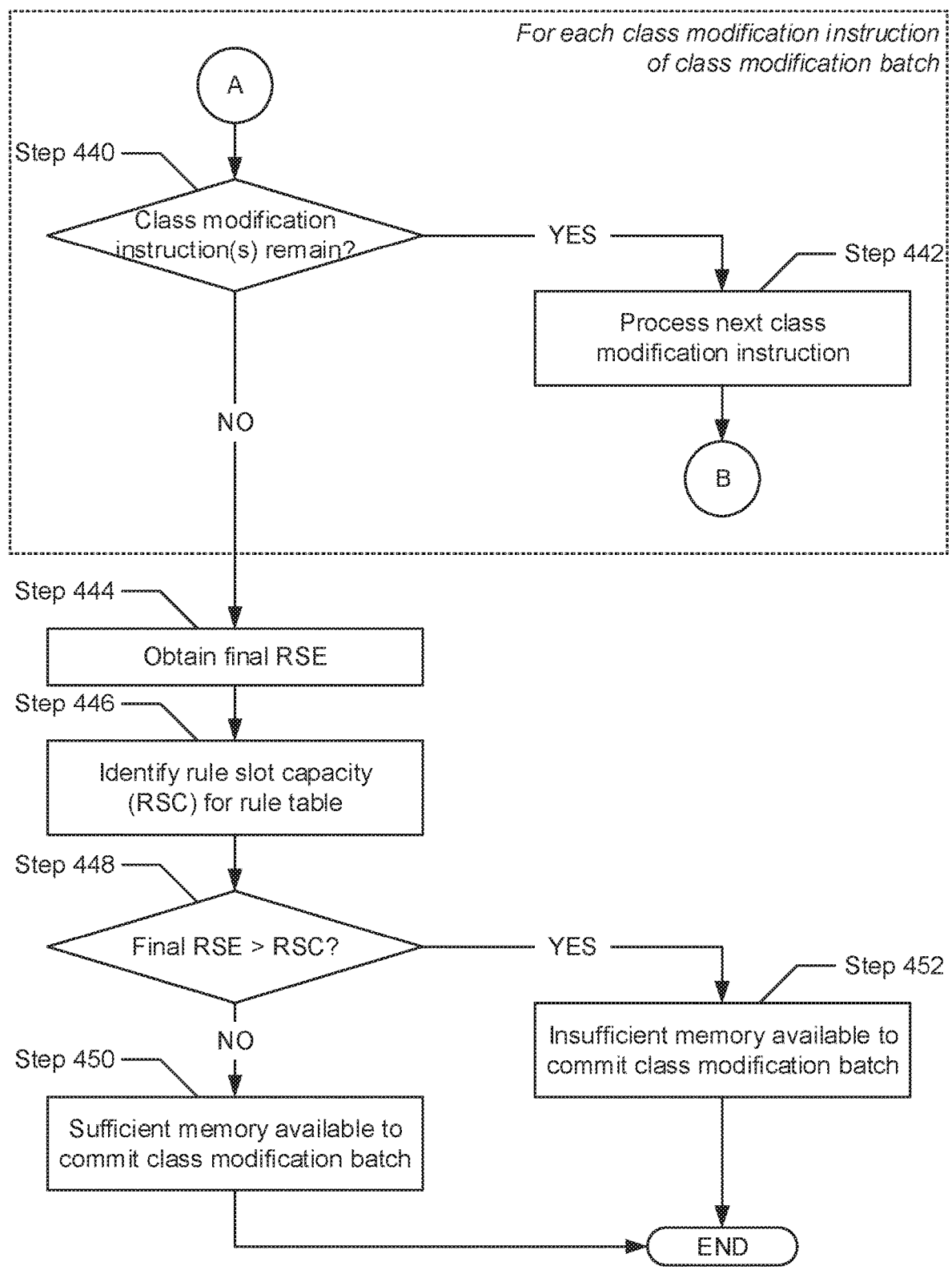

FIGS. 4A and 4B show flowcharts describing a method for sufficient memory validation in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 4A, in Step 400, a variable for storing a rule slot estimate (RSE) is initialized. In one embodiment of the invention, initialization of the RSE may entail identifying a current cardinality (or number) of rule slots, in a rule table (see e.g., FIG. 2C or FIG. 2E), which are occupied or non-empty. An occupied or non-empty rule slot may refer to a rule slot in which rule information (e.g., a rule identifier (RID), a filter pattern, one or more flow actions, and a rule priority (RP)), respective to a policy or rule programmed on the network device, may reside. Accordingly, the RSE may be expressed as a numerical value quantifying a set of rule slots, in the rule table, that may be occupied or non-empty.

In Step 402, a class modification batch (see e.g., FIG. 2J) is obtained. In one embodiment of the invention, the obtained class modification batch may include at least one class modification instruction. Each class modification instruction may, in turn, include: a class operation—e.g., class removal or class insertion; and class information—e.g., class identifier (CID), class priority (CP), and/or class rule set (CRS)—relevant to the class operation.

Hereinafter, Steps 404 through 442 are to be performed for each class modification instruction included in the class modification batch (obtained in Step 402). For example, if three class modification instructions had been included in the obtained class modification batch, then the aforementioned subset of steps (i.e., Steps 404 through 442) would be performed three times, followed by the process exiting the loop and arriving at Step 444 (see e.g., FIG. 4B).

With this in mind, in Step 404, for a class modification instruction (i.e., a current class modification instruction being processed), a class operation and class information (see e.g., FIG. 2J) are identified from therein. Thereafter, in Step 406, a determination is made as to whether the class operation (identified in Step 404) is directed to the class removal of an existing (or pre-programmed) class on the network device. The determination may entail further assessing whether the class information (also identified in Step 404) includes more than a CID therein. That is, in one embodiment of the invention, if the identified class information only includes a CID, then the identified class operation may be directed to the removal of an existing class on the network device, and the process may proceed to Step 408. On the other hand, if the identified class information includes more than just a CID, then the identified class operation may be directed to the insertion of a new class on the network device, and the process may alternatively proceed to Step 416.

In Step 408, after determining (in Step 406) that the class operation (identified in Step 404) is directed to the class removal of an existing (or pre-programmed) class on the network device, a CID is extracted from the class information (also identified in Step 404). In one embodiment of the invention, the extracted CID may refer to an arbitrary-length character string that uniquely identifies (or names) an existing class pre-programmed onto the network device.

In Step 410, a lookup is performed on a class table (see e.g., FIG. 2A or FIG. 2E), residing on the network device, using the CID (extracted in Step 408). In one embodiment of the invention, a class slot of the class table may be identified as a result of the lookup. In identifying the aforementioned class slot, the lookup may entail: (a) sequentially or concurrently (i.e., in parallel) comparing the extracted CID with a stored CID in each occupied (or non-empty) class slot allocated in the class table; (b) matching the extracted CID to a stored CID in one of the occupied class slots; and (c) designating the class slot, within which a stored CID matches the extracted CID, as the aforementioned identified class slot.

In Step 412, a class rule count (CRC) is retrieved from the class slot (identified in Step 410) (see e.g., FIG. 2B). In one embodiment of the invention, the CRC may refer to a numerical value (e.g., a positive integer) that may indicate a cardinality (or quantity) of a set of policies or rules grouped by the existing class (i.e., the existing class sought to be removed). Thereafter, in Step 414, the RSE (either initialized in Step 400 or modified in Steps 414 or 420 through the processing of previous class modification instructions, if any) is decreased by the numerical value representative of the CRC (retrieved in Step 412). For example, if a current value of the RSE is ten, and a value of the CRC is found to be three, then the resulting (or updated) value of the RSE becomes the difference of these two values, or in this non-limiting case, the numerical value of seven. Following the aforementioned RSE update (i.e., decrease in value), the process may proceed to Step 440 (see e.g., FIG. 4B).

In Step 416, after alternatively determining (in Step 406) that the class operation (identified in Step 404) is directed to the class insertion of a new class on the network device, a CRS is extracted from the class information (also identified in Step 404). In one embodiment of the invention, the CRS may refer to a set of one or more policies (or rules) that have been grouped into a class (e.g., the new class).

In Step 418, a CRC, for the new class sought to be inserted, is derived from the CRS (extracted in Step 406). Specifically, in one embodiment of the invention, the new class CRC may be derived by identifying a cardinality of the extracted CRS. The cardinality of the extracted CRS may refer to the number of policies or rules constituting the extracted CRS. Thereafter, in Step 420, the RSE (either initialized in Step 400 or modified in Steps 414 or 420 through the processing of previous class modification instructions, if any) is increased by the numerical value representative of the new class CRC (derived in Step 418). For example, if a current value of the RSE is ten, and a value of the new class CRC is derived to be three, then the resulting (or updated) value of the RSE becomes the summation of these two values, or in this non-limiting case, the numerical value of thirteen. Following the aforementioned RSE update (i.e., increase in value), the process may proceed to Step 440 (see e.g., FIG. 4B).

Turning to FIG. 4B, in Step 440, a determination is made as to whether additional class modification instructions (obtained by way of the class medication batch in Step 402) remain to be processed. Accordingly, in one embodiment of the invention, if it is determined that at least one other class modification instruction remains to be processed, then the process may proceed to Step 442. On the other hand, in another embodiment of the invention, if it is alternatively determined that no additional class modification instructions remain to be processed, then the process may alternatively proceed to Step 444.

In Step 442, after determining (in Step 440) that at least one other class modification instruction (obtained in Step 402) remains to be processed, a next class modification instruction (included in the above-mentioned class modification batch) is processed. Processing the next class modification instruction may entail the process proceeding to Step 404 (see e.g., FIG. 4A), where a class operation and class information, respective to the next class modification instruction, may be identified.

In Step 444, after alternatively determining (in Step 440) that no more class modification instructions (obtained in Step 402) remain to be processed, a final RSE is obtained. In one embodiment of the invention, the final RSE may derive from updates (performed either in Step 414 or Step 420) to the RSE (initialized in Step 400), which may have transpired during the processing of the class modification instruction(s).

In Step 446, a rule slot capacity (RSC), for the rule table residing on the network device, is identified. In one embodiment of the invention, the RSC may refer to a numerical value (e.g., a positive integer) that may indicate a maximum cardinality (or number) of rule slots that may be allotted to the rule table. The RSC may be contingent on available memory resources, on the network device, which have been reserved for implementing the rule table.

In Step 448, a determination is made as to whether the final RSE (obtained in Step 444) exceeds the RSC (identified in Step 446). In one embodiment of the invention, if it is determined that the final RSE exceeds the RSC, then the process may proceed to Step 452. On the other hand, in another embodiment of the invention, if it is alternatively determined that the final RSE does not exceed (i.e., falls below or equals) the RSC, then the process may alternatively proceed to Step 450.

In Step 450, after determining (in Step 448) that the final RSE (obtained in Step 444) does not exceed the RSC (identified in Step 446), the availability of sufficient memory, to commit the class modification batch, is concluded. On the other hand, in Step 452, after determining (in Step 448) that the final RSE exceeds the RSC, the unavailability of sufficient memory, to commit the class modification batch, is alternatively concluded.

Figure 5:
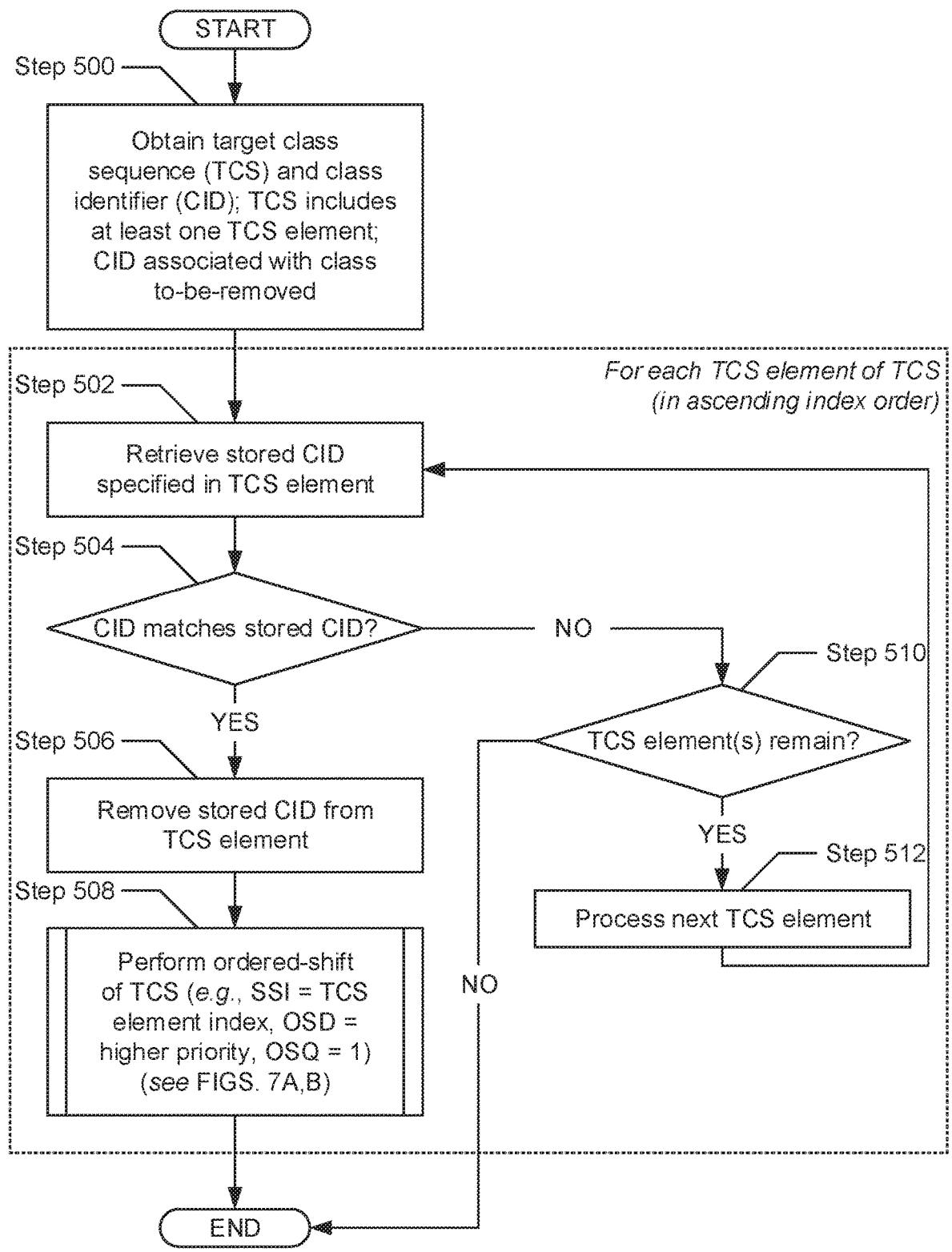
FIG. 5 shows a flowchart describing a method for modifying target class sequences to reflect class removals in accordance with one or more embodiments of the invention.

FIG. 5 shows a flowchart describing a method for modifying target class sequences (TCSs) to reflect class removals in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 5, in Step 500, a target class sequence (TCS) (see e.g., FIG. 2F) and a class identifier (CID) are obtained. In one embodiment of the invention, the obtained TCS may represent a data structure (e.g., an array or vector) that stores a set of CIDs in a collection of elements, respectively, where each element may be identified by an index that indicates a location or position of the element along a length of the obtained TCS. Further, the set of CIDs may be stored in the collection of elements, respectively, in class priority (CP)-order, or from a highest CP to a lowest CP. That is, a first element of the TCS, identified by a first index, may store a first CID associated with a highest CP; a second element of the TCS, identified by a second index, may store a second CID associated with a second highest CP; and so forth, until a last element of the TCS, identified by a last index, may store a last CID associated with a lowest CP. Meanwhile, the obtained CID may refer to an arbitrary-length character string that uniquely identifies (or names) a sought-to-be-removed class (i.e., set of policies or rules) pre-programmed on the network device.

Hereinafter, Steps 502 through 512 are to be performed for each element of the TCS (obtained in Step 500) in ascending index order, and starting at an initial index indicating the position of a first element, of the TCS, which may store a first CID associated with a highest CP.

With this in mind, in Step 502, for a TCS element (i.e., a current element of the TCS being processed), a CID stored therein is retrieved. In Step 504, a determination is made as to whether the CID (obtained in Step 500) matches the CID (retrieved in Step 502). In one embodiment of the invention, if it is determined that the obtained CID matches the retrieved CID, then the process may proceed to Step 506. On the other hand, in another embodiment of the invention, if it is determined that the obtained CID mismatches the retrieved CID, then the process may alternatively proceed to Step 510.

In Step 506, after determining (in Step 504) that the CID (obtained in Step 500) matches the CID (retrieved in Step 502), the latter (or retrieved) CID is removed from the TCS element (i.e., the current element of the TCS being processed). As a result, in one embodiment of the invention, the aforementioned TCS element may subsequently retain a blank or null value.

In Step 508, an ordered-shift on the TCS (obtained in Step 500) is performed. Generally, in one embodiment of the invention, an ordered-shifting of a data structure may refer to the intelligent insertion, migration, and/or removal (i.e., in-place update) of values or variables stored across elements of the data structure, where the in-place update modifies the active policies or rules programmed on the network device while minimizing a window in which the active policies/rules may be disrupted by the modification(s). Specifically, the aforementioned ordered-shift may be defined through the following parameters: (a) a subset start index (SSI)=an index identifying the TCS element currently being processed; (b) an ordered-shift direction (OSD)=higher priority; and (c) an ordered-shift quantity (OSQ)=one. Ordered-shifting of the TCS is described in further detail below with respect to FIGS. 7A and 7B.

In Step 510, after alternatively determining (in Step 504) that the CID (obtained in Step 500) mismatches the CID (retrieved in Step 502), a determination is made as to whether additional elements of the TCS (also obtained in Step 500) remain to be processed. Accordingly, in one embodiment of the invention, if it is determined that at least one other TCS element remains to be processed, then the process may proceed to Step 512. On the other hand, in another embodiment of the invention, if it is alternatively determined that no more TCS elements remain to be processed, then the process ends.

In Step 512, after determining (in Step 510) that at least one other TCS element remains to be processed, a next TCS element (identified by a next index in ascending order) is processed. Processing the next TCS element may entail the process proceeding to Step 502, where a CID stored in the next TCS element may be retrieved therefrom.

Figure 6:
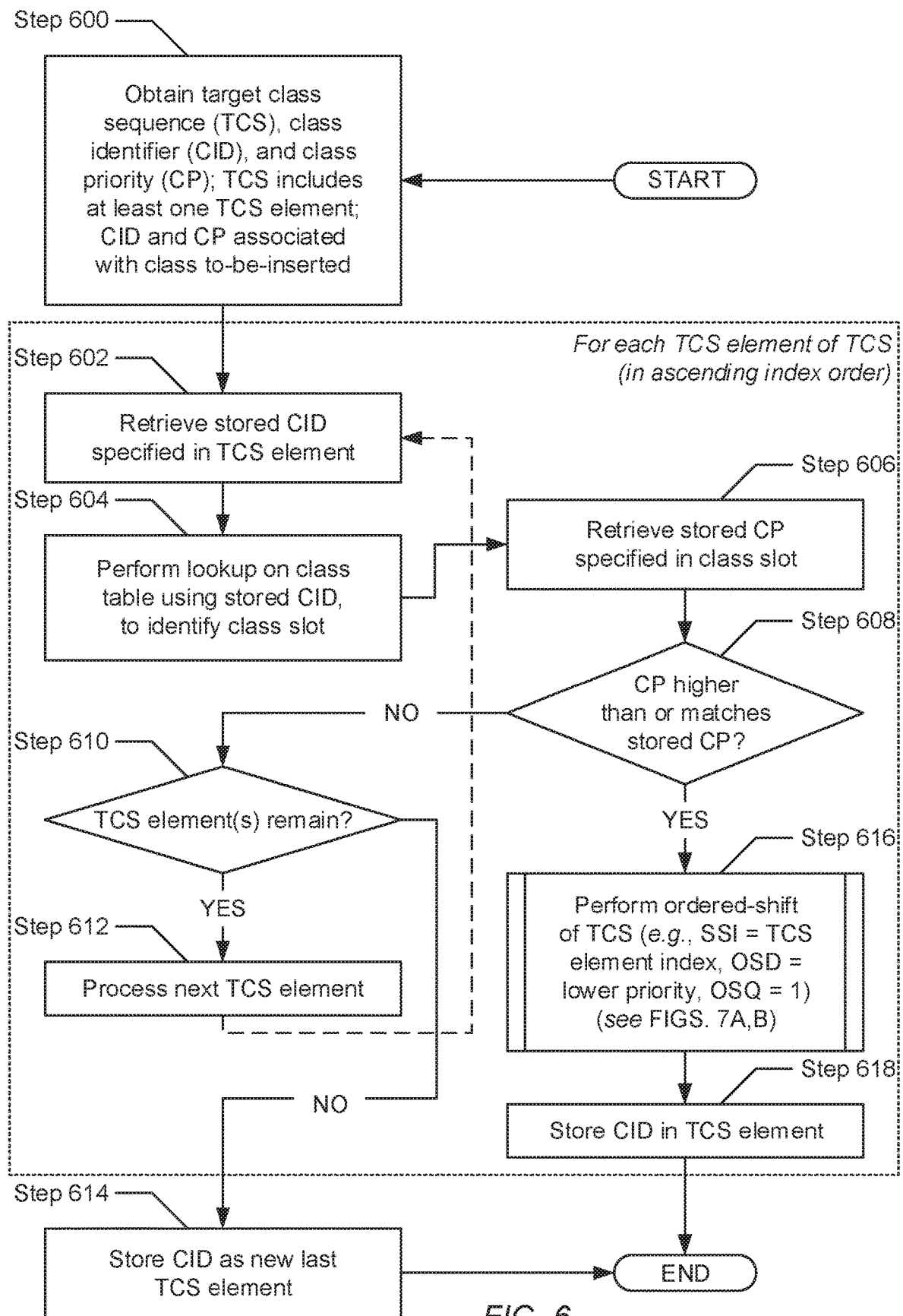
FIG. 6 shows a flowchart describing a method for modifying target class sequences to reflect class insertions in accordance with one or more embodiments of the invention.

FIG. 6 shows a flowchart describing a method for modifying target class sequences (TCSs) to reflect class insertions in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 6, in Step 600, a target class sequence (TCS) (see e.g., FIG. 2F), a class identifier (CID), and a class priority (CP) are obtained. In one embodiment of the invention, the obtained TCS may represent a data structure (e.g., an array or vector) that stores a set of CIDs in a collection of elements, respectively, where each element may be identified by an index that indicates a location or position of the element along a length of the obtained TCS. Further, the set of CIDs may be stored in the collection of elements, respectively, in class priority (CP)-order, or from a highest CP to a lowest CP. That is, a first element of the TCS, identified by a first index, may store a first CID associated with a highest CP; a second element of the TCS, identified by a second index, may store a second CID associated with a second highest CP; and so forth, until a last element of the TCS, identified by a last index, may store a last CID associated with a lowest CP. Meanwhile, the obtained CID may refer to an arbitrary-length character string that uniquely identifies (or names) a sought-to-be-inserted class (i.e., set of policies or rules) on the network device, whereas the obtained CP may refer to a numerical or categorical value that reflects a priority level (or level of importance) assigned to the sought-to-be-inserted class, which may be relative to other classes (e.g., the existing or pre-programmed classes) on the network device.

Hereinafter, Steps 602 through 618 are to be performed for each element of the TCS (obtained in Step 600) in ascending index order, and starting at an initial index indicating the position of a first element, of the TCS, which may store a first CID associated with a highest CP.

With this in mind, in Step 602, for a TCS element (i.e., a current element of the TCS being processed), a CID stored therein is retrieved. In Step 604, a lookup is performed on a class table (see e.g., FIG. 2A or FIG. 2E), residing on the network device, using the CID (retrieved in Step 602). In one embodiment of the invention, a class slot of the class table may be identified as a result of the lookup. In identifying the aforementioned class slot, the lookup may entail: (a) sequentially or concurrently (i.e., in parallel) comparing the retrieved CID with a stored CID in each occupied (or non-empty) class slot allocated in the class table; (b) matching the retrieved CID to a stored CID in one of the occupied class slots; and (c) designating the class slot, within which a stored CID matches the retrieved CID, as the aforementioned identified class slot.

In Step 606, a CP is retrieved from the class slot (identified in Step 604) (see e.g., FIG. 2B). Afterwards, in Step 608, a determination is made as to whether the CP (obtained in Step 600) is higher than or matches the CP (retrieved in Step 606 from the identified class slot). Accordingly, in one embodiment of the invention, if it is determined that the obtained CP matches or exceeds the class slot CP, then the process may proceed to Step 616. On the other hand, in another embodiment of the invention, if it is alternatively determined that the class slot CP exceeds the obtained CP, then the process may alternatively proceed to Step 610.

In Step 610, after determining (in Step 608) that the CP (retrieved in Step 606 from the class slot identified in Step 604) is higher than the CP (obtained in Step 600), a determination is made as to whether additional elements of the TCS (also obtained in Step 600) remain to be processed. Accordingly, in one embodiment of the invention, if it is determined that at least one other TCS element remains to be processed, then the process may proceed to Step 612. On the other hand, in another embodiment of the invention, if it is alternatively determined that no more TCS elements remain to be processed, then the process may alternatively proceed to Step 614.

In Step 612, after determining (in Step 610) that at least one other TCS element remains to be processed, a next TCS element (identified by a next index in ascending order) is processed. Processing the next TCS element may entail the process proceeding to Step 602, where a CID stored in the next TCS element may be retrieved therefrom.

In Step 614, after alternatively determining (in Step 610) that no more TCS elements remain to be processed, the CID (obtained in Step 600) is stored in a new last TCS element. That is, in one embodiment of the invention, a new element may be allocated and appended to the end of the TCS (also obtained in Step 600), where the new element may be identified by a new last index (e.g., new last index=previous last index+1). Thereafter, the obtained CID, associated with the sought-to-be-inserted class, may be stored in the new element. Further, by storing the obtained CID in the new (last) element, the sought-to-be-inserted class is recognized as being associated with a lowest CP relative to the other, pre-programmed classes on the network device.

In Step 616, after alternatively determining (in Step 608) that the CP (obtained in Step 600) matches or exceeds the CP (retrieved in Step 606 from the class slot identified in Step 604), an ordered-shift on the TCS (also obtained in Step 600) is performed. Generally, in one embodiment of the invention, an ordered-shifting of a data structure may refer to the intelligent insertion, migration, and/or removal (i.e., in-place update) of values or variables stored across elements of the data structure, where the in-place update modifies the active policies or rules programmed on the network device while minimizing a window in which the active policies/rules may be disrupted by the modification(s). Specifically, the aforementioned ordered-shift may be defined through the following parameters: (a) a subset start index (SSI)=an index identifying the TCS element currently being processed; (b) an ordered-shift direction (OSD)=lower priority; and (c) an ordered-shift quantity (OSQ)=one. Ordered-shifting of the TCS is described in further detail below with respect to FIGS. 7A and 7B. In Step 618, following the ordered-shifting of the TCS (in Step 616), the CID (obtained in Step 600) is stored in the TCS element currently being processed.

Figure 7A:
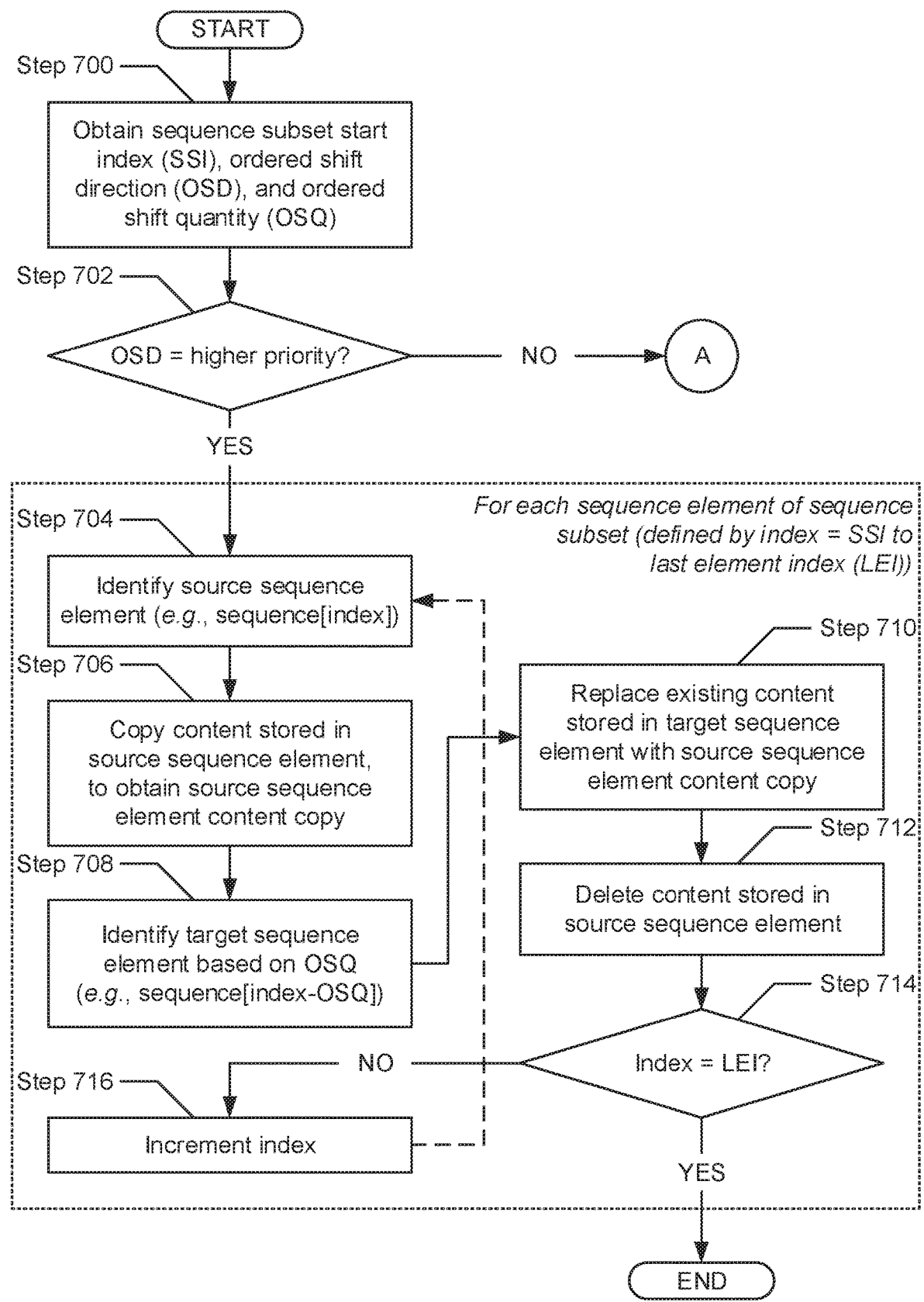
FIGS. 7A and 7B show flowcharts describing a method for ordered shifting target class sequences in accordance with one or more embodiments of the invention.
Figure 7B:
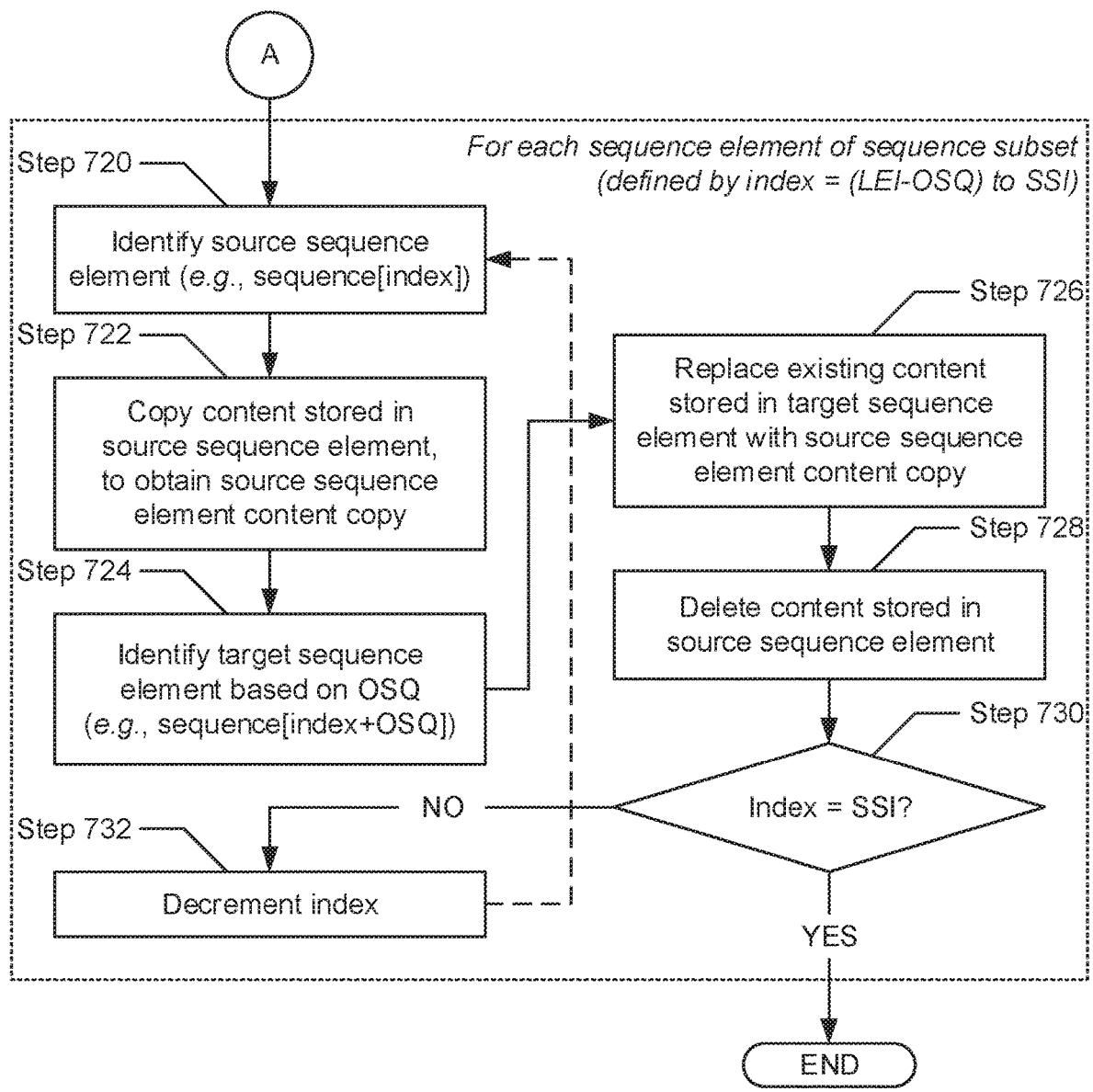

FIGS. 7A and 7B show flowcharts describing a method for ordered shifting target class sequences (TCSs) in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 7A, in Step 700, a sequence subset start index (SSI), an ordered shift direction (OSD), and an ordered shift quantity (OSQ) are obtained. In one embodiment of the invention, the aforementioned parameters may define a desired ordered-shift to be performed on a subset of a sequence-like data structure (e.g., a TCS (see e.g., FIG. 2F)). Generally, an ordered-shifting of a data structure may refer to the intelligent insertion, migration, and/or removal (i.e., in-place update) of values or variables stored across elements of the data structure, where the in-place update modifies the active policies or rules programmed on the network device while minimizing a window in which the active policies/rules may be disrupted by the modification(s).

Further, in one embodiment of the invention, the sequence SSI may refer to a numerical value (e.g., a positive integer) that identifies an index indicating a position of an element in the sequence, where the element represents a first element of the sequence subset on which the ordered-shifting is to be performed. The sequence subset may further be defined by a last element index (LEI), which may refer to another numerical value (e.g., a positive integer) that identifies an index indicating the position of a last element in the sequence. By way of an example, consider an exemplary sequence that includes ten elements, identified by indices {0, 1, 2, 3, 4, 5, 6, 7, 8, 9}, respectively, where LEI=9. Should the obtained SSI direct to the fifth index (i.e., SSI=4), then the sequence subset, on which the ordered-shifting is to be performed, may include the subset of elements identified by the indices {4, 5, 6, 7, 8, 9}, respectively.

In one embodiment of the invention, the OSD may refer to a direction, along the length of the sequence subset, that may be associated with the ordered-shifting to be performed. That is, the OSD may specify that the ordered-shifting of sequence element content ought to migrate from a lower priority (i.e., lower positioned) sequence element to a higher priority (i.e., higher positioned) sequence element. In this case, the aforementioned content migration and, therefore, the ordered-shifting, follows a path towards and ending at the higher priority sequence element. Accordingly, the OSD here is directed to a higher priority. Alternatively, the OSD may specify that the ordered-shifting of sequence element content ought to instead migrate from a higher priority (i.e., higher positioned) sequence element to a lower priority (i.e., lower positioned) sequence element. In this alternative case, the aforementioned content migration and, therefore, the ordered-shifting, follows another path towards and ending at the lower priority sequence element. Accordingly, the OSD here is directed to a lower priority.

In one embodiment of the invention, the OSQ may refer to a numerical value (e.g., a natural number, which may or may not include zero) that defines a number of sequence elements that given sequence element content ought to migrate (or order-shift) away from an original or source sequence element in which the given sequence element content is stored. For example, an exemplary OSQ may specify the numerical value of four, indicating that the content in a given sequence element (of the sequence subset) ought to order-shift from a source sequence element to a destination (or target) sequence element that resides four sequence elements away in the direction specified by the OSD.

In Step 702, a determination is made as to whether the OSD (obtained in Step 700) is directed to a higher priority. In one embodiment of the invention, if it is determined that the OSD is directed to a higher priority, then the process may proceed to Step 704. On the other hand, in another embodiment of the invention, if it is alternatively determined that the OSD is not directed to a higher priority (i.e., is instead directed to a lower priority), then the process may alternatively proceed to Step 720 (see e.g., FIG. 7B).

Hereinafter, Steps 704 through 714 are to be performed for each sequence element index, in ascending index order, starting from the SSI (obtained in Step 700) to a LEI (described above) of the sequence (e.g., TCS). The subset of sequence elements, identified by the range of indices between and including the SSI and the LEI, may define the above-described sequence subset (e.g., subset of a TCS).

With this in mind, in Step 704, after determining (in Step 702) that the OSD (obtained in Step 700) is directed to a higher priority, a source sequence element is identified. In one embodiment of the invention, the source sequence element may refer to an element of the sequence identified by the sequence element index (i.e., a current sequence element index being considered). The source sequence element may be expressed, but is not limited to, the following bracket notation: source sequence element=sequence[index], where index=the current sequence element index being considered.

In Step 706, content stored in the source sequence element (identified in Step 704) is replicated. In one embodiment of the invention, replication of the source sequence element content may result in obtaining a source sequence element content copy. In Step 708, a target sequence element is identified. In one embodiment of the invention, the target sequence element may refer to an element of the sequence identified based on the sequence element index (i.e., the current sequence element index being considered) and the OSQ (obtained in Step 700) in view of the OSD (determined to be directed to a higher priority in Step 702). The target sequence element may be expressed, but is not limited to, the following bracket notation: target sequence element=sequence[index−OSQ], where index−OSQ=a destination sequence element index defined to be OSQ sequence elements away from the current sequence element index being considered, and in the higher priority direction (i.e., OSD).

In Step 710, the existing content stored in the target sequence element (identified in Step 708) is replaced by or with the source sequence element content copy (obtained in Step 706). In the bracket notation used thus far, the aforementioned content replacement operation may be expressed as follows: sequence[index−OSQ]←sequence[index]. Thereafter, in Step 712, the existing content stored in the source sequence element (identified in Step 704) is deleted, thereby leaving a blank or null value stored in the source sequence element.

In Step 714, a determination is made as to whether the sequence element index (currently being considered) matches the LEI of the sequence. In one embodiment of the invention, if it is determined that the sequence element index matches the LEI, indicating that all sequence elements of the sequence subset has been order-shifted, then the process ends. On the other hand, in another embodiment of the invention, if it is alternatively determined that the sequence element index does not match the LEI, indicating that at least one sequence element of the sequence subset remains to be order-shifted, then the process may alternatively proceed to Step 716.

In Step 716, after determining (in Step 714) that the sequence element index (currently being considered) does not match the LEI of the sequence, the aforementioned sequence element index is incremented (by one). Following the incrementing of the sequence element index (to obtain a next sequence element index), the process may proceed to Step 704, where a next source sequence element may be identified using the next sequence element index.

Turning to FIG. 7B, Steps 720 through 732 are to be performed for each sequence element index, in descending index order, starting from a sequence element index that is OSQ sequence elements away, relative to the LEI (described above) of the sequence (e.g., TCS), to the SSI (obtained in Step 700).

With this in mind, in Step 720, after alternatively determining (in Step 702) that the OSD (obtained in Step 700) is directed to a lower priority, a source sequence element is identified. In one embodiment of the invention, the source sequence element may refer to an element of the sequence identified by the sequence element index (i.e., a current sequence element index being considered). The source sequence element may be expressed, but is not limited to, the following bracket notation: source sequence element=sequence[index], where index=the current sequence element index being considered.

In Step 722, content stored in the source sequence element (identified in Step 720) is replicated. In one embodiment of the invention, replication of the source sequence element content may result in obtaining a source sequence element content copy. In Step 724, a target sequence element is identified. In one embodiment of the invention, the target sequence element may refer to an element of the sequence identified based on the sequence element index (i.e., the current sequence element index being considered) and the OSQ (obtained in Step 700) in view of the OSD (determined to be directed to a lower priority in Step 702). The target sequence element may be expressed, but is not limited to, the following bracket notation: target sequence element=sequence[index+OSQ], where index+OSQ=a destination sequence element index defined to be OSQ sequence elements away from the current sequence element index being considered, and in the lower priority direction (i.e., OSD).

In Step 726, the existing content stored in the target sequence element (identified in Step 724) is replaced by or with the source sequence element content copy (obtained in Step 722). In the bracket notation used thus far, the aforementioned content replacement operation may be expressed as follows: sequence[index+OSQ]←sequence[index]. Thereafter, in Step 728, the existing content stored in the source sequence element (identified in Step 720) is deleted, thereby leaving a blank or null value stored in the source sequence element.

In Step 730, a determination is made as to whether the sequence element index (currently being considered) matches the SSI (obtained in Step 700). In one embodiment of the invention, if it is determined that the sequence element index matches the SSI, indicating that the relevant sequence elements of the sequence subset has been order-shifted, then the process ends. On the other hand, in another embodiment of the invention, if it is alternatively determined that the sequence element index does not match the SSI, indicating that at least one relevant sequence element of the sequence subset remains to be order-shifted, then the process may alternatively proceed to Step 732.

In Step 732, after determining (in Step 730) that the sequence element index (currently being considered) does not match the SSI (obtained in Step 700), the aforementioned sequence element index is decremented (by one). Following the decrementing of the sequence element index (to obtain a next sequence element index), the process may proceed to Step 720, where a next source sequence element may be identified using the next sequence element index.

Figure 8A:
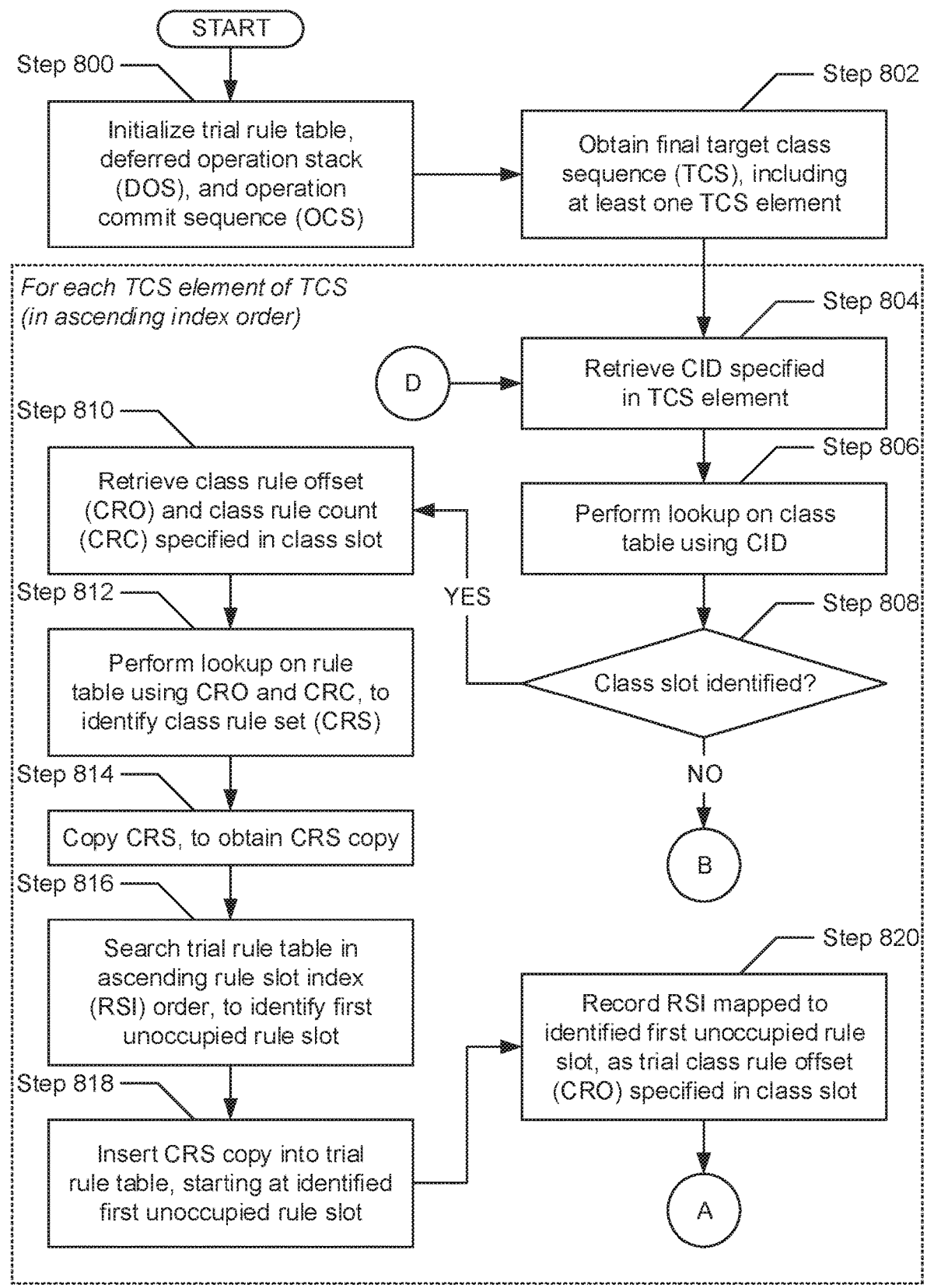
FIGS. 8A-8C show flowcharts describing a method for executing trial phases in accordance with one or more embodiments of the invention.
Figure 8B:
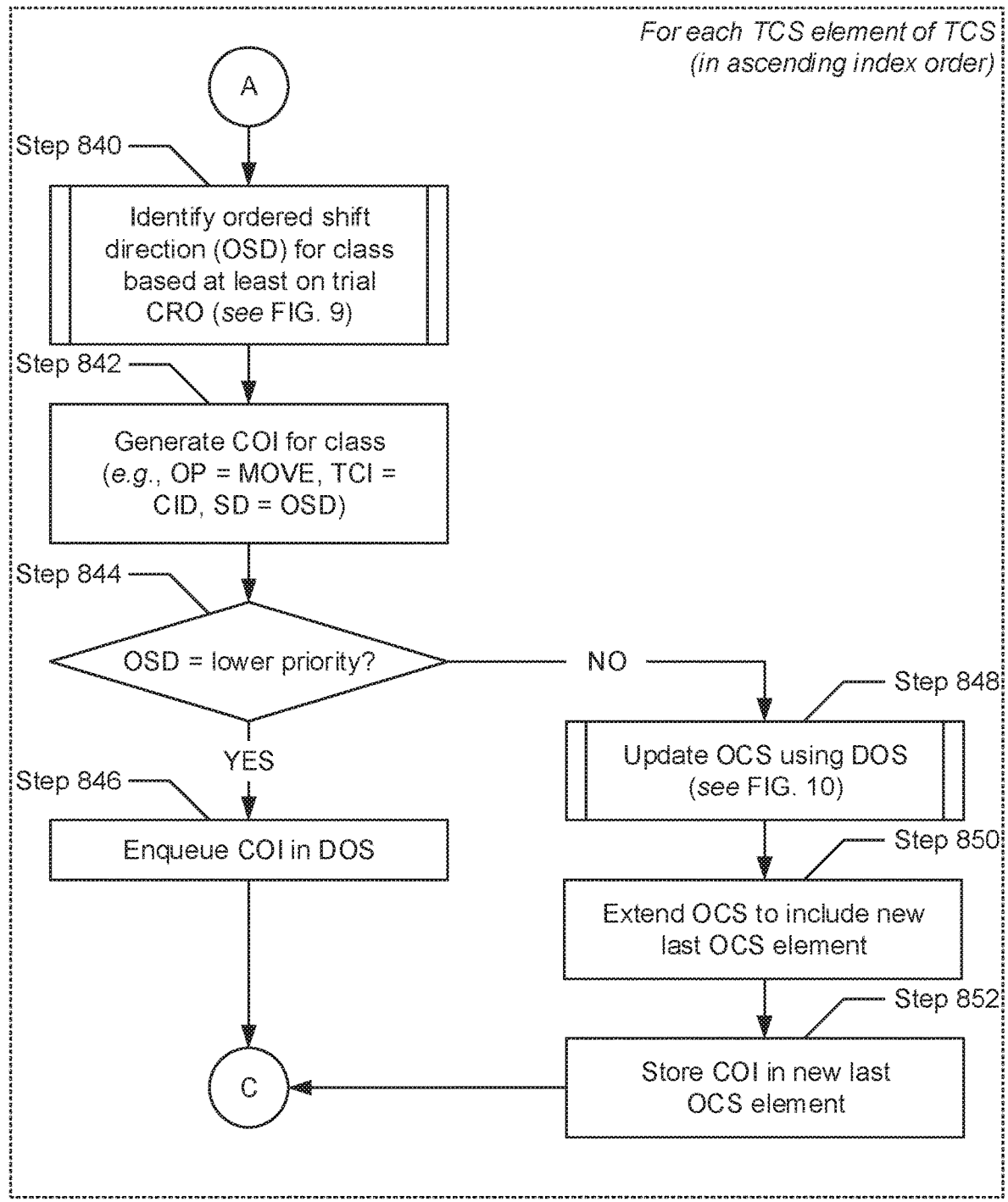
Figure 8C:
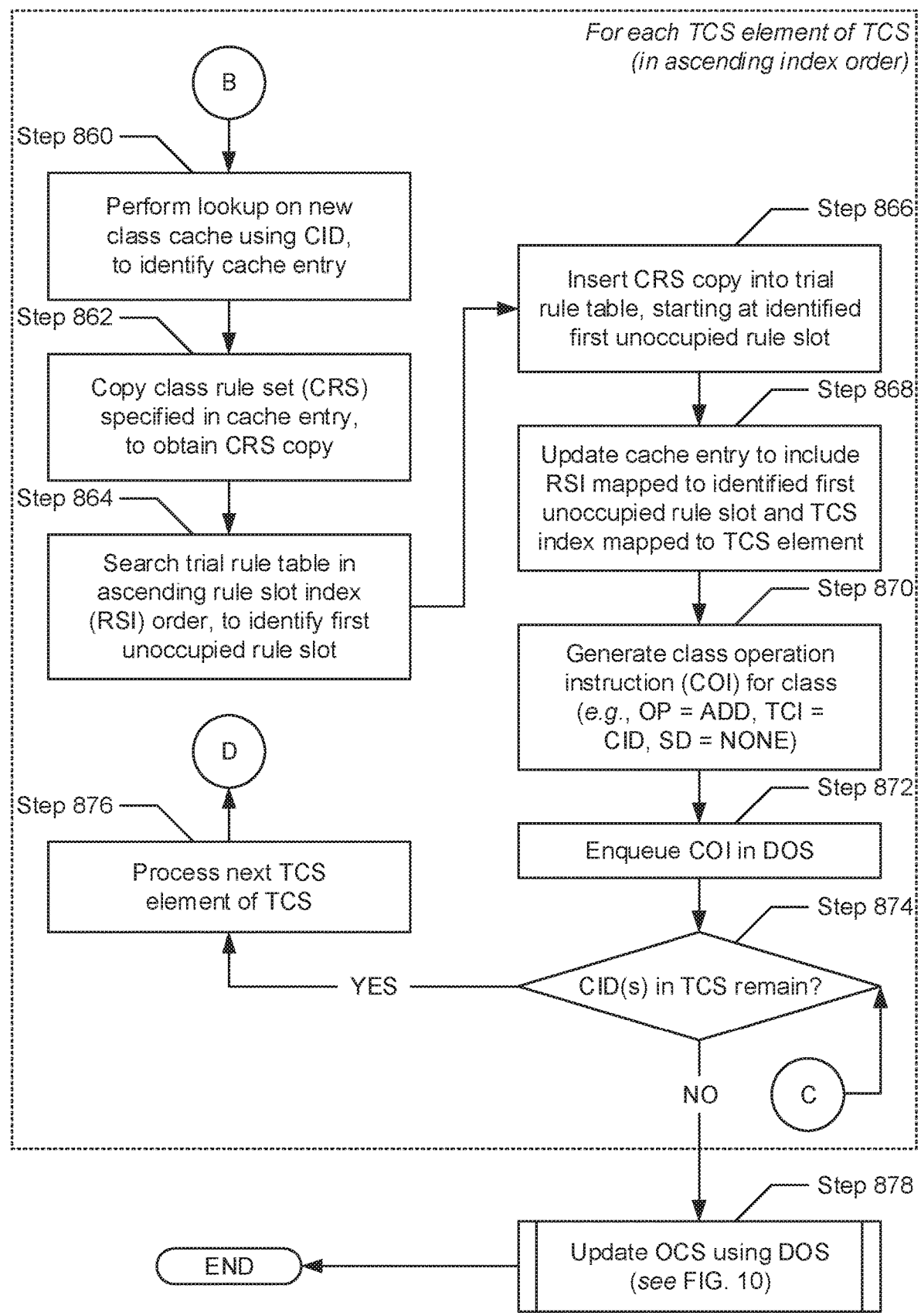

FIGS. 8A-8C show flowcharts describing a method for executing trial phases in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 8A, in Step 800, a trial rule table (see e.g., FIG. 2C), a deferred operation stack (DOS) (see e.g., FIG. 2K), and an operation commit sequence (OCS) (see e.g., FIG. 2G) are initialized. In one embodiment of the invention, the trial rule table may represent a data structure that maintains a proposed (or trial) arrangement of active policies or rules sought-to-be-retained and/or new policies or rules sought-to-be-programmed on the network device. Initialization of the trial rule table may entail generating an empty (or blank) data structure, similar in dimensionality (e.g., table row and table column) as the rule table on the network device. Further, in initially being an empty (or blank) data structure, the initial trial rule table may include a set of unoccupied (or empty) rule slots, which may be identified by a corresponding set of rule slot indices (RSIs), respectively. Moreover, the cardinality of the aforementioned set of unoccupied (or empty) rule slots, in the initial trial rule table, may match a cardinality of a total set of rule slots (e.g., occupied and unoccupied) exhibited by the rule table.

In one embodiment of the invention, the DOS may represent a data structure or a data object container that operates (e.g., inserts or removes data objects) based on a last-in, first-out (LIFO) principle. More specifically, the DOS may represent a linear collection of temporarily stored data objects, where the data objects may encompass class operation instructions (COIs) (described above) (see e.g., FIG. 2H). Initialization of the DOS may entail generating an empty (or unoccupied) LIFO-following data structure or data object container. Furthermore, the OCS may refer to a data structure (e.g., an array or vector) that includes a collection of elements, identified respectively by a set of indices, which collectively store a desired sequence of COIs. Initialization of the OCS may entail generating an empty (or unoccupied) array or vector.

In Step 802, a final target class sequence (TCS) is obtained. In one embodiment of the invention, the final TCS may represent a data structure (e.g., an array or vector) derived from updates performed to an initialized TCS, which may have transpired during the processing of one or more class modification instructions (see e.g., FIGS. 3A and 3B). More specifically, the final TCS may refer to a collection of elements that store a set of class identifiers (CIDs), respectively, in class priority (CP)-order. That is, a first element of the final TCS may store a CID, for an existing or new class, that is associated with a highest CP relative to the CPs of other existing or new classes. On the other hand, a last element of the final TCS may store another CID, for another existing or new class, that is associated with a lowest CP relative to the CPs of other existing or new classes.

Hereinafter, Steps 804 through 852 are to be performed for each element of the final TCS (obtained in Step 802) in ascending index order, and starting at an initial index indicating the position of a first element, of the final TCS, which may store a first CID associated with a highest CP.

With this in mind, in Step 804, for a final TCS element (i.e., a current element of the final TCS being processed), a CID stored therein is retrieved. In Step 806, a lookup is performed on a class table (see e.g., FIG. 2A or FIG. 2E) using the CID (retrieved from the final TCS element in Step 804). In one embodiment of the invention, the lookup may entail: sequentially or concurrently (i.e., in parallel) comparing the retrieved CID with a stored CID in each occupied (or non-empty) class slot allocated in the class table.

In Step 808, a determination is made, based on the lookup (performed in Step 806), as to whether a class slot of the class table is identified. Identification of a class slot may entail: matching the CID (retrieved in Step 804) to a stored CID in one of the occupied class slots of the class table, where the identified class slot (if any) is the occupied class slot that includes the stored CID that matches the retrieved CID. Accordingly, in one embodiment of the invention, if it is determined that the retrieved CID matches a stored CID of an occupied class slot of the class table, then a class slot is identified and the process may proceed to Step 810. On the other hand, in another embodiment of the invention, if it is alternatively determined that the retrieved CID does not match a stored CID of any occupied class slot of the class table, then a class slot is not identified and the process may alternatively proceed to Step 840 (see e.g., FIG. 8B).

In Step 810, after determining (in Step 808) that a class slot of the class table is identified, based on the lookup (performed in Step 806), a class rule offset (CRO) and a class rule count (CRC) are retrieved from the identified class slot. In one embodiment of the invention, the CRO may refer to a numerical value (e.g., a natural number including zero) that may reflect the position of a first policy or rule, of a given existing (or active) class (assigned the retrieved CID), in a rule table (described below) (see e.g., FIG. 2C) relative to a first (or topmost) rule slot positioned in the rule table. On the other hand, the CRC may refer to a numerical value (e.g., a positive integer) that may indicate a cardinality (or quantity) of a set of policies or rules grouped by the given existing (or active) class.

In Step 812, a lookup is performed on the rule table (see e.g., FIG. 2C or FIG. 2E), residing on the network device, using the CRO and CRC (retrieved in Step 810). In one embodiment of the invention, the lookup may result in the identification of a class rule set (CRS) (i.e., set of policies or rules) associated with the given existing/active class. Further, the lookup, resulting in the identification of the aforementioned CRS, may entail: (a) identifying a first rule slot, of the rule table, mapped to the given existing/active class, using the retrieved CRO; (b) identifying a second rule slot, of the rule table, mapped to the given existing/active class, using the summation of the CRO and the CRC; and (c) identifying the CRS, for the given existing/active class, as the set of one or more policies/rules whose metadata is stored in the set of rule slots between and including the identified first rule slot and the identified second rule slot.

In Step 814, the CRS (identified in Step 812) is replicated, to obtain a CRS copy. In Step 816, a search is performed on the trial rule table (initialized in Step 800, or updated in Step 818 or Step 866). In one embodiment of the invention, the search may entail examining each rule slot, of the trial rule table, in ascending rule slot index (RSI) order. Further, examination of each rule slot may result in the identification of a first (or topmost) rule slot, of the trial rule table, that is unoccupied (or empty).

In Step 818, the CRS copy (obtained in Step 814) is inserted into the trial rule table. Specifically, in one embodiment of the invention, the CRS copy may be inserted, into the trial rule table, starting at the first unoccupied rule slot (identified in Step 816). Thereafter, in Step 820, the RSI, mapped to the first unoccupied rule slot, is recorded. That is, in one embodiment of the invention, the aforementioned RSI may be recorded as the trial CRO, for the given existing/active class, and stored as metadata in the class slot (identified based on the lookup performed in Step 806). Following the recordation of the trial CRO, the process may proceed to Step 840 (see e.g., FIG. 8B).

Turning to FIG. 8B, in Step 840, an ordered-shift direction (OSD) is identified. In one embodiment of the invention, the OSD may refer to a direction in which the CRS (identified in Step 812), associated with the given existing/active class, ought to order-shift, thereby, at least in part, committing a class modification batch (see e.g., FIG. 2J) onto the network device. Identification of the OSD may be contingent on at least the trial CRO (recorded in Step 820), and is described in further detail below with respect to FIG. 9.

In Step 842, a COI (see e.g., FIG. 2H) is generated for the given existing/active class. In one embodiment of the invention, the COI may refer to a data structure that includes, or may refer to a composite data object that encapsulates, a set of parameters defining a class operation—i.e., a procedure in which ordered-shifts may be performed to effect the retaining, removal, and/or insertion of CRSs in/from the rule table on the network device. Specifically, the generated COI may be defined by way of the following set of parameters: (a) an operation (OP)=a MOVE operation, which may entail the copying or migration of the identified CRS (for the given existing/active class) from a source set of rule slots to a target set of rule slots in the rule table; (b) a target class identifier (TCI)=the CID (retrieved in Step 804), which uniquely identifies (or names) the given existing/active class; and (c) a shift direction (SD)=the OSD (identified in Step 840) for the given existing/active class.

In Step 844, a determination is made as to whether the OSD (identified in Step 840) is directed to a lower priority. Generally, an OSD may specify that the ordered-shifting of the CRS (identified in Step 812) ought to migrate from a lower priority (i.e., lower positioned) set of rule slots to a higher priority (i.e., higher positioned) set of rule slots in the rule table. In this case, the aforementioned CRS migration and, therefore, the ordered-shifting, follows a path towards and ending at the higher priority set of rule slots. Accordingly, the OSD here may be directed to a higher priority. Alternatively, an OSD may specify that the ordered-shifting of the CRS ought to instead migrate from a higher priority (i.e., higher positioned) set of rule slots to a lower priority (i.e., lower positioned) set of rule slots in the rule table. In this alternative case, the aforementioned CRS migration and, therefore, the ordered-shifting, follows another path towards and ending at the lower priority set of rule slots in the rule table. Accordingly, the OSD here may be directed to a lower priority.

Subsequently, in one embodiment of the invention, if it is determined that the OSD is directed to a lower priority, then the process may proceed to Step 846. On the other hand, in another embodiment of the invention, if it is alternatively determined that the OSD is directed to a higher priority, then the process may alternatively proceed to Step 848.

In Step 846, after determining (in Step 844) that the OSD (identified in Step 840) is directed to a lower priority, the COI (generated in Step 842) is enqueued in (or pushed onto) the DOS (initialized in Step 800, or updated in Steps 846, 848, 872, or 878 during the processing of a previous final TCS element). Following the enqueuing of the COI into the DOS, the process may proceed to Step 874 (see e.g., FIG. 8C).

In Step 848, after alternatively determining (in Step 844) that the OSD (identified in Step 840) is instead directed to a higher priority, the OCS (initialized in Step 800, or updated in Steps 848 or 878 during the processing of a previous final TCS element) is updated using the DOS (initialized in Step 800, or updated in Steps 846, 848, 872, or 878 during the processing of a previous final TCS element). Updating of the OCS, using the DOS, is described in further detail below with respect to FIG. 10.

In Step 850, the OCS (updated in Step 848) is extended. Specifically, in one embodiment of the invention, an additional element, initialized with a blank or null value, may be allocated to, and thereby extending, the OCS. The additional element may be appended to an end of the OCS, which would designate the additional element as the new last element of the OCS.

In Step 852, the COI (generated in Step 842) is stored in the new last element of the OCS (allocated in Step 850). Following storage of the COI, the process may proceed to Step 874 (see e.g., FIG. 8C).

Turning to FIG. 8C, in Step 860, after alternatively determining (in Step 808) that a class slot, in the class table, is not identified based on the lookup (performed in Step 806), another lookup is performed on a new class cache (see e.g., FIG. 2I) using the CID (retrieved in Step 804). In one embodiment of the invention, the new class cache may represent a data structure that may, either temporarily or permanently, maintain metadata describing new class(es) sought-to-be-programmed on the network device. Further, the lookup may result in the identification of a cache entry in the new class cache. The lookup, leading to the aforementioned identification of the cache entry, may entail: (a) sequentially or concurrently (i.e., in parallel) comparing the retrieved CID with a stored CID in each cache entry allocated in the new class cache; (b) matching the retrieved CID to a stored CID in one of the cache entries; and (c) designating the cache entry, within which a stored CID matches the retrieved CID, as the aforementioned identified cache entry.

In Step 862, a CRS, stored in the cache entry (identified in Step 860), is replicated. In one embodiment of the invention, the aforementioned CRS may refer to a set of one or more policies or rules grouped by, or associated with, a given new class sought-to-be-programmed on the network device. Further, replication of the CRS may result in obtaining a CRS copy.

In Step 864, a search is performed on the trial rule table (initialized in Step 800, or updated in Step 818 or Step 866 during the processing of a previous final TCS element). In one embodiment of the invention, the search may entail examining each rule slot, of the trial rule table, in ascending rule slot index (RSI) order. Further, examination of each rule slot may result in the identification of a first (or topmost) rule slot, of the trial rule table, that is unoccupied (or empty).

In Step 866, the CRS copy (obtained in Step 862) is inserted into the trial rule table. Specifically, in one embodiment of the invention, the CRS copy may be inserted, into the trial rule table, starting at the first unoccupied rule slot (identified in Step 864). Thereafter, in Step 868, the RSI, mapped to the first unoccupied rule slot, is recorded. That is, in one embodiment of the invention, the aforementioned RSI may be recorded as the trial RSI (see e.g., FIG. 2I), for the given new class, and stored as metadata in the cache entry (identified based on the lookup performed in Step 860). Further, an index (i.e., a TCS index), mapped to the final TCS element (i.e., the current element of the final TCS being processed), is also recorded. Accordingly, the index pertaining to the final TCS element (currently being processed) may be recorded as the TCS index (see e.g., FIG. 2I), for the given new class, and stored as metadata in the identified cache entry.

In Step 870, a COI (see e.g., FIG. 2H) is generated for the given new class. In one embodiment of the invention, the COI may refer to a data structure that includes, or may refer to a composite data object that encapsulates, a set of parameters defining a class operation—i.e., a procedure in which ordered-shifts may be performed to effect the retaining, removal, and/or insertion of CRSs in/from the rule table on the network device. Specifically, the generated COI may be defined by way of the following set of parameters: (a) an operation (OP)=an ADD operation, which may entail the insertion of the identified CRS (for the given new class) into the rule table starting at a rule slot, of the rule table, equivalent to the first unoccupied rule slot of the trial rule table (identified in Step 864); (b) a target class identifier (TCI)=the CID (retrieved in Step 804), which uniquely identifies (or names) the given new class; and (c) a shift direction (SD)=NONE since ordered-shifting (described above) is not transpiring in the class operation.

In Step 872, the COI (generated in Step 870) is enqueued in (or pushed onto) the DOS (initialized in Step 800, or updated in Steps 846, 848, 872, or 878 during the processing of a previous final TCS element). Thereafter, in Step 874, a determination is made as to whether additional elements of the final TCS (obtained in Step 802) remain to be processed. Accordingly, in one embodiment of the invention, if it is determined that at least one other final TCS element remains to be processed, then the process may proceed to Step 876. On the other hand, in another embodiment of the invention, if it is alternatively determined that no more final TCS elements remain to be processed, then the process may alternatively proceed to Step 878.

In Step 876, after determining (in Step 874) that at least one other final TCS element remains to be processed, a next final TCS element (identified by a next index in ascending order) is processed. Processing the next final TCS element may entail the process proceeding to Step 804 (see e.g., FIG. 8A), where a CID stored in the next final TCS element may be retrieved therefrom.

In Step 878, after alternatively determining (in Step 874) that no more final TCS elements remain to be processed, the OCS (initialized in Step 800, or updated in Steps 848 or 878 during the processing of a previous final TCS element) is updated using the DOS (initialized in Step 800, or updated in Steps 846, 848, 872, or 878 during the processing of a previous final TCS element). Updating of the OCS, using the DOS, is described in further detail below with respect to FIG. 10.

Figure 9:
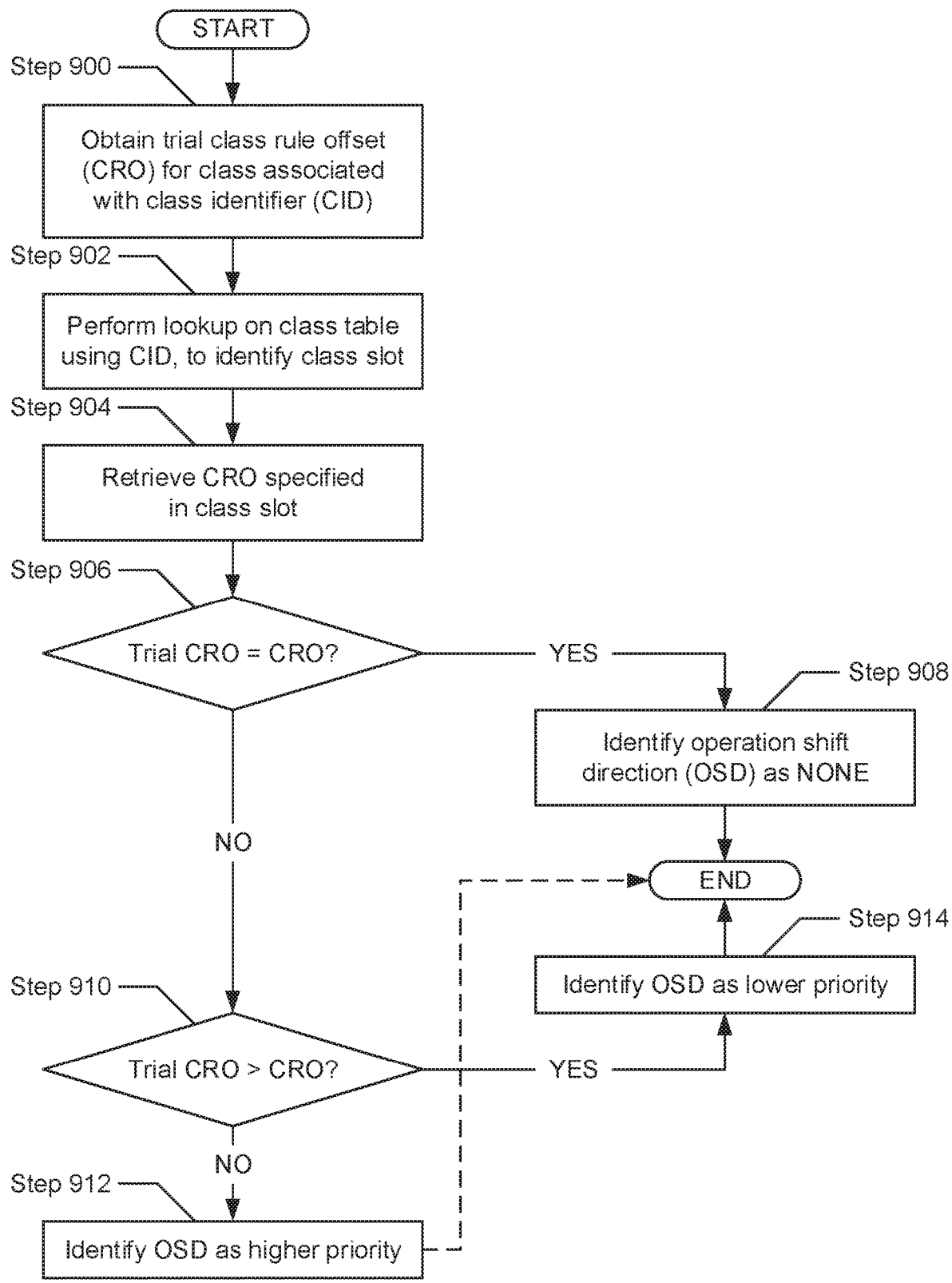
FIG. 9 shows a flowchart describing a method for identifying ordered shift directions for class rule sets in accordance with one or more embodiments of the invention.

FIG. 9 shows a flowchart describing a method for identifying ordered shift directions for class rule sets in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 9, in Step 900, a trial class rule offset (CRO) and a class identifier (CID) are obtained. In one embodiment of the invention, a given trial CRO may refer to a numerical value (e.g., a natural number including zero) that may reflect the proposed position of a first policy or rule, of the given existing (or active) class, in a trial rule table (described above) in relation to a first (or topmost) rule slot positioned in the trial rule table. Further, the CID may refer to an arbitrary-length character string that uniquely identifies (or names) the given existing/active class.

In Step 902, a lookup is performed a lookup is performed on a class table (see e.g., FIG. 2A or FIG. 2E), residing on the network device, using the CID (obtained in Step 900). In one embodiment of the invention, a class slot of the class table may be identified as a result of the lookup. In identifying the aforementioned class slot, the lookup may entail: (a) sequentially or concurrently (i.e., in parallel) comparing the obtained CID with a stored CID in each occupied (or non-empty) class slot allocated in the class table; (b) matching the obtained CID to a stored CID in one of the occupied class slots; and (c) designating the class slot, within which a stored CID matches the obtained CID, as the aforementioned identified class slot.

In Step 904, a CRO is retrieved from the class slot (identified in Step 902) (see e.g., FIG. 2B). In one embodiment of the invention, the CRO may refer to a numerical value (e.g., a natural number including zero) that may reflect the current position of a first policy or rule, of the given existing/active class, in a rule table (described above) in relation to a first (or topmost) rule slot positioned in the rule table.

In Step 906, a determination is made as to whether the trial CRO (obtained in Step 900) equals or matches the CRO (retrieved in Step 904). In one embodiment of the invention, if it is determined that the trial CRO matches the CRO, indicating that the proposed placement of a class rule set (CRS), for the given existing/active class, remains unchanged from the current position of the CRS in the rule table, then the process may proceed to Step 908. On the other hand, in another embodiment of the invention, if it is alternatively determined that the trial CRO mismatches the CRO, indicating that the proposed placement of the CRS, for the given existing/active class, is not the same as the current position of the CRS in the rule table, then the process may alternatively proceed to Step 910.

In Step 908, after determining (in Step 906), for the given existing/active class, that the trial CRO (obtained in Step 900) matches the CRO (retrieved in Step 904), an operation shift direction (OSD) is directed to NONE. Generally, in one embodiment of the invention, an OSD may refer to a direction in which the CRS, associated with the given existing/active class, ought to order-shift, thereby, at least in part, committing a class modification batch (see e.g., FIG. 2J) onto the network device. An OSD directed to NONE, however, as is the case here, indicates that an ordered-shifting of the CRS, for the given existing/active class, is not necessary.

In Step 910, after alternatively determining (in Step 906), for the given existing/active class, that the trial CRO (obtained in Step 900) mismatches the CRO (retrieved in Step 904), another determination is made as to whether the trial CRO exceeds the CRO. Should a trial CRO exceed a CRO, for a given existing/active class, the relationship may indicate that a proposed placement of a CRS, for the given existing/active class, starts at a lower priority (i.e., lower positioned) rule slot than a current rule slot at which the CRS currently starts in the rule table. Conversely, should a CRO exceed a trial CRO, for a given existing/active class, the relationship may alternatively indicate that a proposed placement of a CRS, for the given existing/active class, starts at a higher priority (i.e., higher positioned) rule slot than a current rule slot at which the CRS currently starts in the rule table.

In view of the above, in one embodiment of the invention, if it is determined that the trial CRO exceeds the CRO, for the given existing/active class, then the process may proceed to Step 914. On the other hand, in another embodiment of the invention, if it is alternatively determined that the CRO instead exceeds the trial CRO, for the given existing/active class, then the process may alternatively proceed to Step 912.

In Step 912, after determining (in Step 910), for the given existing/active class, that the CRO (retrieved in Step 904) exceeds the trial CRO (obtained in Step 900), an OSD is directed to a higher priority. Generally, in one embodiment of the invention, an OSD may refer to a direction in which the CRS, associated with the given existing/active class, ought to order-shift, thereby, at least in part, committing a class modification batch (see e.g., FIG. 2J) onto the network device. Specifically, in being directed to a higher priority, the ordered-shifting of the aforementioned CRS may entail migrating from a lower priority (i.e., lower positioned) set of rule slots to a higher priority (i.e., higher positioned) set of rule slots in the rule table.

In Step 914, after alternatively determining (in Step 910), for the given existing/active class, that the trial CRO (obtained in Step 900) exceeds the CRO (retrieved in Step 904), an OSD is directed to a lower priority. Generally, in one embodiment of the invention, an OSD may refer to a direction in which the CRS, associated with the given existing/active class, ought to order-shift, thereby, at least in part, committing a class modification batch (see e.g., FIG. 2J) onto the network device. Specifically, in being directed to a higher priority, the ordered-shifting of the aforementioned CRS may entail migrating from a higher priority (i.e., higher positioned) set of rule slots to a lower priority (i.e., lower positioned) set of rule slots in the rule table.

Figure 10:
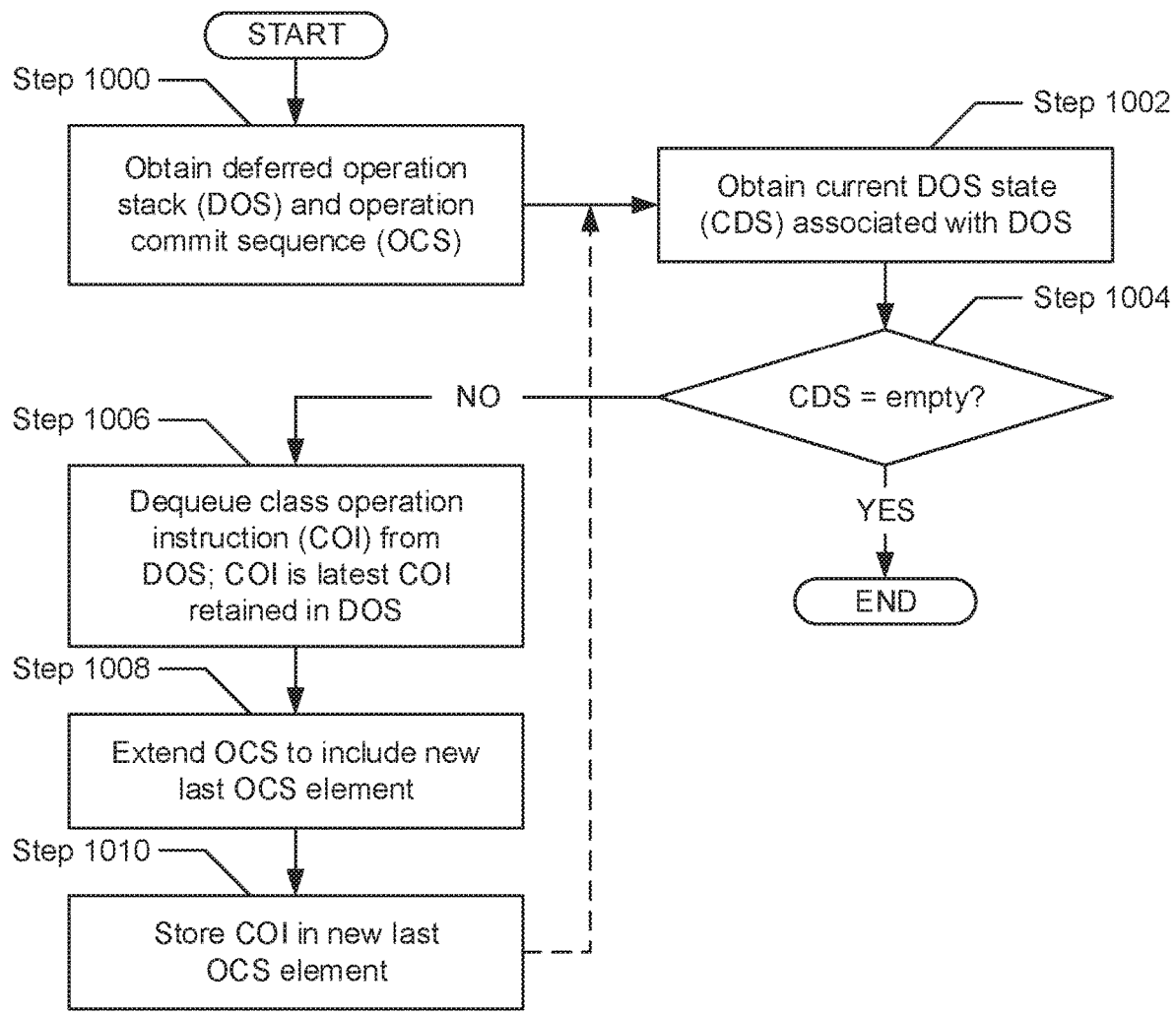
FIG. 10 shows a flowchart describing a method for transferring deferred stack contents to operation commit sequences in accordance with one or more embodiments of the invention.

FIG. 10 shows a flowchart describing a method for transferring deferred stack contents to operation commit sequences in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 10, in Step 1000, a deferred operation stack (DOS) and an operation commit sequence (OCS) are obtained. In one embodiment of the invention, the DOS may represent a data structure or a data object container that operates (e.g., inserts or removes data objects) based on a last-in, first-out (LIFO) principle. That is, a last data object (i.e., a latest data object) inserted (or stored) in the DOS may be the first data object removed (or extracted) from the DOS. Conversely, a first data object (i.e., an oldest data object) inserted (or stored) in the DOS may be the last data object removed (or extracted) therefrom. More specifically, the DOS may represent a linear collection of temporarily stored data objects, where each data object may encompass a class operation instruction (COI) (described above) (see e.g., FIG. 2H). On the other hand, the OCS may refer to a data structure (e.g., an array or vector) that stores a desired sequence of COIs. When executed in the aforementioned desired sequence, the COIs may collectively reprogram a rule table (see e.g., FIG. 2C or FIG. 2E), on the network device, which reflects the commitment of one or more class modification instructions (described below) (see e.g., FIG. 2J).

In Step 1002, a current DOS state (CDS), associated with the DOS (obtained in Step 1000), is obtained. In one embodiment of the invention, the CDS may refer to a value or variable that may indicate a current status of the DOS, at least with respect to whether the DOS is empty or non-empty (i.e., stores at least one COI therein). Further, the CDS may be expressed as a numerical value or variable (e.g., 1=non-empty, 0=empty), a categorical value or variable (e.g., "non-empty", "empty"), a Boolean value or variable (e.g., "true"=non-empty, "false"=empty), or any other value or variable data type that may distinguish between the DOS exhibiting an empty state versus a non-empty state.

In Step 1004, a determination is made as to whether the CDS (obtained in Step 1002) is directed to an empty state. In one embodiment of the invention, if it is determined, based on the CDS, that the DOS (obtained in Step 1000) is empty, then the process ends. On the other hand, in another embodiment of the invention, if it is alternatively determined, based on the CDS, that the DOS is non-empty, then the process may proceed to Step 1006.

In Step 1006, after determining (in Step 1004), based on the CDS (obtained in Step 1002), that the DOS (obtained in Step 1000) is non-empty, a latest COI stored in the DOS is dequeued (or popped) therefrom. Subsequently, in Step 1008, the OCS (also obtained in Step 1000) is extended. Specifically, in one embodiment of the invention, an additional element, initialized with a blank or null value, may be allocated to, and thereby extending, the OCS. The additional element may be appended to an end of the OCS, which would designate the additional element as the new last element of the OCS.

In Step 1010, the latest COI (dequeued in Step 1006) is stored in the new last element of the OCS (allocated in Step 1008). Following storage of the latest COI, the process may proceed to Step 1002, where a new CDS, associated with the DOS, may be obtained.

Figure 11A:
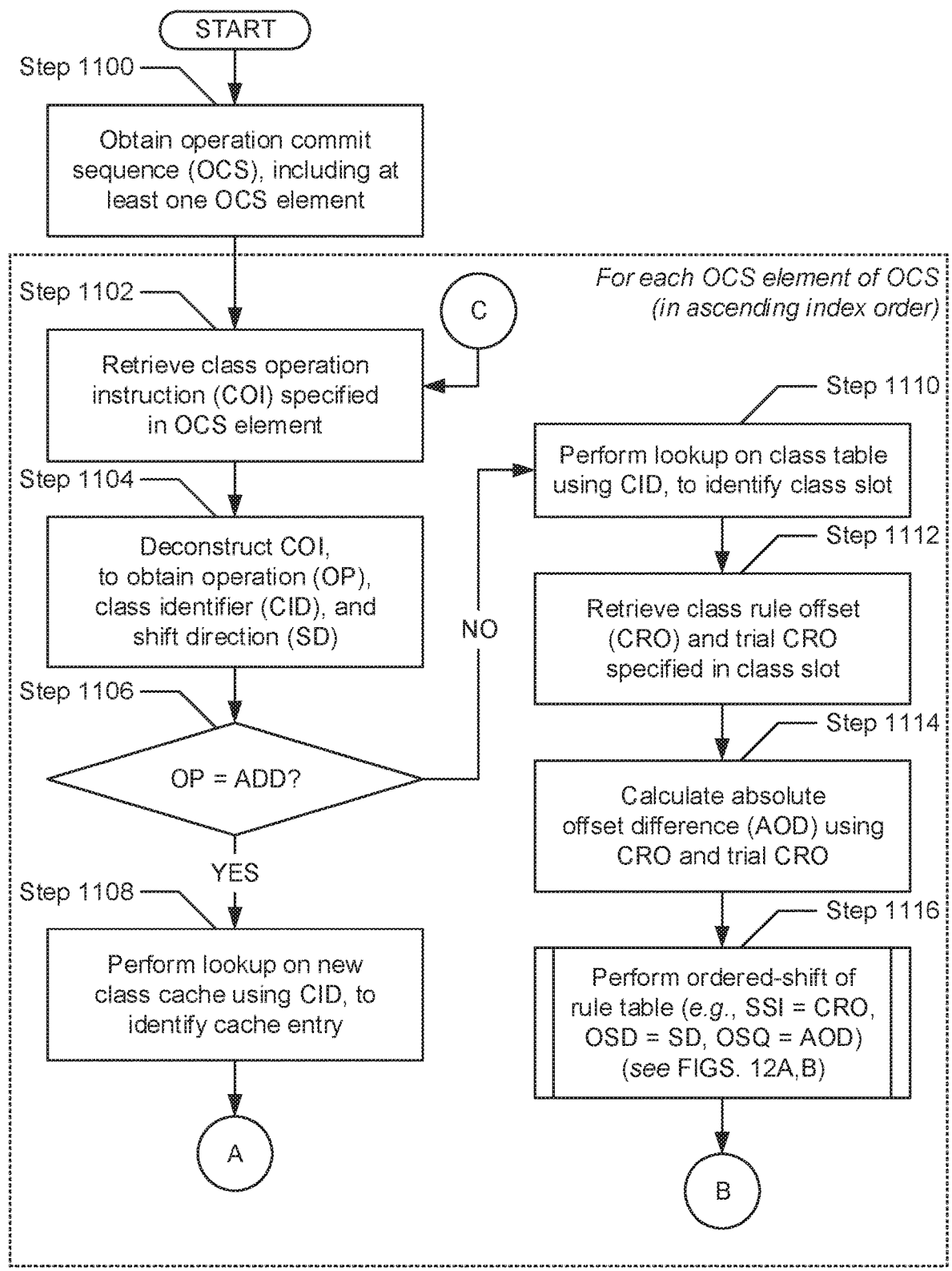
FIGS. 11A and 11B shows flowcharts describing a method for executing commit phases in accordance with one or more embodiments of the invention.
Figure 11B:
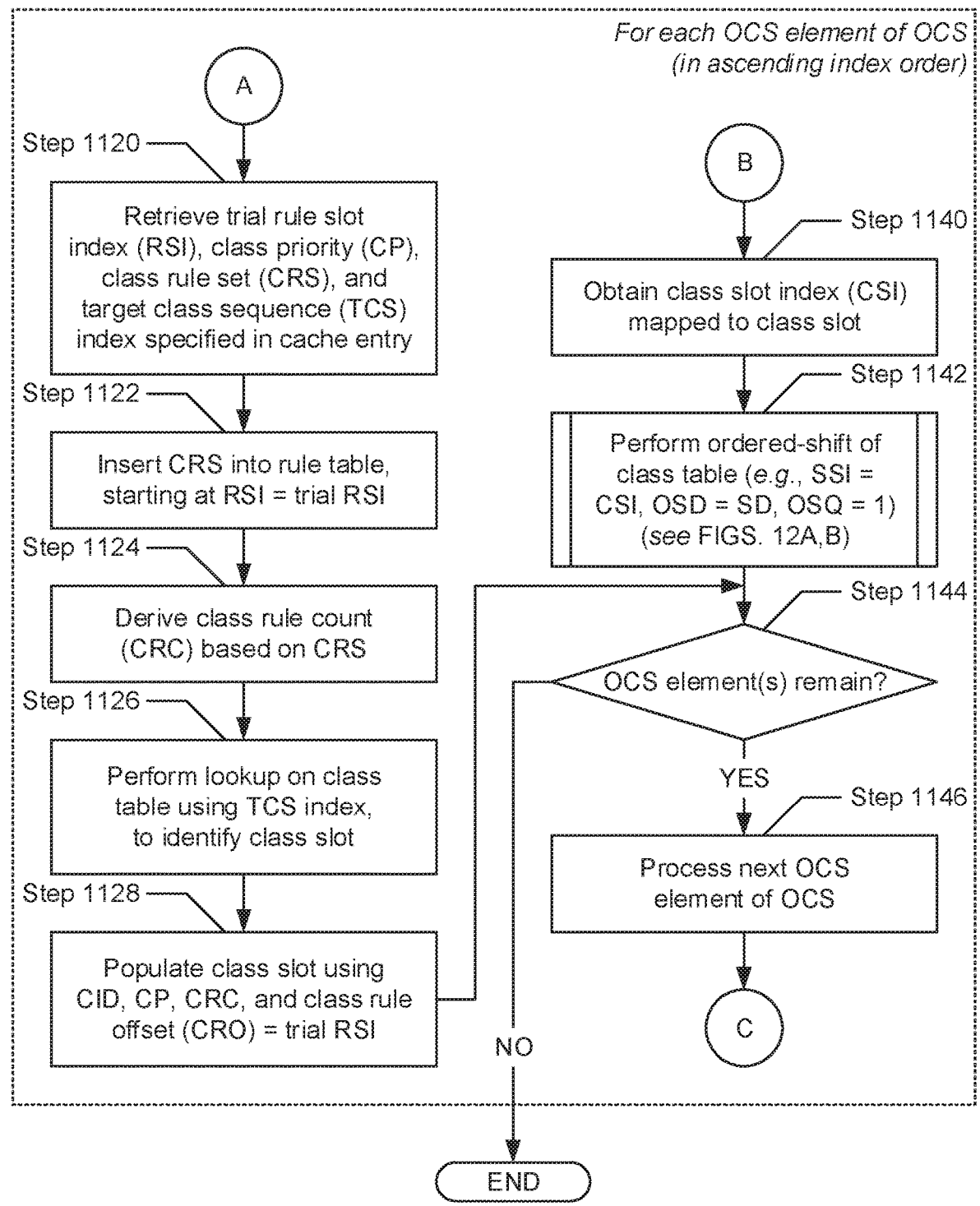

FIGS. 11A and 11B shows flowcharts describing a method for executing commit phases in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 11A, in Step 1100, an operation commit sequence (OCS) is obtained. In one embodiment of the invention, the OCS may refer to a data structure (e.g., an array or vector) that stores a desired sequence of class operation instructions (COIs) (described above) (see e.g., FIG. 2H). When executed in the aforementioned desired sequence, the COIs may collectively reprogram a rule table (see e.g., FIG. 2C or FIG. 2E), on the network device, which reflects the commitment of one or more class modification instructions (described below) (see e.g., FIG. 2J). Furthermore, the OCS may store the desired sequence of COIs across a collection of elements, where each element, identified by a respective index, stores a COI of the desired sequence of COIs.

Hereinafter, Steps 1102 through 1146 are to be performed for each element of the OCS (obtained in Step 1100) in ascending index order, and starting at an initial index indicating the position of a first element of the OCS.

With this in mind, in Step 1102, a COI stored in a OCS element (i.e., a current OCS element being processed) is retrieved therefrom. In Step 1104, the COI (retrieved in Step 1102) is subsequently deconstructed, to obtain an operation (OP), a class identifier (CID), and a shift direction (SD). In one embodiment of the invention, the OP may pertain to either an ADD operation or a MOVE operation. An ADD operation may entail the insertion of a class rule set (CRS) (i.e., a set of one or more policies or rules), associated with a class, into a rule table residing on the network device, starting at a select rule slot identified by a select rule slot index (RSI) (see e.g., FIG. 2C or FIG. 2E). Conversely, a MOVE operation may entail the ordered-shifting (i.e., copying or migration) of rule metadata from select source rule slots to select target rule slots identified by select source and target RSIs, respectively. Further, the CID (also referred to as a target class identifier (TCI)) may represent an arbitrary-length character string that uniquely identifies (or names) an existing class already programmed on the network device or a new class sought-to-be-programmed on the network device. Moreover, the SD may refer to a direction associated with a given MOVE operation. That is, the SD may specify whether the ordered-shifting of rule metadata, pertinent to a CRS, ought to migrate from a lower priority (i.e., lower positioned) source rule slot to a higher priority (i.e., higher positioned) target rule slot; or, alternatively, from a higher priority (i.e., higher positioned) source rule slot to a lower priority (i.e., lower positioned) target rule slot. The SD associated with an ADD operation may be disclosed herein as NONE, indicating that ordered-shifts are not performed during ADD operations.

In Step 1106, a determination is made as to whether the OP (obtained in Step 1104) pertains to an ADD operation (described above). Accordingly, in one embodiment of the invention, if it is determined that the OP pertains to an ADD operation, then the process may proceed to Step 1108. On the other hand, in another embodiment of the invention, if it is alternatively determined that the OP pertains to a MOVE operation or is directed to NONE, then the process may alternatively proceed to Step 1110.

In Step 1108, after determining (in Step 1106) that the OP (obtained in Step 1104) pertains to an ADD operation, a lookup is performed on a new class cache (described above) (see e.g., FIG. 2I) using the CID (also obtained in Step 1104). In one embodiment of the invention, the new class cache may represent a data structure that may, either temporarily or permanently, maintain metadata describing new class(es) sought-to-be-programmed on the network device. Further, the lookup may result in the identification of a cache entry in the new class cache. The lookup, leading to the aforementioned identification of the cache entry, may entail: (a) sequentially or concurrently (i.e., in parallel) comparing the obtained CID with a stored CID in each cache entry allocated in the new class cache; (b) matching the obtained CID to a stored CID in one of the cache entries; and (c) designating the cache entry, within which a stored CID matches the obtained CID, as the aforementioned identified cache entry. Following the identification of the cache entry, the process may proceed to Step 1120 (see e.g., FIG. 11B).

In Step 1110, after alternatively determining (in Step 1106) that the OP (obtained in Step 1104) pertains to a MOVE operation, or is directed to NONE, a lookup is performed on a class table (see e.g., FIG. 2A or FIG. 2E), residing on the network device, using the CID (also obtained in Step 1104). In one embodiment of the invention, a class slot of the class table may be identified as a result of the lookup. In identifying the aforementioned class slot, the lookup may entail: (a) sequentially or concurrently (i.e., in parallel) comparing the obtained CID with a stored CID in each occupied (or non-empty) class slot allocated in the class table; (b) matching the obtained CID to a stored CID in one of the occupied class slots; and (c) designating the class slot, within which a stored CID matches the obtained CID, as the aforementioned identified class slot.

In Step 1112, a class rule offset (CRO) and a trial CRO are retrieved from the class slot (identified in Step 1110) (see e.g., FIG. 2B). In one embodiment of the invention, the CRO may refer to a numerical value (e.g., a natural number including zero) that may reflect a current position of a first policy or rule, of a given existing (or active) class (i.e., associated with the CID) programmed on the network device, in a rule table, where the CRO is relative to a first (or topmost) rule slot positioned in the rule table. Meanwhile, the trial CRO may refer to a numerical value (e.g., a natural number including zero) that may reflect the proposed position of the first policy or rule, of the given existing/active class (i.e., associated with the CID), in a trial rule table, where the trial CRO is relative to a first (or topmost) rule slot positioned in the trial rule table.

In Step 1114, an absolute offset difference (AOD) is calculated. In one embodiment of the invention, the AOD may refer to a numerical value (e.g., a natural number including zero) that represents the absolute value of a calculated difference between the CRO and the trial CRO (retrieved in Step 1112). Effectively, AOD=|CRO−trial CRO|.

In Step 1116, an ordered-shift of the rule table, on the network device, is performed. Generally, in one embodiment of the invention, an ordered-shifting of the rule table may refer to the intelligent insertion, migration, and/or removal (i.e., in-place update) of metadata stored across rule slots of the rule table, where the in-place update modifies the active policies or rules programmed on the network device while minimizing a window in which the active policies/rules may be disrupted by the modification(s). Specifically, the aforementioned ordered-shift may be defined through the following parameters: (a) a subset start index (SSI)=the CRO (retrieved in Step 1112); (b) an ordered-shift direction (OSD)=the SD (obtained in Step 1104); and (c) an ordered-shift quantity (OSQ)=the AOD (calculated in Step 1114). Ordered-shifting of the rule table is described in further detail below with respect to FIGS. 12A and 12B. Following the aforementioned ordered-shifting of the rule table (in Step 1116), the process may proceed to Step 1140 (see e.g., FIG. 11B).

Turning to FIG. 11B, in Step 1120, a trial rule slot index (RSI), a class priority (CP), a class rule set (CRS), and a target class sequence (TCS) index are retrieved from the cache entry (identified in Step 1108) (see e.g., FIG. 11A). The various aforementioned data objects are described in further detail above with respect to FIGS. 2I and 8A-8C.

In Step 1122, the CRS (retrieved in Step 1120), associated with a given new class sought-to-be-programmed on the network device, is inserted into the rule table (see e.g., FIG. 2C or FIG. 2E). Specifically, in one embodiment of the invention, the CRS may be inserted, into the rule table, starting at the rule slot, of the rule table, mapped to the trial RSI (also retrieved in Step 1120). In Step 1124, a class rule count (CRC), for the given new class, is derived from the CRS. Specifically, in one embodiment of the invention, the CRC may be derived by identifying a cardinality of the CRS. The cardinality of the CRS may refer to the number of policies or rules constituting the CRS.

In Step 1126, a lookup is performed on the class table (see e.g., FIG. 2A or FIG. 2E), residing on the network device, using the TCS index (retrieved in Step 1120). In one embodiment of the invention, the lookup may result in the identification of a class slot in the class table. Further, the lookup, leading to the aforementioned identification of the class slot, may entail: (a) sequentially or concurrently (i.e., in parallel) comparing the TCS index with a class slot index (CSI) associated with each class slot in the class table; (b) matching the TCS index to a CSI associated with one of the class slots; and (c) designating the class slot, associated with the CSI matching the TCS index, as the aforementioned identified class slot.

In Step 1128, the class slot (identified in Step 1126) is subsequently populated. That is, in one embodiment of the invention, the following data objects may be stored in the identified class slot: (a) the CID (obtained in Step 1104), which uniquely identifies (or names) the given new class; (b) the CP (retrieved in Step 1120), which reflects a priority level (or level of importance) of the given new class relative to other existing or new classes; (c) the CRC (derived in Step 1124), which indicates the cardinality of the CRS (also retrieved in Step 1120) and associated with the given new class; and (d) a CRO, for the given new class, set as the trial RSI (also retrieved in Step 1120). Recall that the CRO may refer to a numerical value (e.g., a natural number including zero) that may reflect a current position of a first policy or rule, of the given new class (in this case), in the rule table, where the CRO is relative to a first (or topmost) rule slot positioned in the rule table. Following the population of the identified class slot, the process may proceed to Step 1144 (described below).

In Step 1140, a CSI, mapping to the class slot (identified in Step 1110) (see e.g., FIG. 11A), is obtained. In one embodiment of the invention, the CSI may refer to a numerical value (e.g., a natural number, which may or may not include zero) that identifies, and indicates the position (in the class table) of, the aforementioned class slot.

In Step 1142, an ordered-shift of the class table, on the network device, is performed. Generally, in one embodiment of the invention, an ordered-shifting of the class table may refer to the intelligent insertion, migration, and/or removal (i.e., in-place update) of metadata stored across class slots of the class table, where the in-place update modifies the active classes programmed on the network device while minimizing a window in which the active classes may be disrupted by the modification(s). Specifically, the aforementioned ordered-shift may be defined through the following parameters: (a) a subset start index (SSI)=the CSI (obtained in Step 1140); (b) an ordered-shift direction (OSD)=the SD (obtained in Step 1104); and (c) an ordered-shift quantity (OSQ)=a natural number value of one. Ordered-shifting of the class table is described in further detail below with respect to FIGS. 12A and 12B.

In Step 1144, a determination is made as to whether additional elements of the OCS (obtained in Step 1100) remain to be processed. Accordingly, in one embodiment of the invention, if it is determined that at least one other OCS element remains to be processed, then the process may proceed to Step 1146. On the other hand, in another embodiment of the invention, if it is alternatively determined that no more OCS elements remain to be processed, then the process ends.

In Step 1146, after determining (in Step 1144) that at least one other OCS element remains to be processed, a next OCS element (identified by a next index in ascending order) is processed. Processing the next OCS element may entail the process proceeding to Step 1102, where a COI stored in the next OCS element may be retrieved therefrom.

Figure 12A:
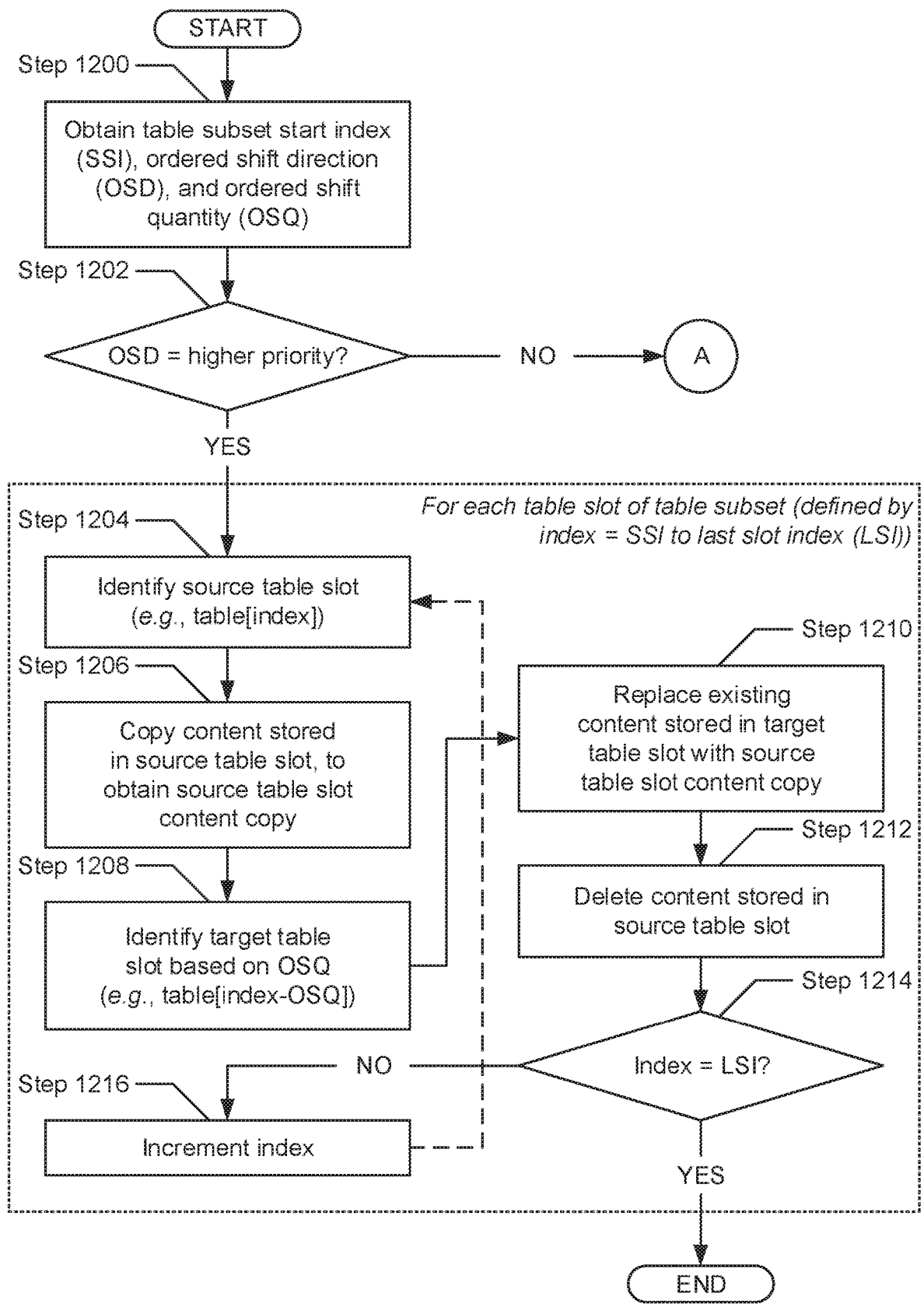
FIGS. 12A and 12B show flowcharts describing a method for ordered shifting slots in class and rule tables in accordance with one or more embodiments of the invention.
Figure 12B:
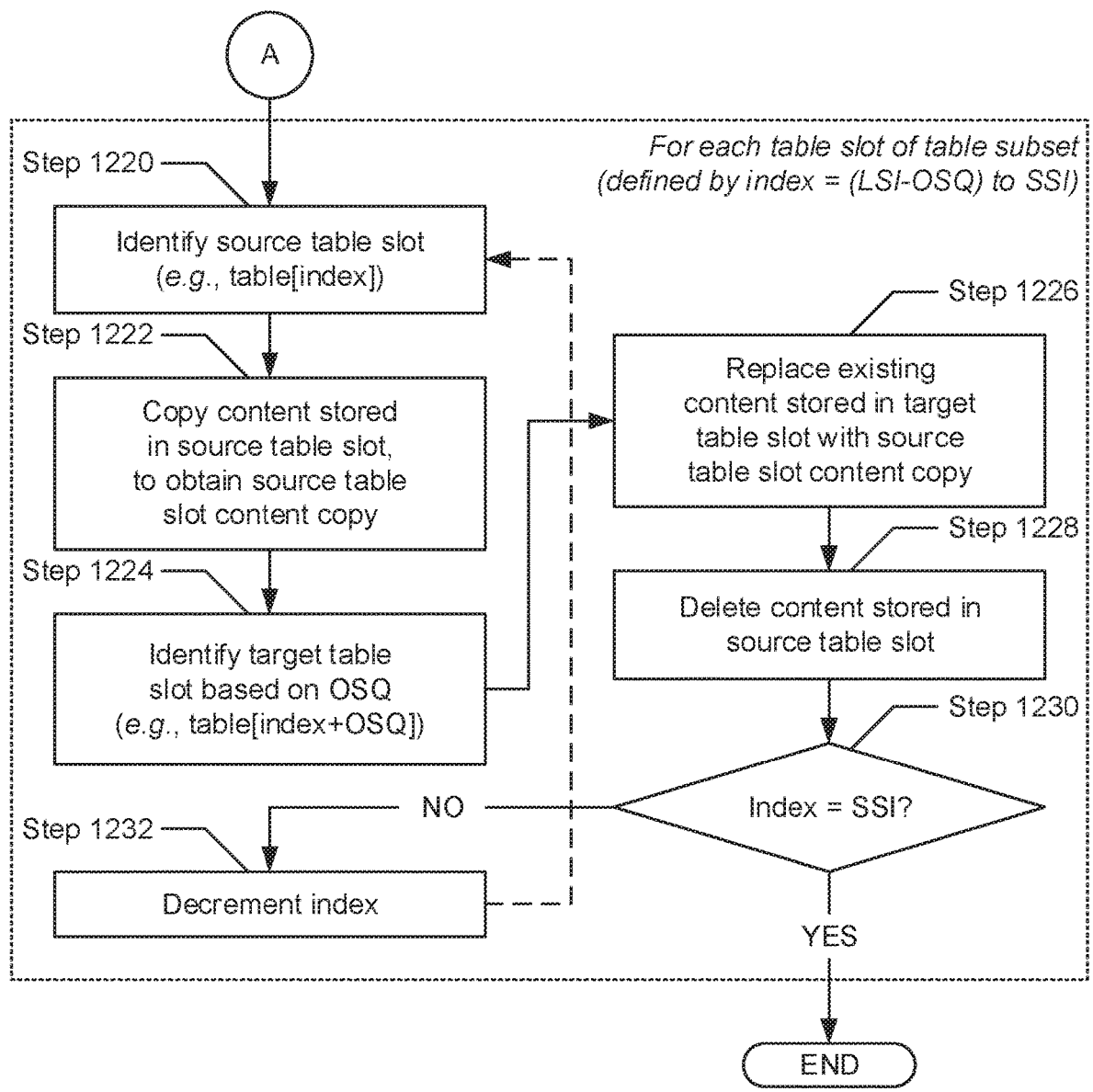

FIGS. 12A and 12B show flowcharts describing a method for ordered shifting slots in class and rule tables in accordance with one or more embodiments of the invention. The various steps outlined below may be performed by the policy update programmer (PUP) residing on a network device (see e.g., FIG. 1). Further, while the various steps in the flowchart(s) are described sequentially, one of ordinary skill will appreciate that some or all steps may be executed in different orders, may be combined or omitted, and some or all steps may be executed in parallel.

Turning to FIG. 12A, in Step 1200, a table subset start index (SSI), an ordered shift direction (OSD), and an ordered shift quantity (OSQ) are obtained. In one embodiment of the invention, the aforementioned parameters may define a desired ordered-shift to be performed on a subset of a table (e.g., a class table or a rule table (see e.g., FIG. 2E)). Generally, an ordered-shifting of a table may refer to the intelligent insertion, migration, and/or removal (i.e., in-place update) of metadata stored across table slots (e.g., class slots or rule slots) of the table, where the in-place update modifies the active policies or rules programmed on the network device while minimizing a window in which the active policies/rules may be disrupted by the modification(s).

Further, in one embodiment of the invention, the table SSI may refer to a numerical value (e.g., a positive integer) that identifies an index indicating a position of a table slot in the table, where the table slot represents a first table slot of the table subset on which the ordered-shifting is to be performed. The table subset may further be defined by a last slot index (LSI), which may refer to another numerical value (e.g., a positive integer) that identifies an index indicating the position of a last table slot in the table. By way of an example, consider an exemplary table that includes ten table slots, identified by indices {0, 1, 2, 3, 4, 5, 6, 7, 8, 9}, respectively, where LSI=9. Should the obtained SSI direct to the fifth index (i.e., SSI=4), then the table subset, on which the ordered-shifting is to be performed, may include the subset of table slots identified by the indices {4, 5, 6, 7, 8, 9}, respectively.

In one embodiment of the invention, the OSD may refer to a direction, along a dimension of the table subset, that may be associated with the ordered-shifting to be performed. That is, the OSD may specify that the ordered-shifting of table slot content (i.e., metadata) ought to migrate from a lower priority (i.e., lower positioned) table slot to a higher priority (i.e., higher positioned) table slot. In this case, the aforementioned content migration and, therefore, the ordered-shifting, follows a path towards and ending at the higher priority table slot. Accordingly, the OSD here is directed to a higher priority. Alternatively, the OSD may specify that the ordered-shifting of table slot content ought to instead migrate from a higher priority (i.e., higher positioned) table slot to a lower priority (i.e., lower positioned) table slot. In this alternative case, the aforementioned content migration and, therefore, the ordered-shifting, follows another path towards and ending at the lower priority table slot. Accordingly, the OSD here is directed to a lower priority.

In one embodiment of the invention, the OSQ may refer to a numerical value (e.g., a natural number, which may or may not include zero) that defines a number of table slots that given table slot content (i.e., metadata) ought to migrate (or order-shift) away from an original or source table slot in which the given table slot content is stored. For example, an exemplary OSQ may specify the numerical value of four, indicating that the content in a given table slot (of the table subset) ought to order-shift from a source table slot to a destination (or target) table slot that resides four table slots away in the direction specified by the OSD.

In Step 1202, a determination is made as to whether the OSD (obtained in Step 1200) is directed to a higher priority. In one embodiment of the invention, if it is determined that the OSD is directed to a higher priority, then the process may proceed to Step 1204. On the other hand, in another embodiment of the invention, if it is alternatively determined that the OSD is not directed to a higher priority (i.e., is instead directed to a lower priority), then the process may alternatively proceed to Step 1220 (see e.g., FIG. 12B).

Hereinafter, Steps 1204 through 1216 are to be performed for each table slot index (e.g., class slot index (CSI) or rule slot index (RSI)), in ascending index order, starting from the SSI (obtained in Step 1200) to a LSI (described above) of the table (e.g., class table or rule table). The subset of table slots, identified by the range of indices between and including the SSI and the LSI, may define the above-described table subset (e.g., subset of a class table or rule table).

With this in mind, in Step 1204, after determining (in Step 1202) that the OSD (obtained in Step 1200) is directed to a higher priority, a source table slot is identified. In one embodiment of the invention, the source table slot may refer to a table slot of the table identified by the table slot index (i.e., a current table slot index being considered). The source table slot may be expressed, but is not limited to, the following bracket notation: source table slot=table[index], where index=the current table slot index being considered.

In Step 1206, content stored in the source table slot (identified in Step 1204) is replicated. In one embodiment of the invention, replication of the source table slot content may result in obtaining a source table slot content copy. In Step 1208, a target table slot is identified. In one embodiment of the invention, the target table slot may refer to a table slot of the table identified based on the table slot index (i.e., the current table slot index being considered) and the OSQ (obtained in Step 1200) in view of the OSD (determined to be directed to a higher priority in Step 1202). The target table slot may be expressed, but is not limited to, the following bracket notation: target table slot=table[index−OSQ], where index−OSQ=a destination table slot index defined to be OSQ table slots away from the current table slot index being considered, and in the higher priority direction (i.e., OSD).

In Step 1210, the existing content stored in the target table slot (identified in Step 1208) is replaced by or with the source table slot content copy (obtained in Step 1206). In the bracket notation used thus far, the aforementioned content replacement operation may be expressed as follows: table [index−OSQ] table[index]. Thereafter, in Step 1212, the existing content stored in the source table slot (identified in Step 1204) is deleted, thereby leaving a blank or null value stored in the source table slot.

In Step 1214, a determination is made as to whether the table slot index (currently being considered) matches the LSI of the table. In one embodiment of the invention, if it is determined that the table slot index matches the LSI, indicating that all table slots of the table subset have been order-shifted, then the process ends. On the other hand, in another embodiment of the invention, if it is alternatively determined that the table slot index does not match the LSI, indicating that at least one table slot of the table subset remains to be order-shifted, then the process may alternatively proceed to Step 1216.

In Step 1216, after determining (in Step 1214) that the table slot index (currently being considered) does not match the LSI of the table, the aforementioned table slot index is incremented (by one). Following the incrementing of the table slot index (to obtain a next table slot index), the process may proceed to Step 1204, where a next source table slot may be identified using the next table slot index.

Turning to FIG. 12B, Steps 1220 through 1232 are to be performed for each table slot index, in descending index order, starting from a table slot index that is OSQ table slots away, relative to the LSI (described above) of the table (e.g., the class table or the rule table), to the SSI (obtained in Step 1200).

With this in mind, in Step 1220, after alternatively determining (in Step 1202) that the OSD (obtained in Step 1200) is directed to a lower priority, a source table slot is identified. In one embodiment of the invention, the source table slot may refer to a table slot of the table identified by the table slot index (i.e., a current table slot index being considered). The source table slot may be expressed, but is not limited to, the following bracket notation: source table slot=table[index], where index=the current table slot index being considered.

In Step 1222, content (i.e., metadata) stored in the source table slot (identified in Step 1220) is replicated. In one embodiment of the invention, replication of the source table slot content may result in obtaining a source table slot content copy. In Step 1224, a target table slot is identified. In one embodiment of the invention, the target table slot may refer to a table slot of the table identified based on the table slot index (i.e., the current table slot index being considered) and the OSQ (obtained in Step 1200) in view of the OSD (determined to be directed to a lower priority in Step 1202). The target table slot may be expressed, but is not limited to, the following bracket notation: target table slot=table[index+OSQ], where index+OSQ=a destination table slot index defined to be OSQ table slots away from the current table slot index being considered, and in the lower priority direction (i.e., OSD).

In Step 1226, the existing content stored in the target table slot (identified in Step 1224) is replaced by or with the source table slot content copy (obtained in Step 1222). In the bracket notation used thus far, the aforementioned content replacement operation may be expressed as follows: table [index+OSQ] table[index]. Thereafter, in Step 1228, the existing content stored in the source table slot (identified in Step 1220) is deleted, thereby leaving a blank or null value stored in the source table slot.

In Step 1230, a determination is made as to whether the table slot index (currently being considered) matches the SSI (obtained in Step 1200). In one embodiment of the invention, if it is determined that the table slot index matches the SSI, indicating that the relevant table slots of the table subset has been order-shifted, then the process ends. On the other hand, in another embodiment of the invention, if it is alternatively determined that the table slot index does not match the SSI, indicating that at least one relevant table slot of the table subset remains to be order-shifted, then the process may alternatively proceed to Step 1232.

In Step 1232, after determining (in Step 1230) that the table slot index (currently being considered) does not match the SSI (obtained in Step 1200), the aforementioned table slot index is decremented (by one). Following the decrementing of the table slot index (to obtain a next table slot index), the process may proceed to Step 1220, where a next source table slot may be identified using the next table slot index.

FIGS. 13A-13K shows an example scenario in accordance with one or more embodiments of the invention. The following example scenario, presented in conjunction with components shown in FIGS. 13A-13K, is for explanatory purposes only and not intended to limit the scope of the invention.

Figure 13A:
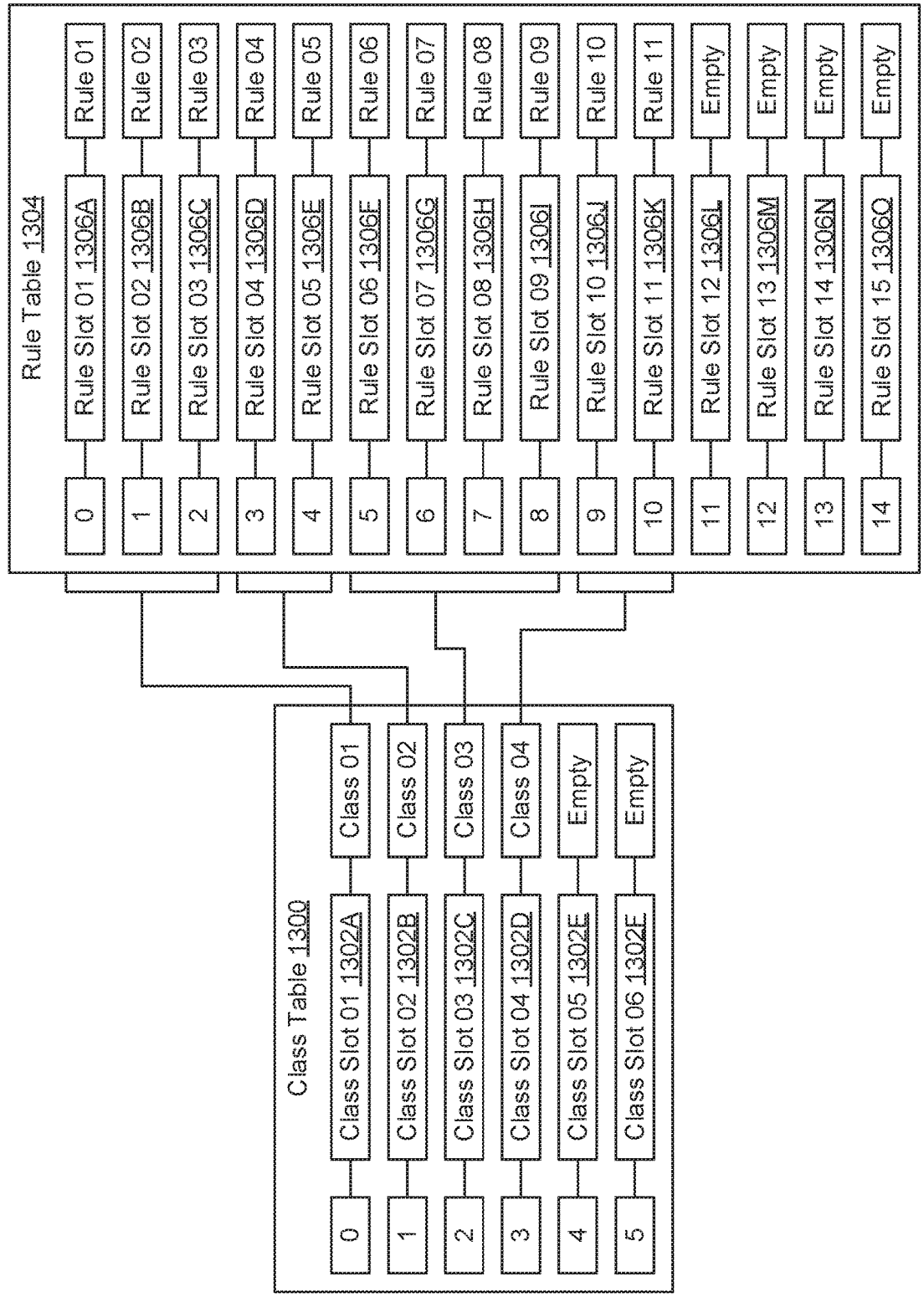
FIGS. 13A-13K show an example scenario in accordance with one or more embodiments of the invention.

Turning to FIG. 13A, consider the initial class table (1300) and initial rule table (1304) illustrated therein, which may reside on an exemplary network device (not shown). The initial class table (1300) is allocated six class slots (1302A-1302F), which are identified by class slot indices (CSIs) {0, 1, 2, 3, 4, 5}, respectively. Further, the first four class slots (1302A-1302D) are occupied with metadata pertaining to Classes 01, 02, 03, and 04, respectively, whereas the last two class slots (1302E, 1302F) are unoccupied or empty. On the other hand, the initial rule table (1304) is allocated fifteen rule slots (1306A-1306Q), which are identified by the rule slot indices (RSIs) {0, 1, 2, 3, 4, 5, . . . , 14}, respectively. Moreover, the first eleven rule slots (1306A-1306K) are occupied with metadata pertaining to Rules 01, 02, 03, 04, . . . , 11, respectively, whereas the last four rule slots (1306L-1306Q) are unoccupied or empty.

Also exhibited in FIG. 13A are the mappings linking each active class (i.e., Classes 01, 02, 03, and 04) to their respective class rule set (CRS), or set of active rules (i.e., Rules 01, 02, 03, . . . , 11) grouped by the active class. These mappings are outlined below.

Class 01 @ Class Slot 01 (1302A) identified by CSI=0
Rule 01 @ Rule Slot 01 (1306A) identified by RSI=0
Rule 02 @ Rule Slot 02 (1306B) identified by RSI=1
Rule 03 @ Rule Slot 03 (1306C) identified by RSI=2
Class 02 @ Class Slot 02 (1302B) identified by CSI=1
Rule 04 @ Rule Slot 04 (1306D) identified by RSI=3
Rule 05 @ Rule Slot 05 (1306E) identified by RSI=4
Class 03 @ Class Slot 03 (1302C) identified by CSI=2
Rule 06 @ Rule Slot 06 (1306F) identified by RSI=5
Rule 07 @ Rule Slot 07 (1306G) identified by RSI=6
Rule 08 @ Rule Slot 08 (1306H) identified by RSI=7
Rule 09 @ Rule Slot 09 (1306I) identified by RSI=8
Class 04 @ Class Slot 04 (1302D) identified by CSI=3
Rule 10 @ Rule Slot 10 (1306J) identified by RSI=9
Rule 11 @ Rule Slot 11 (1306K) identified by RSI=10

Figure 13B:
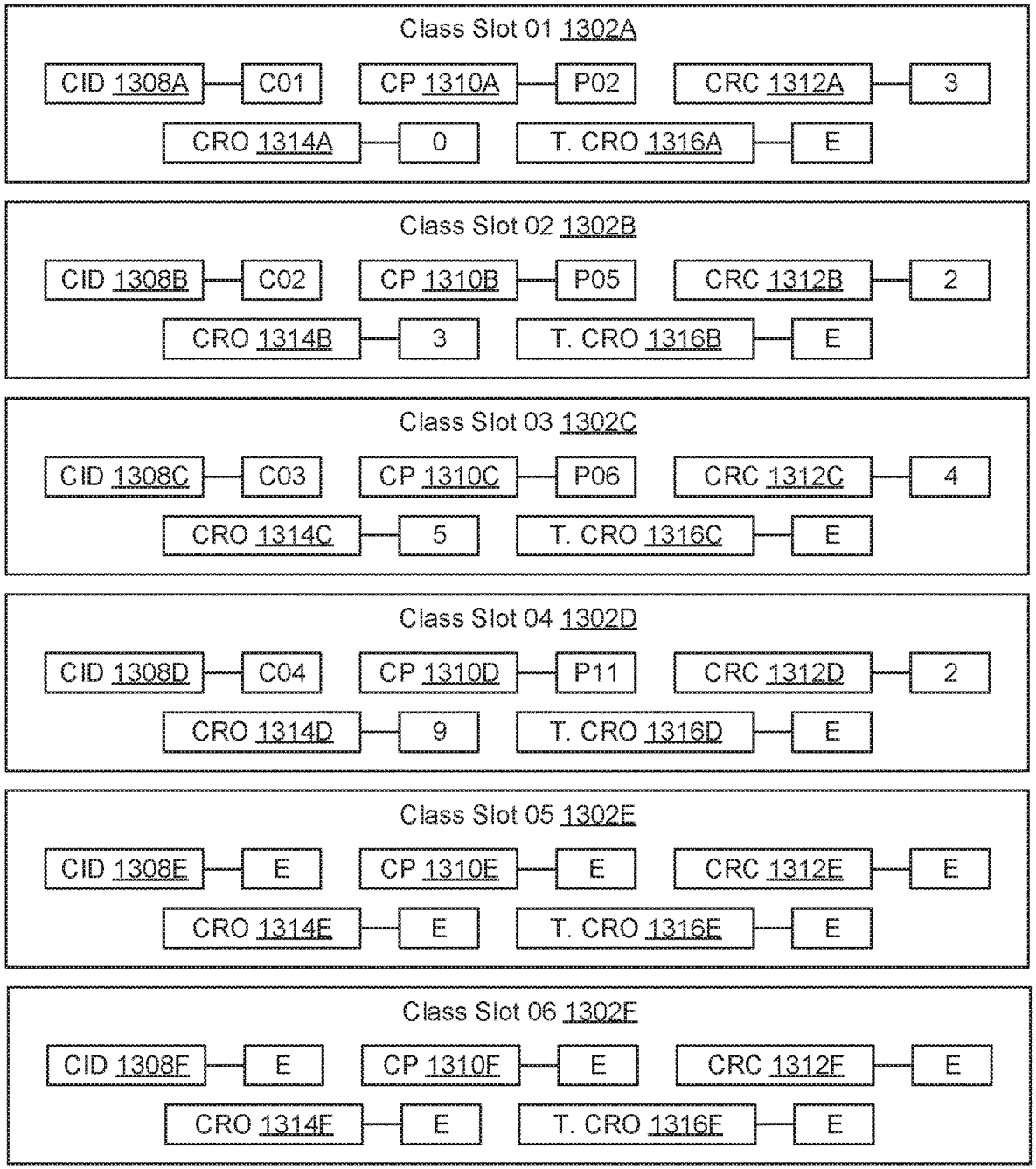

Turning to FIG. 13B, the various class metadata stored in each class slot (1302A-1302F) are portrayed. These various class metadata, stored in each class slot (1302A-1302F), is summarized below.

| Class Slot No. | Class Identifier (CID) | Class Priority (CP) | Class Rule Count (CRC) | Class Rule Offset (CRO) | Trial CRO |
|---|---|---|---|---|---|
| 01 | C01 | P02 | 3 | 0 | — |
| 02 | C02 | P05 | 2 | 3 | — |
| 03 | C03 | P06 | 4 | 5 | — |
| 04 | C04 | P11 | 2 | 9 | — |
| 05 | — | — | — | — | — |
| 06 | — | — | — | — | — |

Figure 13C:
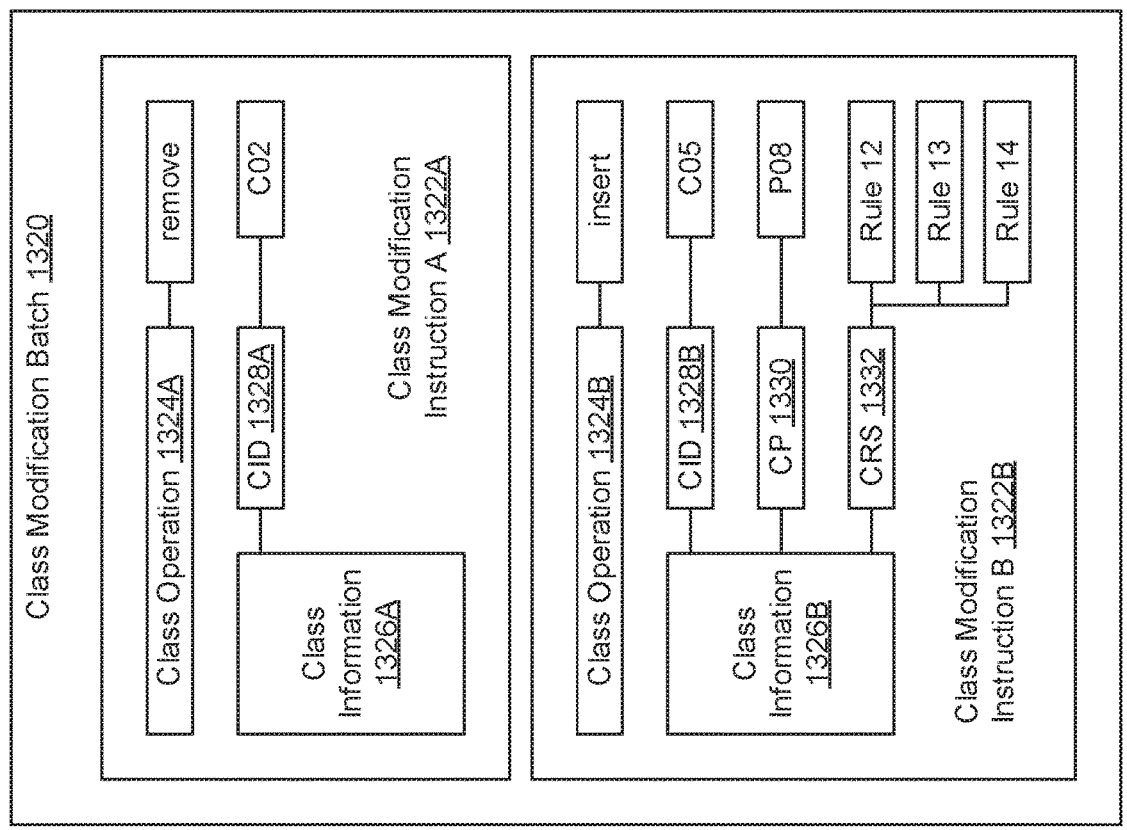

Turning to FIG. 13C, a class modification batch (1320) is shown, which the exemplary network device may have received. The class modification batch (1320) includes two class modification instructions (1332A, 1332B). The first class modification instruction (1332A) specifies a first class operation (1324A) directed to the class removal of an existing (or active) class programmed on the exemplary network device. The first class modification instruction (1332A) also specifies first class information (1326A) including a first class identifier (CID) (1328A)—i.e., C02— which uniquely identifies the existing class sought-to-be— removed from the exemplary network device.

Further, the second class modification instruction (1322B) specifies a second class operation (1324B) directed to the class insertion of a new class. The second class modification instruction (1322B) also specifies second class information (1326B) including: a second CID (1328B)—i.e., C05—which uniquely identifies the new class sought-to-be-programmed on the exemplary network device; a class priority (CP) (1330)—i.e., P08—assigned to the new class; and a class rule set (CRS) (1332) associated with the new class. The CRS (1332) encompasses three new rules—i.e., Rule 12, Rule 13, and Rule 14.

Figure 13D:
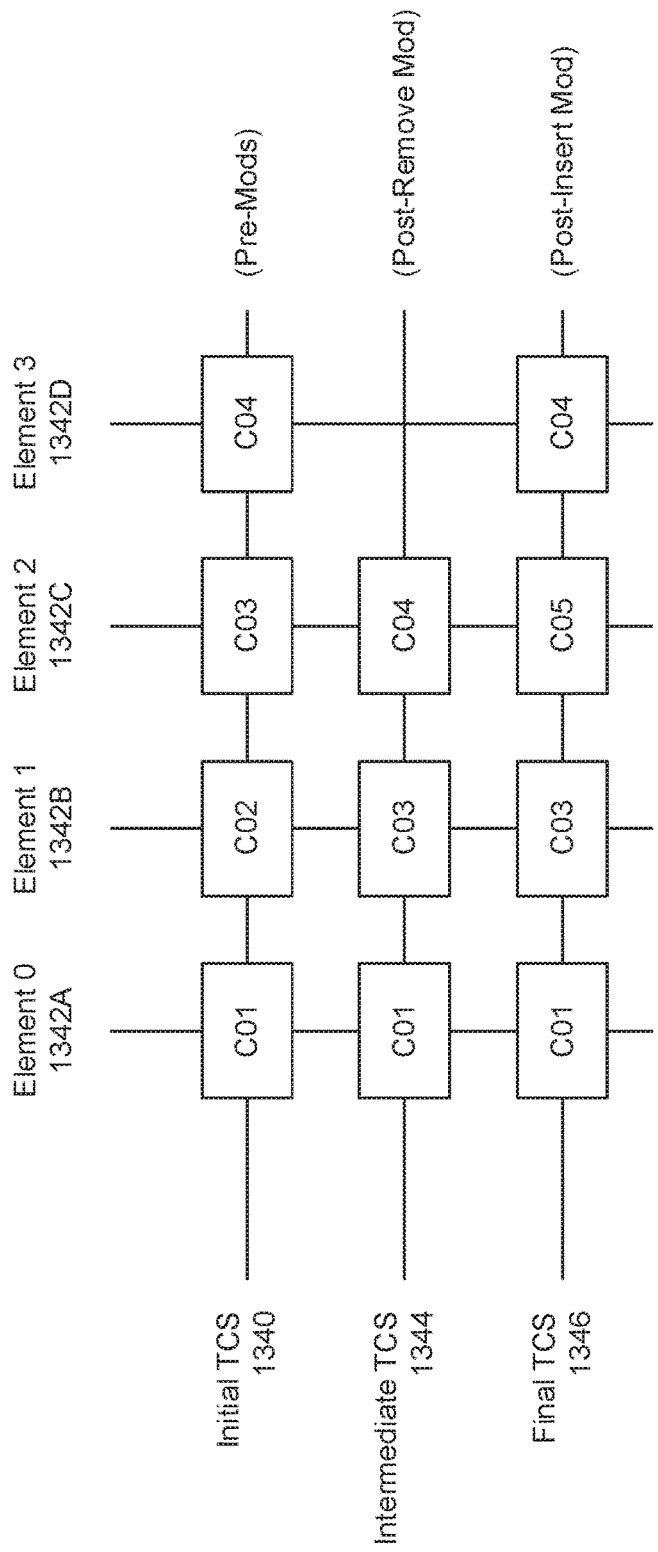

Turning to FIG. 13D, various states of a target class sequence (TCS) (see e.g., FIG. 2F) is illustrated. First, an initial TCS (1340) exhibits a sequence of CIDs, associated with the set of existing classes programmed on the exemplary network device, based on their relative CPs and prior to considering the effects introduced by either of the class modification instructions (1332A, 1332B). Summarily, the initial TCS (1340) includes the following sequence of CIDs (from highest CP to lowest CP): {Element 0 (1342A) storing CID C01 (CP=P02); Element 1 (1342B) storing CID C02 (CP=P05); Element 2 (1342C) storing CID C03 (CP=P06); and Element 3 (1342D) storing CID C04 (CP=P11)}.

Second, an intermediate TCS (1344) exhibits a sequence of CIDs, associated with the set of existing classes programmed on the exemplary network device, based on their relative CPs and after considering the effect introduced by the first class modification instruction (1332A). Summarily, the intermediate TCS (1344) includes the following sequence of CIDs (from highest CP to lowest CP): {Element 0 (1342A) storing CID C01 (CP=P02); Element 1 (1342B) storing CID C03 (CP=P06); and Element 2 (1342C) storing CID C04 (CP=P11)}. Further, the intermediate TCS (1344) omits CID C02, which had been previously included in the initial TCS (1340), because the first class modification instruction (1332A) calls on the class removal of an existing class assigned the CID C02.

Third, a final TCS (1346) exhibits a sequence of CIDs, associated with a mixed set of existing and new classes programmed and sought-to-be-programmed on the exemplary network device, based on their relative CPs and after considering the effect introduced by the second class modification instruction (1332B). Summarily, the final TCS (1346) includes the following sequence of CIDs (from highest CP to lowest CP): {Element 0 (1342A) storing CID C01 (CP=P02); Element 1 (1342B) storing CID C03 (CP=P06); Element 2 (1342C) storing CID C05 (CP=P08); and Element 3 (1342D) storing CID C04 (CP=P11)}. Further, the final TCS (1344) adds CID C05 at the appropriate position (i.e., Element 2 (1342C)) based on its CP relative to the other CPs. The addition of CID C05 transpires because of the second class modification instruction (1332B), which calls on the class insertion of a new class assigned the CID C05.

Figure 13E:
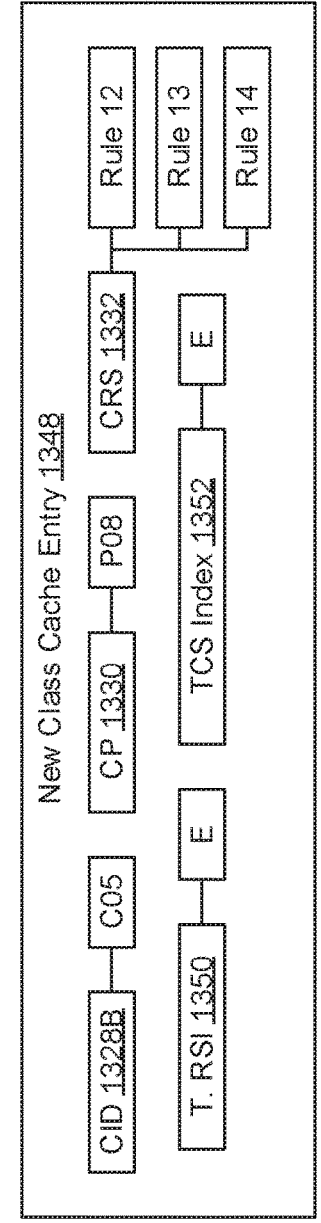

Turning to FIG. 13E, a cache entry (1348) of a new class cache (see e.g., FIG. 2I) is shown. The cache entry (1348) may have been generated to store, either permanently or temporarily, the class metadata relevant to the new class sought-to-be-programmed on the exemplary network device. The aforementioned class metadata, for the new class, is summarized below.

Class Metadata for New Class

| | |
|---|---|
| Class Identifier (CID) (1328B): | C05 |
| Class Priority (CP) (1330): | P08 |
| Class Rule Set (CRS) (1332): | Rule 12, Rule 13, Rule 14 |
| Trial Rule Set Index (RSI) (1350): | (not known yet) |
| Target Class Sequence (TCS) Index (1352): | (not known yet) |

Figure 13F:
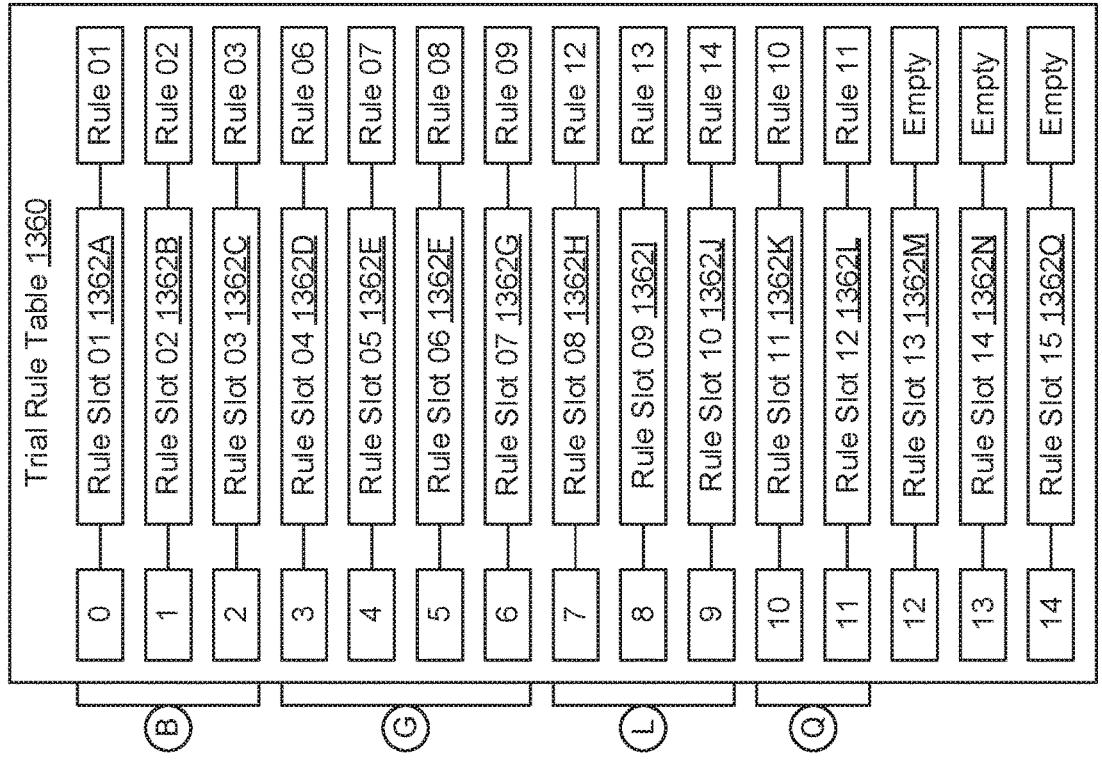
Figure 13F:
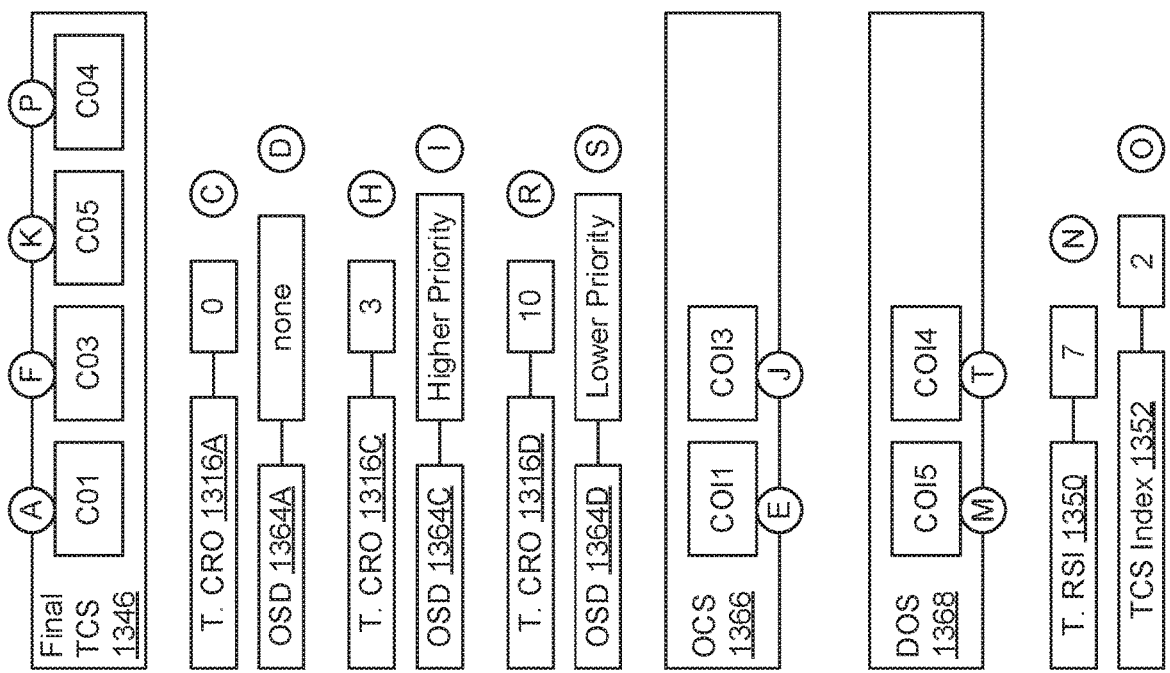

Turning to FIG. 13F, a series of steps transpire to populate a trial rule table (1360). When finalized, the trial rule table (1360) ought to maintain a proposed arrangement of rules in view of the two class modification instructions (1332A, 1332B). The aforementioned series of steps is outlined below.

Step A
Identify first Class Identifier (CID) (i.e., C01) specified in Final TCS (1346, FIG. 13F)
Step B
Perform lookup on Class Table (1300, FIG. 13A) using CID=C01, to identify existing Class Slot 01 (1302A, FIG. 13B)
From Class Slot 01, obtain Class Rule Count (CRC) (1312A, FIG. 13B) (i.e., 3) and Class Rule Offset (CRO) (1314A, FIG. 13B) (i.e., 0)
Perform lookup on Rule Table (1304, FIG. 13A) using CRC=3 and CRO=0, to identify Class Rule Set (CRS) for CID=C01 (i.e., [0] Rule 01, [1] Rule 02, and [2] Rule 03)
Current Trial Rule Table (1360, FIG. 13F)={(empty)}
Identify first available Rule Slot in Trial Rule Table (i.e., Rule Slot 01 (1362A, FIG. 13F))
Copy CRS={Rule 01, Rule 02, Rule 03} from Rule Table to Trial Rule Table starting at first available Rule Slot 01
Updated Trial Rule Table={[0] Rule 01, [1] Rule 02, [2] Rule 03}
Step C
Record Trial CRO (1316A, FIG. 13B) for CID=C01 as index for Rule Slot 01 (i.e., 0) of Trial Rule Table
Step D
Compare Trial CRO=0 with CRO=0 for CID=C01
Identify Operation Shift Direction (OSD) (1364A, FIG. 13F) is NONE for CID=C01 because Trial CRO matches CRO
Step E
Generate Class Operation Instruction (COI) (i.e., COI) for CID=C01, where Operation (OP)=MOVE, CID=C01, and Shift Direction (SD)=NONE
Current Operation Commit Sequence (OCS) (1366, FIG. 13F)={(empty)}; current Deferred Operation Stack (DOS) (1368, FIG. 13F)=(empty)
Push COI1 into OCS
Updated OCS={COI1}
Step F
Identify second CID (i.e., C03) specified in Final TCS (1346, FIG. 13F) Step G
Perform lookup on Class Table (1300, FIG. 13A) using CID=C03, to identify existing Class Slot 03 (1302C, FIG. 13B)
From Class Slot 03, obtain CRC (1312C, FIG. 13B) (i.e., 4) and CRO (1314C, FIG. 13B) (i.e., 5)
Perform lookup on Rule Table (1304, FIG. 13A) using CRC=4 and CRO=5, to identify CRS for CID=C03 (i.e., [5] Rule 06, [6] Rule 07, [7] Rule 08, and [8] Rule 09)
Current Trial Rule Table (1360, FIG. 13F)={[0] Rule 01, [1] Rule 02, [2] Rule 03}
Identify first available Rule Slot in Trial Rule Table (i.e., Rule Slot 04 (1362D, FIG. 13F))

Copy CRS={Rule 06, Rule 07, Rule 08, Rule 09} from Rule Table to Trial Rule Table starting at first available Rule Slot 04
Updated Trial Rule Table={[0] Rule 01, [1] Rule 02, [2] Rule 03, [3] Rule 06, [4] Rule 07, [5] Rule 08, [6] Rule 09}
Step H
Record Trial CRO (1316C, FIG. 13B) for CID=C03 as index for Rule Slot 04 (i.e., 3) of Trial Rule Table
Step I
Compare Trial CRO=3 with CRO=5 for CID=C03
Identify OSD (1364C, FIG. 13F) is Higher Priority for CID=C03 because Trial CRO is less than CRO
Step J
Generate COI (i.e., COI3) for CID=C03, where OP=MOVE, CID=C03, and SD=Higher Priority
Current OCS (1366, FIG. 13F)={COI1}; current DOS (1368, FIG. 13F)={(empty)}
Push COI3 into OCS
Updated OCS={COI1, CO13}
Step K
Identify third CID (i.e., C05) specified in Final TCS (1346, FIG. 13F)
Step L
Perform lookup on Class Table (1300, FIG. 13A) using CID=C05, to not identify an existing class slot
Because existing class slot not found, perform lookup on New Class Cache (not shown) using CID=C05, to identify New Class Cache Entry (1348, FIG. 13E)
From New Class Cache Entry, identify CRS (1332, FIG. 13E) for CID=C05 (i.e., Rule 12, Rule 13, Rule 14)
Current Trial Rule Table={[0] Rule 01, [1] Rule 02, [2] Rule 03, [3] Rule 06, [4] Rule 07, [5] Rule 08, [6] Rule 09}
Identify first available Rule Slot in Trial Rule Table (i.e., Rule Slot 08 (1362H, FIG. 13F))
Copy CRS={Rule 12, Rule 13, Rule 14} from Rule Table to Trial Rule Table starting at first available Rule Slot 08
Updated Trial Rule Table={[0] Rule 01, [1] Rule 02, [2] Rule 03, [3] Rule 06, [4] Rule 07, [5] Rule 08, [6] Rule 09, [7] Rule 12, [8] Rule 13, [9] Rule 14}
Step M
Generate COI (i.e., COI5) for CID=C05, where OP=ADD, CID=C05, and SD=NONE
Current OCS (1366, FIG. 13F)={COI1, COI3}; current DOS (1368, FIG. 13F)={(empty)}
Push COI5 into DOS
Updated DOS={COI5}
Step N
Record Trial Rule Slot Index (RSI) (1350, FIG. 13E/13F) for CID=C05 as index for Rule Slot 08 (i.e., 7) of Trial Rule Table
Step O
Record Target Class Sequence (TCS) Index (1352, FIG. 13E/13F) for CID=C05 as index (i.e., 2) occupied by CID=C05 in Final TCS (1346, FIG. 13F)
Step P
Identify fourth CID (i.e., C04) specified in Final TCS (1346, FIG. 13F)
Step Q
Perform lookup on Class Table (1300, FIG. 13A) using CID=C04, to identify existing Class Slot 04 (1302D, FIG. 13B)
From Class Slot 03, obtain CRC (1312D, FIG. 13B) (i.e., 2) and CRO (1314D, FIG. 13B) (i.e., 9)

Perform lookup on Rule Table (1304, FIG. 13A) using CRC=2 and CRO=9, to identify CRS for CID=C04 (i.e., [9] Rule 10, and [10] Rule 11)
Current Trial Rule Table (1360, FIG. 13F)={[0] Rule 01, [1] Rule 02, [2] Rule 03, [3] Rule 06, [4] Rule 07, [5] Rule 08, [6] Rule 09, [7] Rule 12, [8] Rule 13, [9] Rule 14}
Identify first available Rule Slot in Trial Rule Table (i.e., Rule Slot 11 (1362K, FIG. 13F))
Copy CRS={Rule 10, Rule 11} from Rule Table to Trial Rule Table starting at first available Rule Slot 11
Updated Trial Rule Table={[0] Rule 01, [1] Rule 02, [2] Rule 03, [3] Rule 06, [4] Rule 07, [5] Rule 08, [6] Rule 09, [7] Rule 12, [8] Rule 13, [9] Rule 14, [10] Rule 10, [11] Rule 11}
Step R
Record Trial CRO (1316D, FIG. 13B) for CID=C04 as index for Rule Slot 11 (i.e., 10) of Trial Rule Table
Step S
Compare Trial CRO=10 with CRO=9 for CID=C04
Identify OSD (1364D, FIG. 13F) is Lower Priority for CID=C04 because Trial CRO is greater than CRO
Step T
Generate COI (i.e., COI4) for CID=C04, where OP=MOVE, CID=C04, and SD=Lower Priority
Current OCS (1366, FIG. 13F)={COI1, COI3}; current DOS (1368, FIG. 13F)={COI5}
Push COI4 into DOS
Updated DOS={COI5, COI4}
After Step T (not Shown)
Update OCS (1366, FIG. 13F)={COI1, COI3} using DOS (1366, FIG. 13F)={COI5, COI4}

Figure 13G:
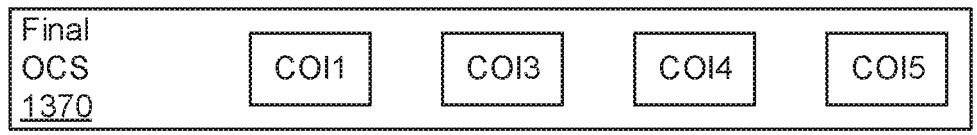
Figure 13H:
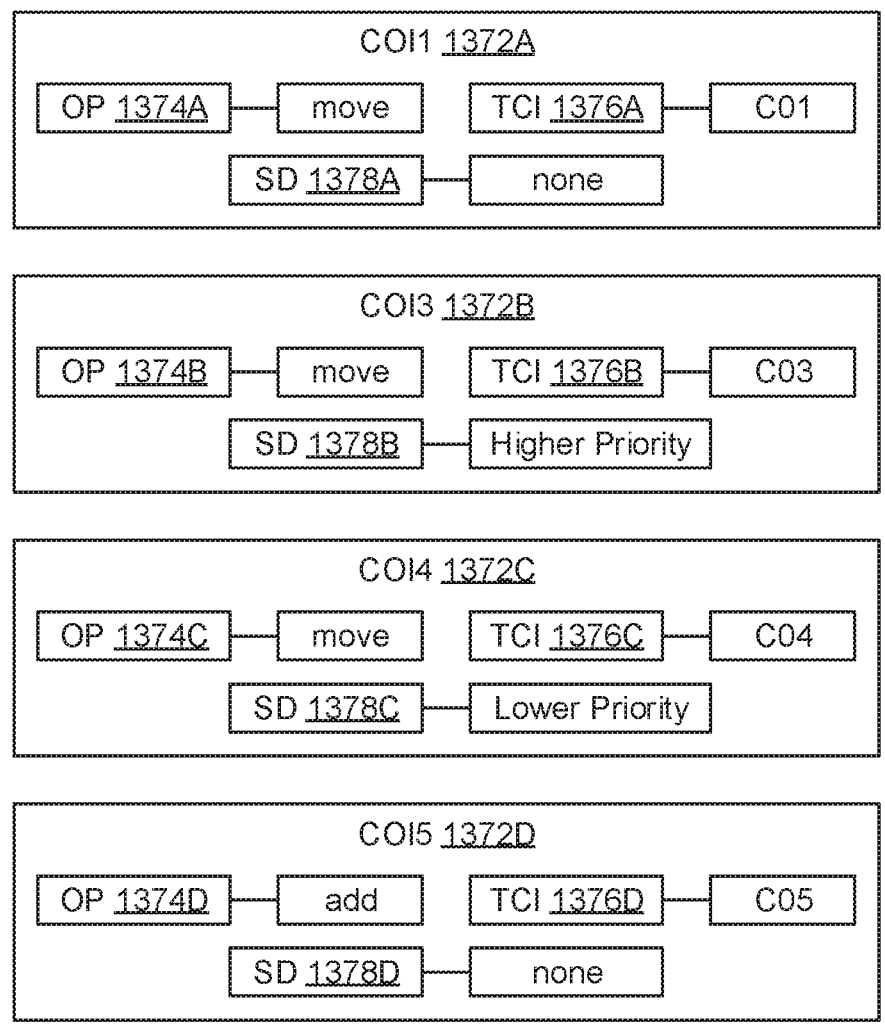

Turning to FIG. 13G, a final operation commit sequence (OCS) (1370) is shown. The final OCS (1370) may include the following sequence of class operation instructions (COIs): {COI1, COI3, COI4, COI5}. Turning to FIG. 13H, the set of parameters encapsulated by each COI, included in the final OCS (1370) shown in FIG. 13G, is portrayed. Each COI and their respective set of parameters is summarized below.

| Class Operation Instruction (COI) | Operation (OP) | Target Class Identifier (TCI) | Shift Direction (SD) |
|---|---|---|---|
| COI1 | MOVE | CID C01 | NONE |
| COI3 | MOVE | CID C03 | Higher Priority |
| COI4 | MOVE | CID C04 | Lower Priority |
| COI5 | ADD | CID C05 | NONE |

Figure 13I:
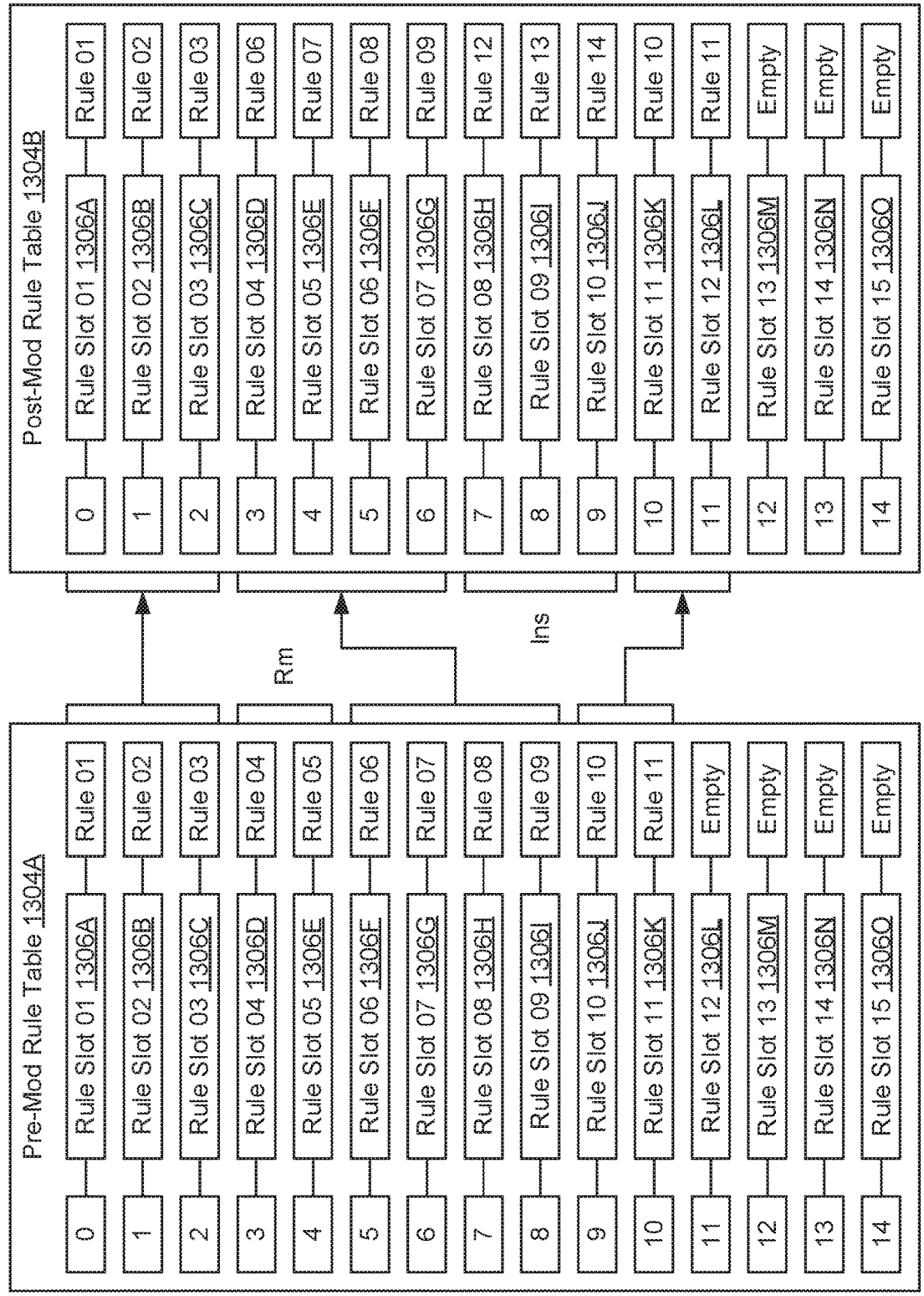

Turning to FIG. 13I, before and after states of the rule table, residing on the exemplary network device, are shared. The pre-mod rule table (1304A) pertains to the state of the rule table prior to committing the class modification instructions (1322A, 1322B). In contrast, the post-mod rule table (1304B) pertains to the state of the rule table following the commitment of the class modification instructions (1322A, 1322B). Summarily, in obtaining the post-mod rule table (1304B) from the pre-mod rule table (1304A): (a) the three active rules (i.e., Rule 01, Rule 02, and Rule 03) of existing Class 01 are retained without any ordered-shifting required; (b) the two active rules (i.e., Rule 04 and Rule 05) of existing Class 02 are removed according to the first class modification instruction (1322A); (c) the four active rules (i.e., Rule 06, Rule 07, Rule 08, and Rule 09) of existing Class 03 are retained with higher priority ordered-shifting transpiring; (d) the three new rules (i.e., Rule 12, Rule 13, and Rule 14) of new Class 05 are inserted according to the second class modification instruction (1322B), which does not require ordered-shifting; and (e) the two active rules (i.e., Rule 10 and Rule 11) of existing Class 04 are retained with lower priority ordered-shifting transpiring.

Figure 13J:
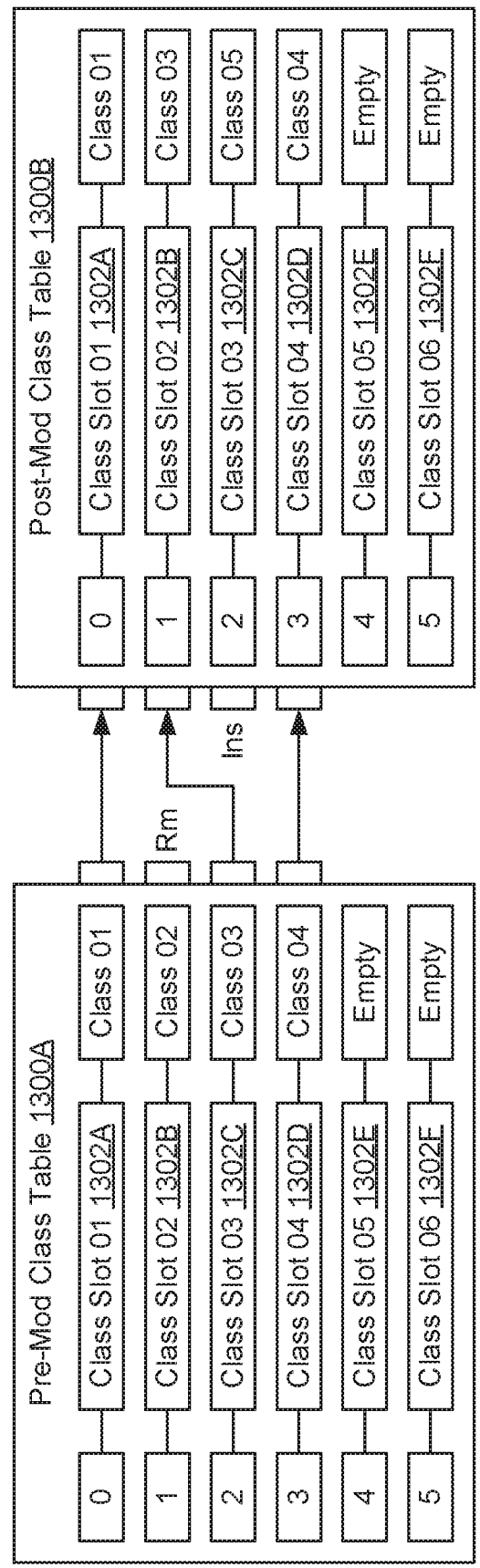

Turning to FIG. 13J, before and after states of the class table, residing on the exemplary network device, are shared. The pre-mod class table (1300A) pertains to the state of the class table prior to committing the class modification instructions (1322A, 1322B). In contrast, the post-mod class table (1300B) pertains to the state of the class table following the commitment of the class modification instructions (1322A, 1322B). Summarily, in obtaining the post-mod class table (1300B) from the pre-mod class table (1300A): (a) existing Class 01 is retained without any ordered-shifting required; (b) existing Class 02 is removed according to the first class modification instruction (1322A); (c) existing Class 03 is retained with higher priority ordered-shifting transpiring; (d) new Class 05 is inserted according to the second class modification instruction (1322B), which does not require ordered-shifting; and (e) existing Class 04 is retained with lower priority ordered-shifting transpiring.

Figure 13K:
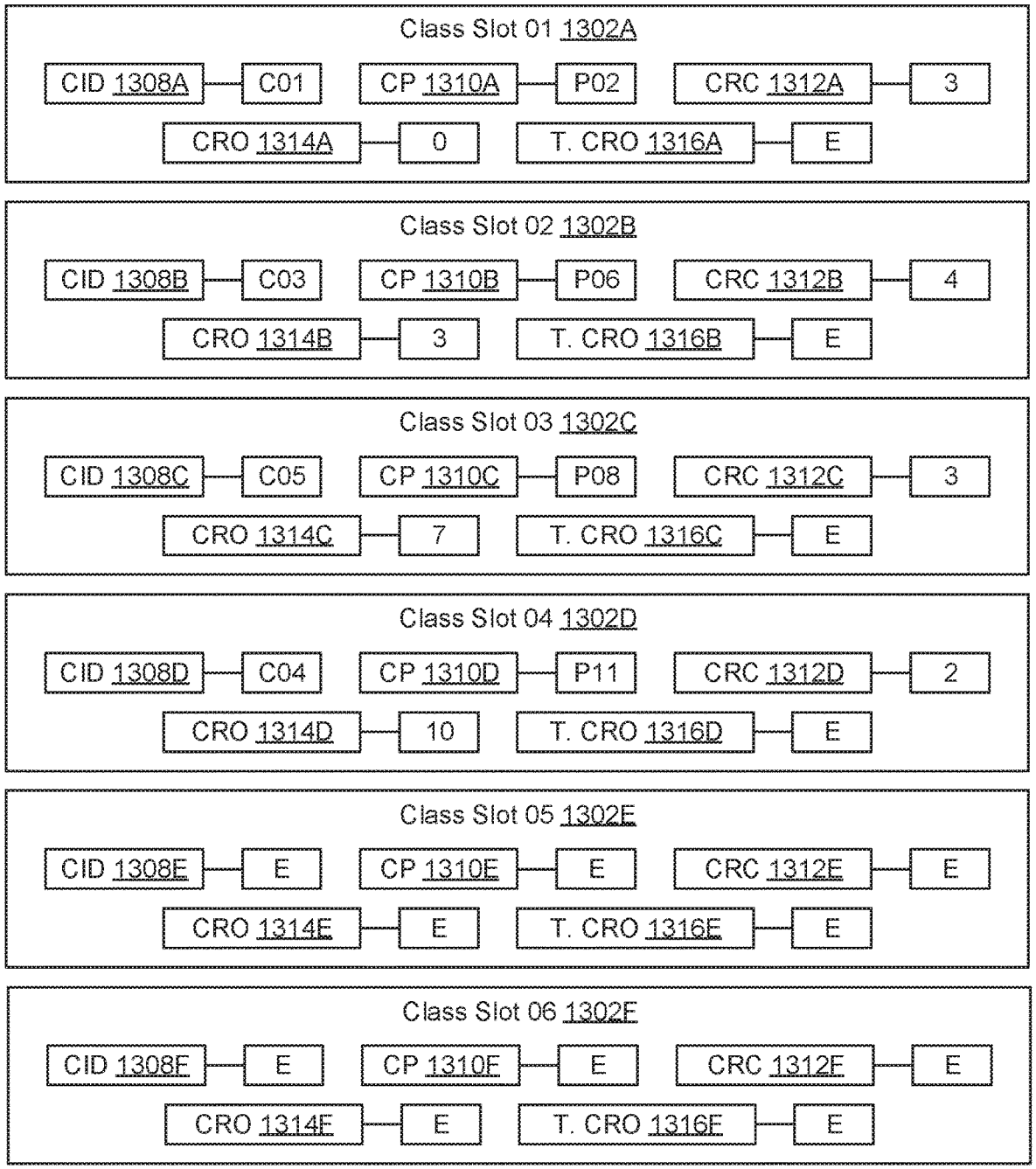

Turning to FIG. 13K, the various class metadata stored in each class slot (1302A-1302F) of the above-mentioned post-mod class table (1300B) are portrayed. These various class metadata, stored in each class slot (1302A-1302F), is summarized below.

| Class Slot No. | Class Identifier (CID) | Class Priority (CP) | Class Rule Count (CRC) | Class Rule Offset (CRO) | Trial CRO |
|---|---|---|---|---|---|
| 01 | C01 | P02 | 3 | 0 | — |
| 02 | C03 | P06 | 4 | 3 | — |
| 03 | C05 | P08 | 3 | 7 | — |
| 04 | C04 | P11 | 2 | 10 | — |
| 05 | — | — | — | — | — |
| 06 | — | — | — | — | — |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for programming a network device, comprising:
    receiving a class modification batch directed to performing policy in-place updates on the network device;
    obtaining a final target class sequence from updating an initial target class sequence based on the class modification batch;
    generating an operation commit sequence based on the final target class sequence, wherein generating the operation commit sequence, comprises:
        obtaining a deferred operation stack storing a set of class operation instructions, wherein the set of class operation instructions comprises a first class operation instruction;
        retrieving the first class operation instruction from the deferred operation stack;
        generating the operation commit sequence by:
            allocating a first operation commit sequence element of the operation commit sequence; and
            storing the first class operation instruction in the first operation commit sequence element; and
    performing, based on the operation commit sequence, the policy in-place updates on the network device by committing the class modification batch thereon.

2. The method of claim 1, wherein the class modification batch comprises a class modification instruction, wherein obtaining the final target class sequence, comprises:
    identifying, within the class modification instruction, a class operation and class information relevant to the class operation;
    making a determination that the class operation is directed to a class removal;
    extracting, based on the determination, a class identifier from the class information; and
    obtaining the final target class sequence based on updating the initial target class sequence using at least the class identifier.

3. The method of claim 2, wherein the class identifier uniquely identifies an existing class programmed on the network device.

4. The method of claim 3, wherein the existing class comprises a set of related rules collectively effecting an active policy on the network device.

5. The method of claim 1, wherein the class modification batch comprises a class modification instruction, wherein obtaining the final target class sequence, comprises:
    identifying, within the class modification instruction, a class operation and class information relevant to the class operation;
    making a determination that the class operation is directed to a class insertion;
    extracting, based on the determination, a class identifier and a class priority from the class information; and
    obtaining the final target class sequence based on updating the initial target class sequence using at least the class identifier and the class priority.

6. The method of claim 5, wherein the class identifier uniquely identifies a new class that is sought to be programmed on the network device.

7. The method of claim 6, wherein the class priority assigns a level of importance to the new class in relation to other classes programmed or sought to be programmed on the network device.

8. The method of claim 1, wherein the set of class operation instructions further comprises a second class operation instruction, wherein the second class operation instruction is stored before the first class operation instruction, wherein generating the operation commit sequence further comprises:
    retrieving the second class operation instruction from the deferred operation stack;
    generating the operation commit sequence by:
        allocating a second operation commit sequence element of the operation commit sequence; and
        storing the second class operation instruction in the second operation commit sequence element,
        wherein the second operation commit sequence element is positioned after the first operation commit sequence element.

9. The method of claim 1, wherein the set of class operation instructions further comprises a second class operation instruction, wherein the second class operation instruction is stored after the first class operation instruction, wherein generating the operation commit sequence further comprises:
    retrieving the second class operation instruction from the deferred operation stack;

generating the operation commit sequence by:
   allocating a second operation commit sequence element of the operation commit sequence; and
   storing the second class operation instruction in the second operation commit sequence element,
   wherein the second operation commit sequence element is positioned before the first operation commit sequence element,
   wherein the second class operation instruction is retrieved from the deferred operation stack prior to retrieving the first class operation instruction.

10. A method for programming a network device, comprising:
   receiving a class modification batch directed to performing policy in-place updates on the network device;
   obtaining a final target class sequence from updating an initial target class sequence based on the class modification batch;
   generating an operation commit sequence based on the final target class sequence; and
   performing, based on the operation commit sequence, the policy in-place updates on the network device by committing the class modification batch thereon,
   wherein the operation commit sequence comprises an operation commit sequence element, wherein committing the class modification batch on the network device, comprises:
      retrieving a class operation instruction stored in the operation commit sequence element;
      obtaining, from the class operation instruction, an operation, a class identifier, and a shift direction;
      making a determination that the operation is a MOVE operation;
      performing a lookup on a class table using the class identifier, to identify a class slot of a plurality of class slots in the class table;
      retrieving a class rule offset and a trial class rule offset from the class slot;
      calculating an absolute offset difference using the class rule offset and the trial class rule offset; and
      performing an ordered-shift of at least a subset of a rule table, wherein the ordered-shift is defined by the shift direction, the class rule offset, and the absolute offset difference.

11. The method of claim 10, wherein the shift direction is directed to a higher priority or a lower priority.

12. A non-transitory computer readable medium (CRM) comprising computer readable program code, which when executed by a computer processor residing on a network device, enables the computer processor to:
   receive a class modification batch directed to performing policy in-place updates on the network device;
   obtain a final target class sequence from updating an initial target class sequence based on the class modification batch;
   generate an operation commit sequence based on the final target class sequence, wherein generating the operation commit sequence, comprises:
      obtaining a deferred operation stack storing a set of class operation instructions, wherein the set of class operation instructions comprises a first class operation instruction;
      retrieving the first class operation instruction from the deferred operation stack;
      generating the operation commit sequence by:
         allocating a first operation commit sequence element of the operation commit sequence; and
         storing the first class operation instruction in the first operation commit sequence element; and
   perform, based on the operation commit sequence, the policy in-place updates on the network device by committing the class modification batch thereon.

13. The non-transitory CRM of claim 12, wherein the class modification batch comprises a class modification instruction, wherein the computer readable program code, when executed by the computer processor, further enables the computer processor to:
   obtain the final target class sequence, by:
      identifying, within the class modification instruction, a class operation and class information relevant to the class operation;
      making a determination that the class operation is directed to a class removal;
      extracting, based on the determination, a class identifier from the class information; and
      obtaining the final target class sequence based on updating the initial target class sequence using at least the class identifier.

14. The non-transitory CRM of claim 13, wherein the class identifier uniquely identifies an existing class programmed on the network device.

15. The non-transitory CRM of claim 14, wherein the existing class comprises a set of related rules collectively effecting an active policy on the network device.

16. The non-transitory CRM of claim 12, wherein the class modification batch comprises a class modification instruction, wherein the computer readable program code, when executed by the computer processor, further enables the computer processor to:
   obtain the final target class sequence, by:
      identifying, within the class modification instruction, a class operation and class information relevant to the class operation;
      making a determination that the class operation is directed to a class insertion;
      extracting, based on the determination, a class identifier and a class priority from the class information; and
      obtaining the final target class sequence based on updating the initial target class sequence using at least the class identifier and the class priority.

17. The non-transitory CRM of claim 16, wherein the class identifier uniquely identifies a new class that is sought to be programmed on the network device.

18. The non-transitory CRM of claim 17, wherein the class priority assigns a level of importance to the new class in relation to other classes programmed or sought to be programmed on the network device.

19. A non-transitory computer readable medium (CRM) comprising computer readable program code, which when executed by a computer processor residing on a network device, enables the computer processor to:
   receive a class modification batch directed to performing policy in-place updates on the network device;
   obtain a final target class sequence from updating an initial target class sequence based on the class modification batch;
   generate an operation commit sequence based on the final target class sequence; and
   perform, based on the operation commit sequence, the policy in-place updates on the network device by committing the class modification batch thereon, wherein the operation commit sequence comprises an operation commit sequence element, wherein the computer readable program code, when executed by the computer processor, further enables the computer processor to:

commit the class modification batch on the network device, by:
- retrieving a class operation instruction stored in the operation commit sequence element;
- obtaining, from the class operation instruction, an operation, a class identifier, and a shift direction;
- making a determination that the operation is a MOVE operation;
- performing a lookup on a class table using the class identifier, to identify a class slot of a plurality of class slots in the class table;
- retrieving a class rule offset and a trial class rule offset from the class slot;
- calculating an absolute offset difference using the class rule offset and the trial class rule offset; and
- performing an ordered-shift of at least a subset of a rule table, wherein the ordered-shift is defined by the shift direction, the class rule offset, and the absolute offset difference.

20. The non-transitory CRM of claim 19, wherein the shift direction is directed to a higher priority or a lower priority.

* * * * *